US012522606B2

(12) United States Patent
Van Voorhis et al.

(10) Patent No.: US 12,522,606 B2
(45) Date of Patent: Jan. 13, 2026

(54) MODIFIED PYRROLO- AND PYRAZOLO-PYRIMIDINES FOR PROSTATE CANCER THERAPY

(71) Applicants: University of Washington, Seattle, WA (US); United States Government as Represented by the Department of Veterans Affairs, Washington, DC (US)

(72) Inventors: Wesley C. Van Voorhis, Seattle, WA (US); Dustin James Maly, Seattle, WA (US); Kayode K. Ojo, Seattle, WA (US); Gayani Perera, Seattle, WA (US); Stephen R. Plymate, Seattle, WA (US); Cynthia Sprenger, Seattle, WA (US); Takuma Uo, Seattle, WA (US); Rama Subba Rao Vidadala, Seattle, WA (US)

(73) Assignees: UNIVERSITY OF WASHINGTON, Seattle, WA (US); UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 796 days.

(21) Appl. No.: 17/758,577

(22) PCT Filed: Jan. 7, 2021

(86) PCT No.: PCT/US2021/012560
§ 371 (c)(1),
(2) Date: Jul. 10, 2022

(87) PCT Pub. No.: WO2021/142170
PCT Pub. Date: Jul. 15, 2021

(65) Prior Publication Data

US 2023/0125057 A1 Apr. 20, 2023

Related U.S. Application Data

(60) Provisional application No. 62/958,826, filed on Jan. 9, 2020.

(51) Int. Cl.
*C07D 487/04* (2006.01)
*A61P 35/00* (2006.01)

(52) U.S. Cl.
CPC ............ *C07D 487/04* (2013.01); *A61P 35/00* (2018.01)

(58) Field of Classification Search
CPC ............................... C07D 487/04; A61P 35/00
See application file for complete search history.

(56) References Cited

U.S. PATENT DOCUMENTS

| | | | |
|---|---|---|---|
| 10,350,211 B2 | 7/2019 | Van Voorhis et al. | |
| 2003/0187001 A1 | 10/2003 | Calderwood | |
| 2006/0235031 A1 | 10/2006 | Arnold et al. | |
| 2008/0014200 A1 | 1/2008 | Arnold | |
| 2008/0176892 A1 | 7/2008 | Heinrich et al. | |
| 2009/0099178 A1 | 4/2009 | Bhagwat et al. | |
| 2011/0224223 A1 | 9/2011 | Shokat et al. | |
| 2013/0018040 A1 | 1/2013 | Van Voorhis et al. | |
| 2015/0210717 A1* | 7/2015 | Gunes .................. | C07D 471/16 514/249 |

FOREIGN PATENT DOCUMENTS

| | | | | |
|---|---|---|---|---|
| CA | 2984073 A1 * | 4/2019 | | |
| CN | 104250250 A | 12/2014 | | |
| DE | 102004063269 A1 | 7/2006 | | |
| WO | 2006/114180 A1 | 11/2006 | | |
| WO | 2008/074997 A1 | 6/2008 | | |
| WO | 2009/150230 A1 | 12/2009 | | |
| WO | 2011/057064 A1 | 5/2011 | | |
| WO | 2011/094628 A1 | 8/2011 | | |
| WO | WO-2012038743 A1 * | 3/2012 | ........... | C07D 471/04 |
| WO | 2012/078859 A2 | 6/2012 | | |
| WO | 2016123151 A1 | 8/2016 | | |
| WO | WO-2016207217 A1 * | 12/2016 | ........... | A61K 31/343 |

OTHER PUBLICATIONS

Smith SLAS Discovery, Sep. 2019; 24 (8): 842-853 (Year: 2019).*
Reiserolmoen Bioorganic Chemistry, 88 2019 102918 (Year: 2019).*
Mohamed European Journal of Pharmaceutical Sciences, Jan. 15, 2019: 127:102-114 (Year: 2019).*
Pelicano, Nature Oncogene, 2006, 25, 4633-4646 (Year: 2006).*
Tufail, Molecular Cancer, 2024, 23:203 (Year: 2024).*
Ajjampur et al., "Closing the diarrhea diagnostic gap in Indian children by the application of molecular techniques," J. Med. Microbiol. 57(Pt 11): 1364-1368 (2008).
Apsel et al., "Targeted polypharmacology: discovery of dual inhibitors of tyrosine and phosphoinositide kinases," Nat. Chem. Biol., 4(11): 691-699 (2008).
Billker et al., "Calcium-dependent signaling and kinases in apicomplexan parasites," Cell Host Microbe. 5(6):612-22 (2009).
Bishop et al., "A chemical switch for inhibitor-sensitive alleles of any protein kinase," Nature 407(6802): 395-401 (2000).
Bishop et al., "Design of allele-specific inhibitors to probe protein kinase signaling," Curr. Biol. 8(5): 257-266 (1998).

(Continued)

*Primary Examiner* — Andrew D Kosar
*Assistant Examiner* — Phillip Matthew Rzeczycki
(74) *Attorney, Agent, or Firm* — MCDONNELL BOEHNEN HULBERT & BERGHOFF LLP

(57) ABSTRACT

This disclosure relates to compounds, pharmaceutical compositions comprising them, and methods of using the compounds and compositions for treating diseases affected by glycolytic generation of adenosine triphosphate (ATP). More particularly, this disclosure relates to compounds and pharmaceutical compositions thereof, methods of selectively inhibiting glycolysis with these compounds, and methods of treating diseases that benefit from selective glycolysis inhibition, such as cancer.

19 Claims, 9 Drawing Sheets

(56) References Cited

OTHER PUBLICATIONS

Bishop et al., "Generation of monospecific nanomolar tyrosine kinase inhibitors via a chemical genetic approach," J. Am. Chem. Soc. 121(4): 627-631 (1999).
Burchat et al., "Pyrazolo[3,4-d]pyrimidines containing an extended 3-substituent as potent inhibitors of Lck—a selectivity insight," Bioorg. Med. Chem. Lett., 12(12): 1687-1690 (2002).
Chen et al., "Apical Organelle discharge by Cryptosporidium parvum is temperature, cytoskeleton, and intracellular calcium dependent and required for host cell invasion," Infect. Immun. 72(12): 6806-16 (2004).
Cohen et al., "Structural bioinformatics-based design of selective, irreversible kinase inhibitors," Science 308(5726): 1318-1321 (2005).
Doerig et al., "Protein kinases as targets for antimalarial intervention: kinomics, structure-based design, transmission-blockade, and targeting host cell enzymes," Biophysica et Biochimica Acta—Proteins and Proteomics 1754(1-2): 132-150 (2005).
Hanke et al., "Discovery of a novel, potent, and Src family-selective tyrosine kinase Inhibitor: Study of Lck- and FynT-dependent T cell activation," J. Biol. Chem. 271(2): 695-701 (1996).
Hines et al., "Theileria equi isolates vary in susceptibility to imidocarb dipropionate but demonstrate uniform in vitro susceptibility to a bumped kinase inhibitor," Parasit Vectors. 8:33 (2015).
Huang et al., "SAR Studies of 5-Aminopyrazole-4-carboxamide Analogues as Potent and Selective Inhibitors of Toxoplasma gondii CDPK1," ACS Med Chem Lett. 6(12):1184-1189 (2015).
Keyloun et al., "The gatekeeper residue and beyond: homologous calcium-dependent protein kinases as drug development targets for veterinarian Apicomplexa parasites," Parasitology. 141(11): 1499-509 (2014).
Kieschnick et al., "Toxoplasma gondii attachment to host cells is regulated by a calmodulin-like domain protein kinase," J. Biol. Chem. 276(15): 12369-12377 (2001).
Lendner et al., "A novel CDPK1 inhibitor—a potential treatment for cryptosporidiosis in calves?" Parasitol Res. 114(1):335-6 (2015).
Liao, JJ. "Molecular recognition of protein kinase binding pockets for design of potentand selective kinase inhibitors," J. Med. Chem. 50(3): 409-424 (2007).
Montoya et al., Chapter 276: Toxoplasma gondii in Mandell, Bennett, & Dolin: Principles and Practice of Infectious Diseases, 6th ed. Publ: Churchill Livingston (2005).
Nagamune and Sibley, "Comparative genomic and phylogenetic analyses of calcium ATPases and calcium-regulated proteins in the apicomplexa," Mol. Biol. Evol. 23(8): 1613-1627 (2006).
Ojo et al., "Transmission of malaria to mosquitoes blocked by bumped kinase inhibitors," J. Clin. Invest. 122(6):2301-2305 (2012).
Ojo et al., "Neospora caninum Calcium-Dependent Protein Kinase 1 Is an Effective Drug Target for Neosporosis Therapy," PLoS One, 9(3):e92929 (2014).
Pedroni et al., "Bumped kinase inhibitor prohibits egression in Babesia bovis," Vet Parasitol 215:22-8 (2016).
Samie et al., "Cryptosporidium species: preliminary descriptions of the prevalence and genotype distribution among school children and hospital patients in the Venda region, Limpopo Province, South Africa," Exp.Parasitol. 114(4):314-322 (2006).
Sugi et al., "Use of the kinase inhibitor analog 1NM-PP1 reveals a role for Toxoplasma gondii CDPK1 in the invasion step," Eukaryot. Cell 9(4): 667-70. (2010).
Valeur and Roche. "Efficient, mild, parallel and purification-free synthesis of arylethers via Mitsunobu reaction," Tet. Lett. 49(23): 4182-4185 (2008).
White AC., Jr. Chapter 280: Cryptosporidiosis (*Cryptosporidium hominis, Cryptosporidium parvum*, and Other Species) in Mandell, Bennett, & Dolin: Principles and Practice of Infectious Diseases, 6th ed. Publ: Churchill Livingston (2005).
Winzer et al. "In Vitro and In Vivo Effects of the Bumped Kinase Inhibitor 1294 in the Related Cyst-Forming Apicomplexans Toxoplasma gondii and Neospora caninum," Antimicrob Agents Chemother 59(10):6361-74 (2015).
Zhang et al., "A second-site suppressor strategy for chemical genetic analysis of diverse protein kinases," Nat. Methods 2(6): 435-441 (2005).
Zhang et al., "Benzoylbenzimidazole-based selective inhibitors targeting Cryptosporidium parvum and Toxoplasma gondii calcium-dependent protein kinase-1," Bioorg Med Chem Lett. 22(16):5264-7 (2012).
Zhang et al., "Potent and Selective Inhibitors of CDPK1 from T. gondii and C. parvum Based on a 5-Aminopyrazole-4-carboxamide Scaffold," ACS Med. Chem. Letters. 5(1): 40-44 (2013).
Van Voorhis, et al., "Extended-Spectrum Antiprotozoal Bumped Kinase Inhibitors: A Review", Exp. Parasitol, 180:71-83 (2017).
Doggett et al., "Bumped Kinase Inhibitor 1294 Treats Established Toxoplasma gondii Infection," Antimicrobial Agents Chemotheraphy, 58(6): 3547-3549 (2014).
Gilbert et al., "Ocular sequelae of congenital toxoplasmosis in Brazil compared with Europe," PLoS Negl. Trop. Dis. 2(8):e277 (2008).
Demar et al. "Acute toxoplasmoses in immunocompetent patients hospitalized in an intensive care unit in French Guiana," Clin. Microbiol. Infect. 18:E221-E231 (2012).
Lourido et al., "Calcium-dependent protein kinase 1 is an essential regulator of exocytosis in Toxoplasma," Nature 465:359-362 (2010).
Ojo et al., "Toxoplasma gondii calcium-dependent protein kinase 1 is a target for selective kinase inhibitors," Nat. Struct. Mol. Biol. 17(5):602-607 (2010).
Murphy et al. "Discovery of potent and selective inhibitors of calcium-dependent protein kinase 1 (CDPK1) from C. parvum and T. gondii," ACS Med. Chem. Lett. 1(7):331-335 (2010).
Sugi et al., "Identification of mutations in TgMAPK1 of Toxoplasma gondii conferring resistance to 1NM-PP1," Int. J. Parasitol. Drugs Drug Resist. 3:93-101 (2013).
Johnson et al., "Development of Toxoplasma gondii calcium-dependent protein kinase 1 (TgCDPK1) inhibitors with potent anti-toxoplasma activity," J. Med. Chem. 55(5): 2416-2426 (2012).
Larson et al., "Multiple determinants for selective inhibition of apicomplexan calcium-dependent protein kinase CDPK1," J. Med. Chem. 55(6):2803-2810 (2012).
Lourido et al. "Optimizing small molecule inhibitors of calcium-dependent protein kinase 1 to prevent infection by Toxoplasma gondi," J. Med. Chem. 56(7):3068-3077 (2013).
Ojo et al., "A specific inhibitor of PfCDPK4 blocks malaria transmission: Chemical-genetic validation," J. Infect. Dis. 209(2):275-284 (2014).
Castellanos-Gonzalez et al., "A novel calcium dependent protein kinase inhibitor as a lead compound for treating cryptosporidiosis," J. Infect. Dis. 208(8):1342-1348 (2013).
Sugi et al., "1NM-PP1 treatment of mice infected with Toxoplasma gondii," J. Vet. Med. Sci. 73(10):1377-1379 (2011).
Vidadala et al., "Development of potent and selective Plasmodium falciparum calcium-dependent protein kinase 4 (PfCDPK4) inhibitors that block the transmission of malaria to mosquitoes," Eur J Med Chem 74: 562-73 (2014).
Tandon et al., "New Pyrazolopyrimidine Inhibitors of Protein Kinase D as Potent Anticancer Agents for Prostate Cancer," PLoS One 8(9): e75601 (2013).
Chen et al., "Protein kinase D3 (PKD3) contributes to prostate cancer cell growth and survival through a PKCepsilon/PKD3 pathway downstream of Akt and ERK ½," Cancer Res. 68(10):3844-53 (2008).
Lavalle et al. "Novel protein kinase D inhibitors cause potent arrest in prostate cancer cell growth and motility," BMC Chemical Biology 10:5 (2010).
Zou et al., "PKD2 and PKD3 promote prostate cancer cell invasion by modulating NF-κB- and HDAC1-mediated expression and activation of uPA," J Cell Sci. 125(Pt 20):4800-11 (2012).
Lavalle et al., "Inducible silencing of protein kinase D3 inhibits secretion of tumor-promoting factors in prostate cancer," J. Mol Cancer Ther. 11(7):1389-99 (2012).
Deng et al., "PKD3 contributes to up-regulation of prostate-specific antigen in prostate cancer cells," Nan Fang Yi Ke Da Xue Xue Bao. 30(8):1779-82 (2010).

(56) References Cited

OTHER PUBLICATIONS

Zou et al., "Protein kinase D3 is involved in negative regulation of MMP-7 in prostate cancer cells," Nan Fang Yi Ke Da Xue Xue Bao. 30(8):1767-70 (2010).
The International Search Report (ISR) for PCT/US2016/014996, dated Mar. 4, 2016, pp. 1-3.
Written Opinion of the International Searching Authority for PCT/US2016/014996, dated Mar. 4, 2016, pp. 1-5.
The International Search Report for PCT/US2016/014995 dated Mar. 6, 2016, pp. 1-3.
Written Opinion of the International Searching Authority for PCT/US2016/014995 dated Mar. 6, 2016, pp. 1-10.
Manuj Tandon et al., "New Pyrazolopyrimidine Inhibitors of Protein Kinase D as Potent Anticancer Agents for Prostate Cancer Cells", PLOS One, 2013, 8(9): e75601.
Li Tan et al., "4-Oxo-1,4-dihydroquinoline-3-carboxamide Derivatives as New Axl Kinase Inhibitors", Journal of Medicinal Chemistry, 2016, 59(14): 6807-6825.
International Search Report and Written Opinion of the International Searching Authority for International Application No. PCT/US2021/012560, completed May 7, 2020.

* cited by examiner

Relative ATP values
0
2-DG (10 mM)
mitochondrial toxin
Compound
(µM)
Oligo
Rot
Oligo
Rot
Rot
Rot
Rot
Rot
Oligo
Oligo
Oligo
Oligo
B
1
20
10
5
+

10 min
30 min
120 min
LNCaP95
Relative ATP values
LNCaP
Relative ATP values
2-DG (10 mM)
oligomycin (5 µM)
Cmpd.

MODIFIED PYRROLO- AND PYRAZOLO-PYRIMIDINES FOR PROSTATE CANCER THERAPY

CROSS-REFERENCE TO RELATED APPLICATIONS

This application is a national stage application under 35 U.S.C. § 371 of International Application No. PCT/US2021/012560 filed Jan. 7, 2021, which claims the benefit of priority of U.S. Provisional Patent Application No. 62/958,826, filed Jan. 9, 2020, both of which are incorporated by reference in its entirety.

STATEMENT REGARDING FEDERALLY SPONSORED RESEARCH OR DEVELOPMENT

This invention was made with government support under Grant No. W81XWH-17-1-0325, awarded by the Department of Defense and Grant No. 5101BX003324-04, awarded by the Department of Veterans Affairs. The government has certain rights in the invention.

BACKGROUND OF DISCLOSURE

Field of Disclosure

This disclosure relates to compounds, pharmaceutical compositions comprising them, and methods of using the compounds and compositions for treating diseases affected by glycolytic generation of adenosine triphosphate (ATP). More particularly, this disclosure relates to compounds and pharmaceutical compositions thereof, methods of selectively inhibiting glycolysis with these compounds, and methods of treating diseases that benefit from selective glycolysis inhibition (SGI), such as cancer.

Technical Background

More than one million people in the United States get cancer each year. Although the five year survival rate has risen dramatically—nearly fifty percent as a result of progress in early diagnosis and therapy—cancer still remains second only to cardiac disease as a cause of death in the United States. Breast, lung and bronchus, and colorectal cancer are the three most common cancers diagnosed in women, and in men, prostate, lung and bronchus, and colorectal cancers are the most common cancers diagnosed in men. Designing effective treatments for patients with cancer still represents a major challenge.

Prostate cancer is the most common solid cancer tumor in men and one of the leading causes of cancer death. Historically treatment of high-grade, recurrent prostate cancer has been to dramatically reduce the supply of androgens to the cancer via castration. Since signaling through the androgen receptor drives prostate cancer progression, removing the receptor's ligand (androgens) inhibits prostate cancer tumor growth, at least initially. Resistance to androgen deprivation therapy (ADT), however, occurs in almost all patients leading to development of castrate resistant prostate cancer (CRPC). Resistance to ADT, and, in particular, the newest androgen receptor (AR)-directed therapies such as enzalutamide and abiraterone, is associated with expression of splice variants of the AR (AR-Vs) that are constitutively active. Directly targeting the AR-Vs has been problematic due to the intrinsically disordered nature of the AR N-terminus.

Therefore, there remains a need for effective treatment of cancer, and in particular cancer responsive to the inhibition of androgen receptor activity.

SUMMARY OF DISCLOSURE

The present disclosure is related to modified (e.g., exocyclic nitrogen- or exocyclic oxygen-modified) pyrrolopyrimidines (PrPs) and pyrazolopyrimidines (PzPs) and their use. Thus, one aspect of the disclosure provides compounds of formula (I):

(I)

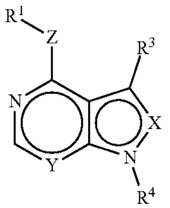

or a pharmaceutically acceptable salt thereof, wherein

X and Y are independently CH or N;

Z is O or N—$R^2$, wherein $R^2$ is hydrogen or $C_1$-$C_6$ alkyl optionally substituted with one or more of $R^5$ groups;

$R^1$ is $C_1$-$C_6$ alkyl optionally substituted with one or more of $R^5$ groups, $C_2$-$C_6$alkenyl, $C_2$-$C_6$ alkynyl, —($C_0$-$C_4$ alkyl)-$C_3$-$C_8$ cycloalkyl optionally substituted with one or more of $R^6$ groups, —($C_0$-$C_4$ alkyl)-aryl optionally substituted with one or more of $R^6$ groups, —($C_0$-$C_4$ alkyl)-heteroaryl optionally substituted with one or more of $R^6$ groups, —($C_0$-$C_4$ alkyl)-heterocyclyl optionally substituted with one or more of $R^6$ groups, or polyethylene glycol moiety;

$R^3$ is $C_3$-$C_{10}$ cycloalkyl optionally substituted with one or more of $R^7$ groups, aryl optionally substituted with one or more of $R^7$ groups, heteroaryl optionally substituted with one or more of $R^7$ groups, or heterocyclyl optionally substituted with one or more of $R^7$ groups; and $R^4$ is $C_1$-$C_6$ alkyl optionally substituted with one or more of $R^8$ groups, $C_2$-$C_6$ alkenyl, $C_2$-$C_6$ alkynyl, $C_3$-$C_8$ cycloalkyl optionally substituted with one or more of $R^7$ groups, aryl optionally substituted with one or more of $R^7$ groups, heteroaryl optionally substituted with one or more of $R^7$ groups, or heterocyclyl optionally substituted with one or more of $R^7$ groups;

wherein each $R^5$ is independently halogen, cyano, nitro, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_{3-8}$ cycloalkyl, or heterocyclyl;

each $R^6$ is independently halogen, cyano, nitro, $C_1$-$C_6$ alkyl, $C_1$-$C_6$ haloalkyl, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_{3-8}$ cycloalkyl, or heterocyclyl;

each $R^7$ is independently halogen, cyano, nitro, $C_1$-$C_6$ alkyl, $C_1$-$C_6$ haloalkyl, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_3$-$C_8$ cycloalkyl, or heterocyclyl, wherein the aryl, heteroaryl, cycloalkyl or heterocyclyl is optionally substituted by one, two, or three groups that are each independently halogen, cyano, nitro, $C_1$-$C_6$ alkyl, $C_1$-$C_6$ haloalkyl, $C_1$-$C_6$ hydroxyalkyl, —OR", —SR", —N(R")$_2$, —C(O)R", —C(O)OR", —C(O)N(R")$_2$, —S(O)$_2$R", —OC(O)R", —OC(O)OR", —OC(O)N(R")$_2$, —N(R")C(O)R", —N(R")C(O)OR", or —N(R")C(O)N(R")$_2$;

each $R^8$ is independently halogen, cyano, nitro, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_3$-$C_8$ cycloalkyl, or heterocyclyl, wherein the aryl, heteroaryl, cycloalkyl or heterocyclyl is optionally substituted by one, two, or three groups that are each independently halogen, cyano, nitro, $C_1$-$C_6$ alkyl, $C_1$-$C_6$ haloalkyl, $C_1$-$C_6$ hydroxyalkyl, —OR", —SR", —N(R")$_2$, —C(O)R", —C(O)OR", —C(O)N(R")$_2$, —S(O)$_2$R", —OC(O)R", —OC(O)OR", —OC(O)N(R")$_2$, —N(R")C(O)R", —N(R")C(O)OR", or —N(R")C(O)N(R")$_2$;

each R' and R" is independently selected from hydrogen, $C_1$-$C_6$ alkyl, $C_2$-$C_6$ alkenyl, $C_1$-$C_6$ haloalkyl, —($C_0$-$C_4$ alkyl)-$C_3$-$C_8$ cycloalkyl, —($C_0$-$C_4$ alkyl)-aryl, —($C_0$-$C_4$ alkyl)-heteroaryl, and —($C_0$-$C_4$ alkyl)-heterocyclyl, wherein the alkyl, cycloalkyl, aryl, heteroaryl, and heterocyclyl are optionally substituted with one, two, three, or four groups that are each independently halogen, cyano, nitro, $C_1$-$C_6$ alkyl, $C_1$-$C_6$ haloalkyl, —$OR^0$, —$SR^0$, —N($R^0$)$_2$, —C(O)$R^0$, —C(O)O$R^0$, —C(O)N($R^0$)$_2$, —S(O)$_2R^0$, —OC(O)$R^0$, —OC(O)O$R^0$, —OC(O)N($R^0$)$_2$, —N($R^0$)C(O)$R^0$, —N($R^0$)C(O)O$R^0$, or —N($R^0$)C(O)N($R^0$)$_2$, wherein each $R^0$ is independently hydrogen or $C_1$-$C_6$ alkyl.

Another aspect of the disclosure provides a pharmaceutical composition including one or more compounds of the disclosure as described herein (e.g., compounds of formula (I)) and a pharmaceutically acceptable carrier, solvent, adjuvant or diluent.

Another aspect of the disclosure provides a method of treating cancer. Such methods include administering to a subject in need of such treatment one or more compounds of the disclosure as described herein or a pharmaceutical composition of the disclosure as described herein. In certain embodiments, the cancer is responsive to the inhibition of androgen receptor activity. For example, cancer may be prostate, testicular, penile, breast, ovarian, cervical, lung, liver, kidney, gastrointestinal, or colon cancer.

Another aspect of the disclosure provides a method of inhibiting glycolysis, such as by glycolytic generation of adenosine triphosphate (ATP). Such method includes administering one or more compounds of the disclosure as described herein or a pharmaceutical composition of the disclosure as described herein.

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the invention will become apparent to those skilled in the art from this detailed description.

BRIEF DESCRIPTION OF THE DRAWINGS

The accompanying drawings are included to provide a further understanding of the systems and methods of the disclosure, and are incorporated in and constitute a part of this specification. The drawings illustrate one or more embodiment(s) of the disclosure and, together with the description, serve to explain the principles and operation of the disclosure.

DETAILED DISCLOSURE

Figure 1:
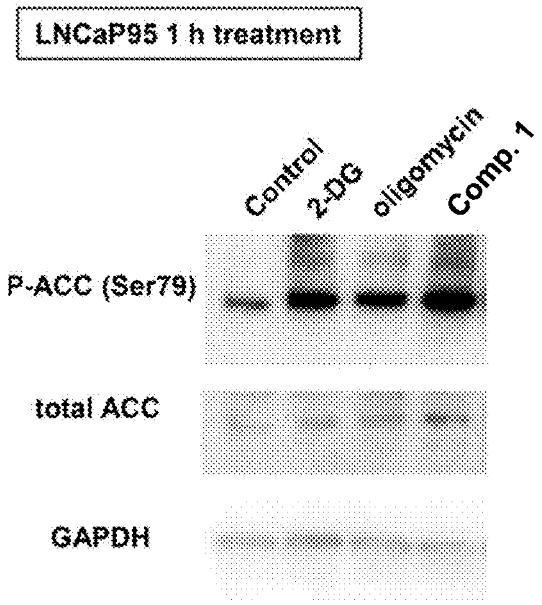
FIG. 1 upper panel illustrates that the compounds of the disclosure promote phosphorylation of acetyl-CoA carboxylase (ACC) at Ser 79 in LNCaP95 to indirectly indicate AMP-activated kinase is activated. The lower panel illustrates the compounds of the disclosure cooperate with oligomycin to deplete intracellular ATP in LNCaP95. The relative intracellular levels of ATP were evaluated by CellTiter-Glo® Luminescent Cell Viability Assay. 2-DG is 2-deoxy-d-glucose.
Figure 1:
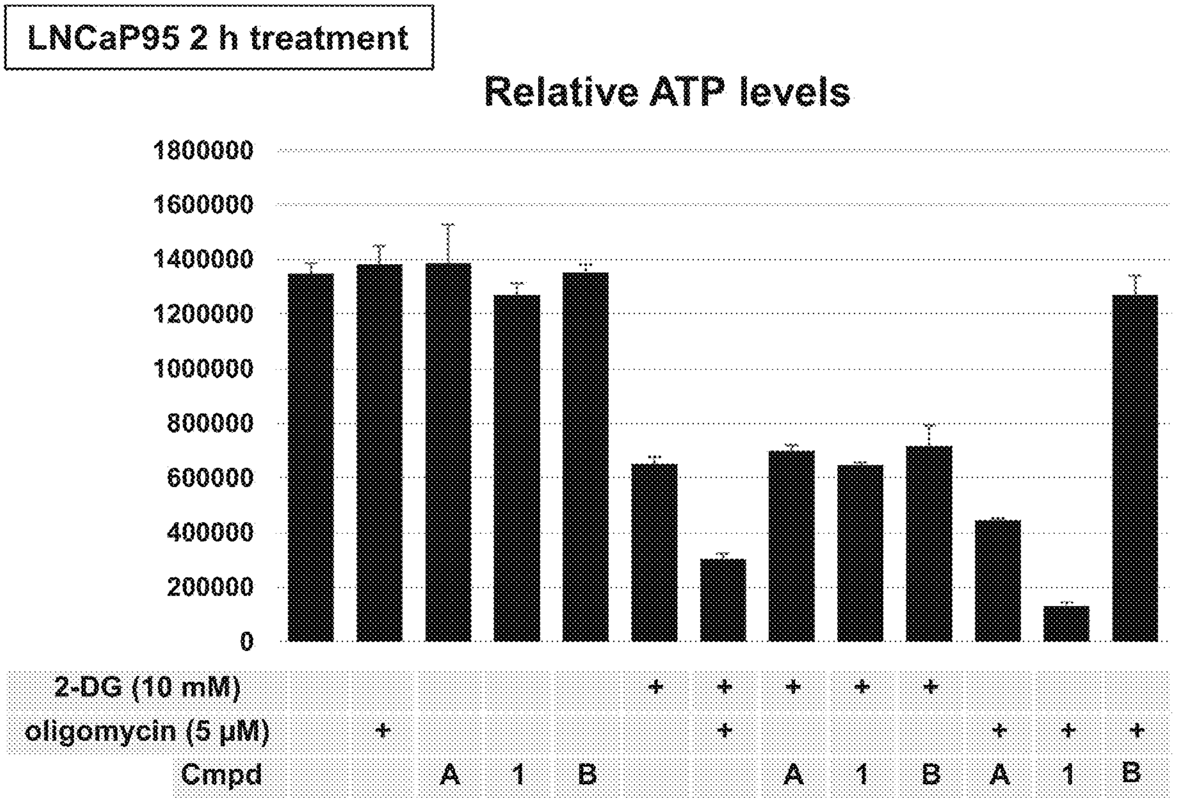

Before the disclosed processes and materials are described, it is to be understood that the aspects described herein are not limited to specific embodiments, and as such can, of course, vary. It is also to be understood that the terminology used herein is for the purpose of describing particular aspects only and, unless specifically defined herein, is not intended to be limiting.

In view of the present disclosure, the methods and systems described herein can be configured by the person of ordinary skill in the art to meet the desired need. As provided above, the present disclosure is related to modified (e.g., exocyclic nitrogen- or exocyclic oxygen-modified) pyrrolopyrimidines (PrPs) and pyrazolopyrimidines (PzPs). The present inventors unexpectedly found that modification of the exocyclic nitrogen or oxygen on the PrPs or PzPs retained activity against androgen-receptor positive prostate cancer ($AR^+$ PC). Indeed, modifications of the exocyclic nitrogen or oxygen seem to increase activity against $AR^+$ PC. This was surprising, because this modification has been shown to abrogate binding to protein kinases, as it disrupts the hydrogen bonding required for type 1 protein kinase inhibitors. Modification of the exocyclic nitrogen or oxygen is advantageous in that it eliminates off-target effects of binding protein kinases in a type 1 manner. Thus, such modification of the exocyclic nitrogen or oxygen could reduce overall off target activity of the compounds, and thus reduce side effects of therapy. In fact, those of skill in the art are generally biased against modifying the exocyclic nitrogen and losing the type 1 protein kinase inhibitory effect.

Accordingly, one aspect of the disclosure provides compounds of formula (I) as provided above.

One embodiment of the disclosure provides compounds of formula (I) as otherwise described herein where X is CH and Y is N:

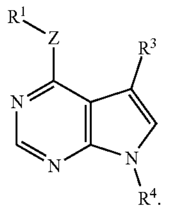

In certain embodiments, Z is N—$R^2$, and such compounds may be represented by formula:

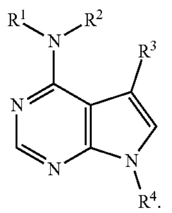

In certain embodiments, Z is O, and such compounds may be represented by formula:

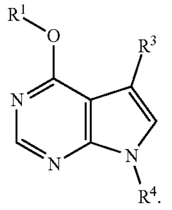

Another embodiment of the disclosure provides compounds of formula (I) as otherwise described herein where X is N and Y is N:

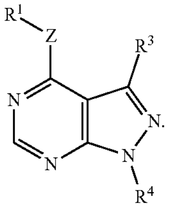

In certain embodiments, Z is N—$R^2$, and such compounds may be represented by formula:

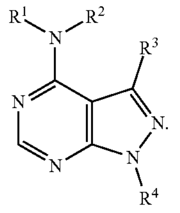

In certain embodiments, Z is O, and such compounds may be represented by formula:

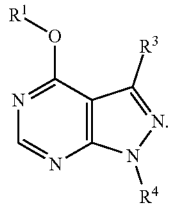

In certain embodiments of the compounds of formula (I) as described above, when present, $R^2$ is hydrogen or $C_1$-$C_6$ alkyl (e.g., methyl). In certain embodiments of the compounds of formula (I) as described above, when present, $R^2$ is hydrogen or methyl. In certain embodiments, $R^2$ is hydrogen. In certain embodiments, $R^2$ is methyl.

Another embodiment of the disclosure provides compounds of formula (I) as otherwise described herein where $R^1$ is $C_1$-$C_6$ alkyl optionally substituted with one or more of $R^5$ groups, —($C_0$-$C_4$ alkyl)-$C_3$-$C_8$ cycloalkyl optionally substituted with one or more of $R^6$ groups, —($C_0$-$C_4$ alkyl)-aryl optionally substituted with one or more of $R^6$ groups, —($C_0$-$C_4$ alkyl)-heteroaryl optionally substituted with one or more of Re groups, or —($C_0$-$C_4$ alkyl)-heterocyclyl optionally substituted with one or more of $R^6$ groups. In certain embodiments, $R^1$ is $C_1$-$C_6$ alkyl optionally substituted with one or more of $R^5$ groups, $C_1$-$C_6$ cycloalkyl optionally substituted with one or more of Re groups, aryl optionally substituted with one or more of Re groups, heteroaryl optionally substituted with one or more of $R^6$ groups, or heterocyclyl optionally substituted with one or more of $R^6$ groups. In certain embodiments, $R^1$ is $C_1$-$C_6$ alkyl optionally substituted with one or more of $R^5$ groups. In certain embodiments, $R^1$ is $C_1$-$C_6$ alkyl optionally substituted with —OR' or —N(R')$_2$. In certain embodiments, $R^1$ is $C_1$-$C_6$ alkyl optionally substituted with —OR' or —N(R')$_2$, where each R' is independently H or methyl.

In certain other embodiments of the compounds of the disclosure as described herein, $R^1$ is methyl, 2-ethoxyethyl, 3-(dimethylamino)propyl, 2-aminoethyl, 2-hydroxyethyl, 2-(2-aminoethoxy)ethyl, 2-(2-(2-(2-aminoethoxy)ethoxy)ethoxy)ethyl, or 2-(2-(((cyclooct-4-en-1-yloxy)carbonyl)amino)ethoxy)ethyl.

In certain embodiments of the compounds of formula (I) of the disclosure as described herein, $R^3$ is aryl optionally substituted with one or more of $R^7$ groups, heteroaryl optionally substituted with one or more of $R^7$ groups, or heterocyclyl optionally substituted with one or more of $R^7$ groups. In certain embodiments, $R^3$ is aryl optionally substituted with one or more of $R^7$ groups or heteroaryl optionally substituted with one or more of $R^7$ groups.

In certain embodiments of the compounds of the disclosure as described herein, $R^3$ is one of the formulas:

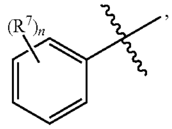, 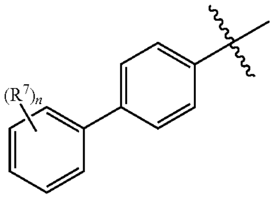,

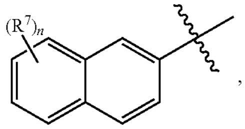, 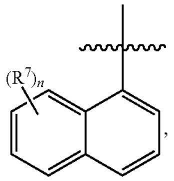, or

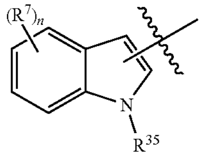, wherein n is 0, 1, or 2.

In some embodiments of the compounds of the disclosure as described herein, n is 0. In some embodiments of the compounds of the disclosure as described herein, n is 1.

In certain other embodiments of the compounds of the disclosure as described herein, $R^3$ is one of the formulas:

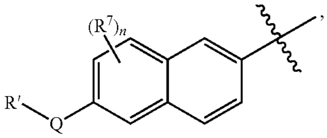,

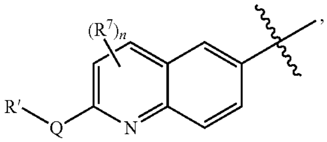,

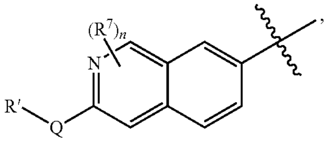,

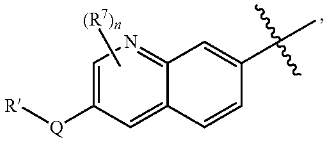,

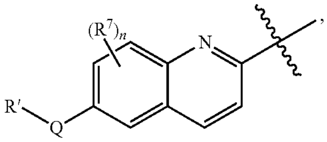,

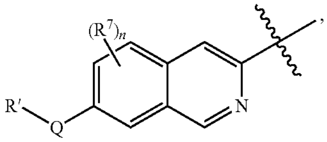, or

-continued

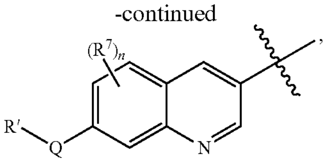, wherein n is 0, 1, or 2; and

Q is —O—, —S—, or —N(R')—.

In certain embodiments of the compounds of the disclosure as described herein, $R^3$ is:

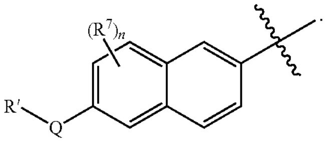.

For example, Q may be —O— or —N(H)— in certain embodiments.

In certain embodiments of the compounds of formula (I) as described above, R' is selected from $C_1$-$C_6$ alkyl, —($C_0$-$C_4$ alkyl)-$C_3$-$C_8$ cycloalkyl, —($C_0$-$C_4$ alkyl)-aryl, —($C_0$-$C_4$ alkyl)-heteroaryl, and —($C_0$-$C_4$ alkyl)-heterocyclyl, wherein the alkyl, cycloalkyl, aryl, heteroaryl, and heterocyclyl are optionally substituted with one, two, three, or four groups that are each independently halogen, cyano, nitro, $C_1$-$C_6$ alkyl, $C_1$-$C_6$ haloalkyl, —$OR^0$, —$SR^0$, —$N(R^0)_2$, —$C(O)R^0$, —$C(O)OR^0$, —$C(O)N(R^0)_2$, —$S(O)_2R^0$, —$OC(O)R^0$, —$OC(O)OR^0$, —$OC(O)N(R^0)_2$, —$N(R^0)C(O)R^0$, —$N(R^0)C(O)OR^0$, or —$N(R^0)C(O)N(R^0)_2$, wherein each $R^0$ is independently hydrogen or $C_1$-$C_6$ alkyl. In certain embodiments, R' is selected from $C_1$-$C_6$ alkyl, —($C_0$-$C_1$ alkyl)-$C_3$-$C_8$ cycloalkyl, —($C_0$-$C_1$ alkyl)-aryl, —($C_0$-$C_1$ alkyl)-heteroaryl, and —($C_0$-$C_1$ alkyl)-heterocyclyl, wherein the alkyl, cycloalkyl, aryl, heteroaryl, and heterocyclyl are optionally substituted with one, two, three, or four groups that are each independently halogen, cyano, nitro, $C_1$-$C_6$ alkyl, $C_1$-$C_6$ haloalkyl, —$OR^0$, —$SR^0$, —$N(R^0)_2$, —$C(O)R^0$, —$C(O)OR^0$, —$C(O)N(R^0)_2$, —$S(O)_2R^0$, —$OC(O)R^0$, —$OC(O)OR^0$, —$OC(O)N(R^0)_2$, —$N(R^0)C(O)R^0$, —$N(R^0)C(O)OR^0$, or —$N(R^0)C(O)N(R^0)_2$, wherein each $R^0$ is independently hydrogen or $C_1$-$C_6$ alkyl. In certain embodiments, R' is selected from $C_1$-$C_6$ alkyl, $C_1$-$C_6$ cycloalkyl, aryl, heteroaryl, and heterocyclyl, wherein the alkyl, cycloalkyl, aryl, heteroaryl, and heterocyclyl are optionally substituted with one, two, three, or four groups that are each independently halogen, cyano, nitro, $C_1$-$C_6$ alkyl, $C_1$-$C_6$ haloalkyl, —$OR^0$, —SRO, —$N(R^0)_2$, —$C(O)R^0$, —$C(O)OR^0$, —$C(O)N(R^0)_2$, —$S(O)_2R^0$, —$OC(O)R^0$, —$OC(O)OR^0$, —$OC(O)N(R^0)_2$, —$N(R^0)C(O)R^0$, —$N(R^0)C(O)OR^0$, or —$N(R^0)C(O)N(R^0)_2$, wherein each $R^0$ is independently hydrogen or $C_1$-$C_6$ alkyl.

In certain embodiments of the compounds of the disclosure as described herein, $R^3$ is of the formula

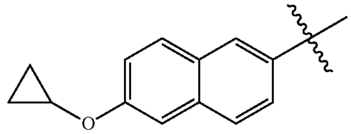 or

-continued

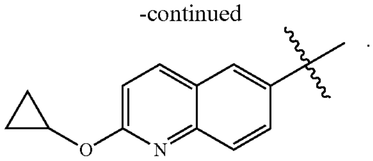

Another embodiment of the disclosure provides compounds of formula (I) as otherwise described herein where $R^4$ is $C_1$-$C_6$ alkyl optionally substituted with one or more of $R^8$ groups. In certain embodiments, $R^4$ is $C_1$-$C_6$ alkyl substituted with one $R^8$ group. In certain embodiments, $R^4$ is $C_1$-$C_6$ alkyl substituted with —OR' or heterocyclyl, each optionally substituted. In certain embodiments, $R^4$ is $C_1$-$C_6$ alkyl substituted with —OH or —O($C_1$-$C_6$ alkyl). In certain embodiments, $R^4$ is $C_1$-$C_6$ alkyl substituted with —OH or —$OCH_3$. In certain embodiments, $R^4$ is 2-hydroxy-2-methylpropyl or 2-methoxy-2-methylpropyl.

In certain embodiments of the disclosure, the compounds of formula (I) as described herein are any one of compounds 1-45 (e.g., as described in Examples 1-45).

Therapeutics Applications

There is a great need in the art to develop novel therapeutics for the treatment of cancer, and in particular cancer responsive to the inhibition of androgen receptor activity, by for example, regulating metabolism. The present disclosure satisfies this and other needs by providing a novel specific glycolysis inhibitors for treating cancer by inhibiting glycolytic generation of adenosine triphosphate (ATP).

Thus, in one aspect, the disclosure provides a method of inhibiting glycolysis. Another aspect of the disclosure provides a method of treating cancer. Such methods include administering to a subject in need of such treatment an effective amount of one or more compounds of the disclosure as described herein (i.e., compounds of formula (I)) or a pharmaceutical composition of the disclosure as described herein.

In some embodiments of this disclosure, the subject in need is a human subject or patient. In some embodiments the subject, e.g., a human, has been previously treated with an anti-cancer therapy. In some other embodiments the subject has not been previously treated with an anti-cancer therapy.

In certain embodiments of the methods of the disclosure as described herein, the cancer is a solid tumor.

Patients with cancers that exhibit active glycolysis may also be candidates for selective glycolysis inhibition (SGI) therapy. Therefore, in certain embodiments, the cancer is responsive to, or benefits from, selective glycolysis inhibition. For example, in certain embodiments, the cancer is prostate, testicular, penile, breast, ovarian, cervical, lung, liver, kidney, bladder, gastrointestinal, or colon cancer. These patients may be selected by exhibiting a positive fluorodeoxyglucose (FDG)-positron emission tomography (PET) scan in their cancer.

In certain embodiments, the compounds of the disclosure are useful in treating cancer is responsive to the inhibition of androgen receptor activity. For example, in certain embodiments, the cancer is prostate, breast, or liver cancer. In certain other embodiments, the cancer is prostate, testicular, penile, breast, ovarian, cervical, or bladder cancer.

In certain embodiments of the methods of the disclosure as described herein, the cancer is prostate cancer. Such cancer may be androgen receptor (AR) positive prostate cancer. Such cancer may also be castrate resistant prostate cancer (CRPC).

In certain embodiments of the methods of the disclosure as described herein, the cancer is breast cancer.

In certain embodiments, the compounds of the disclosure as described herein may be administered singly, as mixtures of one or more compounds or in mixture or combination with a secondary therapeutic agent useful for treating cancer.

In certain embodiments, the secondary therapeutic agent is an inhibitor of glycolysis. For example, the secondary therapeutic agent may be an inhibitor of oxidative phosphorylation. Examples include, but are not limited to, oligomycin, rotenone, antimycin A or carbonyl cyanide-4-trifluoromethoxy)phenylhydrazone. Metformin is a polypharmacological agent with many effects on glucose metabolism, including targeting mitochondrial Complex I to impair oxidative phosphorylation. The secondary therapeutic agent may also be an inhibitor of another metabolic pathway, such as renal glucose reabsorption (e.g., SGLT2 inhibitors gliflozins).

In certain embodiments, the compounds of the disclosure as described herein are administered with oligomycin.

In certain embodiments, the compounds of the disclosure as described herein are administered with metformin.

In certain embodiments, secondary therapeutic agent is an anti-proliferative agent.

In certain embodiments, the compounds of the disclosure as described herein are administered with one or more secondary therapeutic agents selected from inhibitors of oxidative phosphorylation, anti-proliferative agents, and combinations thereof.

When administered as a combination, the compounds and compositions of the disclosure as described herein and the secondary therapeutic agents can be formulated as separate compositions that are given simultaneously or sequentially, or the therapeutic agents can be given as a single composition. The compounds may be administered in the form of compounds per se, or as pharmaceutical compositions comprising a compound. In certain embodiments, the compounds and compositions of the disclosure and/or the secondary therapeutic agent may be administered in an amount below their established half maximal inhibitory concentration ($IC_{50}$). For example, the compound of the disclosure or the secondary therapeutic agent may be administered in an amount less than 1% of, e.g., less than 10%, or less than 25%, or less than 50%, or less than 75%, or even less than 90% of the inhibitory concentration ($IC_{50}$).

Pharmaceutical Compositions

In another aspect, the present disclosure provides compositions comprising one or more of compounds as described above with respect to formula (I) and an appropriate carrier, solvent, adjuvant, or diluent. The exact nature of the carrier, solvent, adjuvant, or diluent will depend upon the desired use for the composition, and may range from being suitable or acceptable for veterinary uses to being suitable or acceptable for human use. The composition may optionally include one or more secondary therapeutic agents. In certain embodiments, the composition may include one or more secondary anticancer therapeutic agents.

When used to treat or prevent such diseases, the compounds described herein may be administered singly, as mixtures of one or more compounds or in mixture or combination with other agents useful for treating such diseases and/or the symptoms associated with such diseases. The compounds may also be administered in mixture or in combination with agents useful to treat other disorders, such as steroids, methotrexate, etc. The compounds may be administered in the form of compounds per se, or as pharmaceutical compositions comprising a compound.

Pharmaceutical compositions comprising the compound(s) may be manufactured by means of conventional mixing, dissolving, granulating, dragee-making levigating, emulsifying, encapsulating, entrapping or lyophilization processes. The compositions may be formulated in conventional manner using one or more physiologically acceptable carriers, diluents, excipients or auxiliaries which facilitate processing of the compounds into preparations which can be used pharmaceutically.

The compounds may be formulated in the pharmaceutical composition per se, or in the form of a hydrate, solvate, N-oxide or pharmaceutically acceptable salt, as previously described. Typically, such salts are more soluble in aqueous solutions than the corresponding free acids and bases, but salts having lower solubility than the corresponding free acids and bases may also be formed.

Pharmaceutical compositions may take a form suitable for virtually any mode of administration, including, for example, topical, ocular, oral, buccal, systemic, nasal, injection, transdermal, rectal, vaginal, etc., or a form suitable for administration by inhalation or insufflation.

For topical administration, the compound(s) may be formulated as solutions, gels, ointments, creams, suspensions, etc. as are well-known in the art. Systemic formulations include those designed for administration by injection, e.g., subcutaneous, intravenous, intramuscular, intrathecal or intraperitoneal injection, as well as those designed for transdermal, transmucosal oral or pulmonary administration.

Useful injectable preparations include sterile suspensions, solutions or emulsions of the active compound(s) in aqueous or oily vehicles. The compositions may also contain formulating agents, such as suspending, stabilizing and/or dispersing agent. The formulations for injection may be presented in unit dosage form, e.g., in ampules or in multidose containers, and may contain added preservatives. Alternatively, the injectable formulation may be provided in powder form for reconstitution with a suitable vehicle, including but not limited to sterile pyrogen free water, buffer, dextrose solution, etc., before use. To this end, the active compound(s) may be dried by any art-known technique, such as lyophilization, and reconstituted prior to use.

For transmucosal administration, penetrants appropriate to the barrier to be permeated are used in the formulation. Such penetrants are known in the art.

For oral administration, the pharmaceutical compositions may take the form of, for example, lozenges, tablets or capsules prepared by conventional means with pharmaceutically acceptable excipients such as binding agents (e.g., pregelatinised maize starch, polyvinylpyrrolidone or hydroxypropyl methylcellulose); fillers (e.g., lactose, microcrystalline cellulose or calcium hydrogen phosphate); lubricants (e.g., magnesium stearate, talc or silica); disintegrants (e.g., potato starch or sodium starch glycolate); or wetting agents (e.g., sodium lauryl sulfate). The tablets may be coated by methods well known in the art with, for example, sugars, films or enteric coatings.

Liquid preparations for oral administration may take the form of, for example, elixirs, solutions, syrups or suspensions, or they may be presented as a dry product for constitution with water or other suitable vehicle before use. Such liquid preparations may be prepared by conventional means with pharmaceutically acceptable additives such as suspending agents (e.g., sorbitol syrup, cellulose derivatives or hydrogenated edible fats); emulsifying agents (e.g., lecithin or acacia); non-aqueous vehicles (e.g., almond oil, oily esters, ethyl alcohol, Cremophore™ or fractionated vegetable oils); and preservatives (e.g., methyl or propyl-p-hydroxybenzoates or sorbic acid). The preparations may also contain buffer salts, preservatives, flavoring, coloring and sweetening agents as appropriate.

Preparations for oral administration may be suitably formulated to give controlled release of the compound, as is well known. For buccal administration, the compositions may take the form of tablets or lozenges formulated in conventional manner. For rectal and vaginal routes of administration, the compound(s) may be formulated as solutions (for retention enemas) suppositories or ointments containing conventional suppository bases such as cocoa butter or other glycerides.

For nasal administration or administration by inhalation or insufflation, the compound(s) can be conveniently delivered in the form of an aerosol spray from pressurized packs or a nebulizer with the use of a suitable propellant, e.g., dichlorodifluoromethane, trichlorofluoromethane, dichlorotetrafluoroethane, fluorocarbons, carbon dioxide or other suitable gas. In the case of a pressurized aerosol, the dosage unit may be determined by providing a valve to deliver a metered amount. Capsules and cartridges for use in an inhaler or insufflator (for example capsules and cartridges comprised of gelatin) may be formulated containing a powder mix of the compound and a suitable powder base such as lactose or starch.

For ocular administration, the compound(s) may be formulated as a solution, emulsion, suspension, etc. suitable for administration to the eye. A variety of vehicles suitable for administering compounds to the eye are known in the art.

For prolonged delivery, the compound(s) can be formulated as a depot preparation for administration by implantation or intramuscular injection. The compound(s) may be formulated with suitable polymeric or hydrophobic materials (e.g., as an emulsion in an acceptable oil) or ion exchange resins, or as sparingly soluble derivatives, e.g., as a sparingly soluble salt. Alternatively, transdermal delivery systems manufactured as an adhesive disc or patch which slowly releases the compound(s) for percutaneous absorption may be used. To this end, permeation enhancers may be used to facilitate transdermal penetration of the compound(s).

Alternatively, other pharmaceutical delivery systems may be employed. Liposomes and emulsions are well-known examples of delivery vehicles that may be used to deliver compound(s). Certain organic solvents such as dimethyl sulfoxide (DMSO) may also be employed, although usually at the cost of greater toxicity.

The pharmaceutical compositions may, if desired, be presented in a pack or dispenser device which may contain one or more unit dosage forms containing the compound(s). The pack may, for example, comprise metal or plastic foil, such as a blister pack. The pack or dispenser device may be accompanied by instructions for administration.

The compound(s) described herein, or compositions thereof, will generally be used in an amount effective to achieve the intended result, for example in an amount effective to treat or prevent the particular disease being treated. By therapeutic benefit is meant eradication or amelioration of the underlying disorder being treated and/or eradication or amelioration of one or more of the symptoms associated with the underlying disorder such that the patient reports an improvement in feeling or condition, notwithstanding that the patient may still be afflicted with the underlying disorder. Therapeutic benefit also generally includes halting or slowing the progression of the disease, regardless of whether improvement is realized.

The amount of compound(s) administered will depend upon a variety of factors, including, for example, the particular indication being treated, the mode of administration, whether the desired benefit is prophylactic or therapeutic, the severity of the indication being treated and the age and weight of the patient, the bioavailability of the particular compound(s) the conversation rate and efficiency into active drug compound under the selected route of administration, etc.

Determination of an effective dosage of compound(s) for a particular use and mode of administration is well within the capabilities of those skilled in the art. Effective dosages may be estimated initially from in vitro activity and metabolism assays. For example, an initial dosage of compound for use in animals may be formulated to achieve a circulating blood or serum concentration of the metabolite active compound that is at or above an $IC_{50}$ of the particular compound as measured in as in vitro assay. Calculating dosages to achieve such circulating blood or serum concentrations taking into account the bioavailability of the particular compound via the desired route of administration is well within the capabilities of skilled artisans. Initial dosages of compound can also be estimated from in vivo data, such as animal models. Animal models useful for testing the efficacy of the active metabolites to treat or prevent the various diseases described above are well-known in the art. Animal models suitable for testing the bioavailability and/or metabolism of compounds into active metabolites are also well-known. Ordinarily skilled artisans can routinely adapt such information to determine dosages of particular compounds suitable for human administration.

Dosage amounts will typically be in the range of from about 0.0001 mg/kg/day, 0.001 mg/kg/day or 0.01 mg/kg/day to about 100 mg/kg/day, but may be higher or lower, depending upon, among other factors, the activity of the active compound, the bioavailability of the compound, its metabolism kinetics and other pharmacokinetic properties, the mode of administration and various other factors, discussed above. Dosage amount and interval may be adjusted individually to provide plasma levels of the compound(s) and/or active metabolite compound(s) which are sufficient to maintain therapeutic or prophylactic effect. For example, the compounds may be administered once per week, several times per week (e.g., every other day), once per day or multiple times per day, depending upon, among other things, the mode of administration, the specific indication being treated and the judgment of the prescribing physician. In cases of local administration or selective uptake, such as local topical administration, the effective local concentration of compound(s) and/or active metabolite compound(s) may not be related to plasma concentration. Skilled artisans will be able to optimize effective dosages without undue experimentation.

Definitions

The following terms and expressions used herein have the indicated meanings.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Terms used herein may be preceded and/or followed by a single dash, "—", or a double dash, "═", to indicate the bond order of the bond between the named substituent and its parent moiety; a single dash indicates a single bond and a double dash indicates a double bond. In the absence of a single or double dash it is understood that a single bond is formed between the substituent and its parent moiety; further, substituents are intended to be read "left to right" (i.e., the attachment is via the last portion of the name) unless a dash indicates otherwise. For example, $C_1$-$C_6$alkoxycarbonyloxy and —OC(O)$C_1$-$C_8$alkyl indicate the same functionality; similarly arylalkyl and -alkylaryl indicate the same functionality.

The term "alkenyl" as used herein, means a straight or branched chain hydrocarbon containing from 2 to 10 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkyl" as used herein, means a straight or branched chain hydrocarbon containing from 1 to 10 carbon atoms unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. When an "alkyl" group is a linking group between two other moieties, then it may also be a straight or branched chain; examples include, but are not limited to $—CH_2—$, $—CH_2CH_2—$, $—CH_2CH_2CHC(CH_3)—$, and $—CH_2CH(CH_2CH_3)CH_2—$.

The term "alkylene" refers to a bivalent alkyl group. An "alkylene chain" is a polymethylene group, i.e., $—(CH_2)_n—$, wherein n is a positive integer, preferably from one to six, from one to four, from one to three, from one to two, or from two to three. A substituted alkylene chain is a polymethylene group in which one or more methylene hydrogen atoms is replaced with a substituent. Suitable substituents include those described below for a substituted aliphatic group. An alkylene chain also may be substituted at one or more positions with an aliphatic group or a substituted aliphatic group.

The term "alkynyl" as used herein, means a straight or branched chain hydrocarbon group containing from 2 to 10 carbon atoms and containing at least one carbon-carbon triple bond. Representative examples of alkynyl include, but are not limited, to acetylenyl, 1-propynyl, 2-propynyl, 3-butynyl, 2-pentynyl, and 1-butynyl.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system. The bicyclic aryl can be azulenyl, naphthyl, or a phenyl fused to a monocyclic cycloalkyl, a monocyclic cycloalkenyl, or a monocyclic heterocyclyl. The bicyclic aryl is attached to the parent molecular moiety through any carbon atom contained within the phenyl portion of the bicyclic system, or any carbon atom with the napthyl or azulenyl ring. The fused monocyclic cycloalkyl or monocyclic heterocycyl portions of the bicyclic aryl are optionally substituted with one or two oxo and/or thioxo groups. Representative examples of the bicyclic aryls include, but are not limited to, azulenyl, naphthyl, dihydroinden-1-yl, dihydroinden-2-yl, dihydroinden-3-yl, dihydroinden-4-yl, 2,3-dihydroindol-4-yl, 2,3-dihydroindol-5-yl, 2,3-dihydroindol-6-yl, 2,3-dihydroindol-7-yl, inden-1-yl, inden-2-yl, inden-3-yl, inden-4-yl, dihydronaphthalen-2-yl, dihydronaphthalen-3-yl, dihydronaphthalen-4-yl, dihydronaphthalen-1-yl, 5,6,7,8-tetrahydronaphthalen-1-yl, 5,6,7,8-tetrahydronaphthalen-2-yl, 2,3-dihydrobenzofuran-4-yl, 2,3-dihydrobenzofuran-5-yl, 2,3-dihydrobenzofuran-6-yl, 2,3-dihydrobenzofuran-7-yl, benzo[d][1,3]dioxol-4-yl, benzo[d][1,3]dioxol-5-yl, 2H-chromen-2-on-5-yl, 2H-chromen-2-on-6-yl, 2H-chromen-2-on-7-yl, 2H-chromen-2-on-8-yl, isoindoline-1,3-dion-4-yl, isoindoline-1,3-dion-5-yl, inden-1-on-4-yl, inden-1-on-5-yl, inden-1-on-8-yl, inden-1-on-7-yl, 2,3-dihydrobenzo[b][1,4]dioxan-5-yl, 2,3-dihydrobenzo[b][1,4]dioxan-6-yl, 2H-benzo[b][1,4]oxazin3(4H)-on-5-yl, 2H-benzo[b][1,4]oxazin3(4H)-on-6-yl, 2H-benzo[b][1,4]oxazin3(4H)-on-7-yl, 2H-benzo[b][1,4]oxazin3(4H)-on-8-yl, benzo[d]oxazin-2(3H)-on-5-yl, benzo[d]oxazin-2(3H)-on-6-yl, benzo[d]oxazin-2(3H)-on-7-yl, benzo[d]oxazin-2(3H)-on-8-yl, quinazolin-4(3H)-on-5-yl, quinazolin-4(3H)-on-6-yl, quinazolin-4(3H)-on-7-yl, quinazolin-4(3H)-on-8-yl, quinoxalin-2(1H)-on-5-yl, quinoxalin-2(1H)-on-6-yl, quinoxalin-2(1H)-on-7-yl, quinoxalin-2(1H)-on-8-yl, benzo[d]thiazol-2(3H)-on-4-yl, benzo[d]thiazol-2(3H)-on-5-yl, benzo[d]thiazol-2(3H)-on-6-yl, and, benzo[d]thiazol-2(3H)-on-7-yl. In certain embodiments, the bicyclic aryl is (i) naphthyl or (ii) a phenyl ring fused to either a 5 or 6 membered monocyclic cycloalkyl, a 5 or 6 membered monocyclic cycloalkenyl, or a 5 or 6 membered monocyclic heterocycyl, wherein the fused cycloalkyl, cycloalkenyl, and heterocyclyl groups are optionally substituted with one or two groups which are independently oxo or thioxo.

The terms "cyano" and "nitrile" as used herein, mean a —CN group.

The term "cyclyl" or "cycloalkyl" as used herein, means a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloalkyl ring where two non-adjacent carbon atoms of the monocyclic ring are linked by an alkylene bridge of between one and three additional carbon atoms (i.e., a bridging group of the form $—(CH_2)_w—$, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring. Cycloalkyl groups are optionally substituted with one or two groups which are independently oxo or thioxo. In certain embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thioxo.

The term "halo" or "halogen" as used herein, means —Cl, —Br, —I or —F.

The terms "haloalkyl" and "haloalkoxy" refer to an alkyl or alkoxy group, as the case may be, which is substituted with one or more halogen atoms.

The term "heteroaryl," as used herein, means a monocyclic heteroaryl, a bicyclic ring, or a tricyclic ring system containing at least one heteroaromatic ring. In certain embodiments, the heteroaryl is a monocyclic heteroaryl or a bicyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. Representative examples of monocyclic heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, and triazinyl. The bicyclic heteroaryl consists of a monocyclic heteroaryl fused to a phenyl, a monocyclic cycloalkyl, a monocyclic cycloalkenyl, a monocyclic heterocyclyl, or a monocyclic heteroaryl. The tricyclic heteroaryl consists of a monocyclic heteroaryl fused to two rings selected from a phenyl, a monocyclic cycloalkyl, a monocyclic cycloalkenyl, a monocyclic heterocyclyl, and a monocyclic heteroaryl. The fused cycloalkyl or heterocyclyl portion of the bicyclic heteroaryl group is optionally substituted with one or two groups which are independently oxo or thioxo. When the bicyclic or tricyclic heteroaryl contains a fused cycloalkyl, cycloalkenyl, or heterocyclyl ring, then the bicyclic heteroaryl group is connected to the parent molecular moiety through any carbon or nitrogen atom contained within the monocyclic heteroaryl portion of the bicyclic ring system. When the bicyclic heteroaryl is a monocyclic heteroaryl fused to a benzo ring, then the bicyclic heteroaryl group is connected to the parent molecular moiety through any carbon atom or nitrogen atom within the bicyclic ring system. Representative examples of bicyclic heteroaryl include, but are not limited to, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, purinyl, 5,6,7,8-tetrahydroquinolin-2-yl, 5,6,7,8-tetrahydroquinolin-3-yl, 5,6,7,8-tetrahydroquinolin-4-yl, 5,6,7,8-tetrahydroisoquinolin-1-yl, thienopyridinyl, 4,5,6,7-tetrahydrobenzo[c][1,2,5]oxadiazolyl, 2,3-dihydrothieno[3,4-b][1,4]dioxan-5-yl, and 6,7-dihydrobenzo[c][1,2,5]oxadiazol-4(5H)-onyl. In certain embodiments, the fused bicyclic heteroaryl is a 5 or 6 membered monocyclic heteroaryl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused cycloalkyl, cycloalkenyl, and heterocyclyl groups are optionally substituted with one or two groups which are independently oxo or thioxo.

The terms "heterocyclyl" as used herein, mean a monocyclic heterocycle or a bicyclic heterocycle. The monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains 1 heteroatom selected from the group consisting of O, N and S. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The monocyclic heterocycle is connected to the parent molecular moiety through any carbon atom or any nitrogen atom contained within the monocyclic heterocycle. Representative examples of monocyclic heterocycle include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to either a phenyl, a monocyclic cycloalkyl, a monocyclic cycloalkenyl, a monocyclic heterocycle, or a monocyclic heteroaryl. The bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. Heterocyclyl groups are optionally substituted with one or two groups which are independently oxo or thioxo. In certain embodiments, the bicyclic heterocyclyl is a 5 or 6 membered monocyclic heterocyclyl ring fused to phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the bicyclic heterocyclyl is optionally substituted by one or two groups which are independently oxo or thioxo.

The term "oxo" as used herein means a =O group.

The term "saturated" as used herein means the referenced chemical structure does not contain any multiple carbon-carbon bonds. For example, a saturated cycloalkyl group as defined herein includes cyclohexyl, cyclopropyl, and the like.

The term "substituted", as used herein, means that a hydrogen radical of the designated moiety is replaced with the radical of a specified substituent, provided that the substitution results in a stable or chemically feasible compound. The term "substitutable", when used in reference to a designated atom, means that attached to the atom is a hydrogen radical, which can be replaced with the radical of a suitable substituent.

The phrase "one or more" substituents, as used herein, refers to a number of substituents that equals from one to the maximum number of substituents possible based on the number of available bonding sites, provided that the above conditions of stability and chemical feasibility are met. Unless otherwise indicated, an optionally substituted group may have a substituent at each substitutable position of the group, and the substituents may be either the same or different. As used herein, the term "independently selected" means that the same or different values may be selected for multiple instances of a given variable in a single compound.

The term "thioxo" as used herein means a =S group.

The term "unsaturated" as used herein means the referenced chemical structure contains at least one multiple carbon-carbon bond, but is not aromatic. For example, a unsaturated cycloalkyl group as defined herein includes cyclohexenyl, cyclopentenyl, cyclohexadienyl, and the like.

It will be apparent to one skilled in the art that certain compounds of this disclosure may exist in tautomeric forms, all such tautomeric forms of the compounds being within the scope of the disclosure. Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the disclosure. Both the R and the S stereochemical isomers, as well as all mixtures thereof, are included within the scope of the disclosure.

"Pharmaceutically acceptable" refers to those compounds, materials, compositions, and/or dosage forms which are, within the scope of sound medical judgment, suitable for contact with the tissues of human beings and animals without excessive toxicity, irritation, allergic response, or other problems or complications commensurate with a reasonable benefit/risk ratio or which have otherwise been approved by the United States Food and Drug Administration as being acceptable for use in humans or domestic animals.

"Pharmaceutically acceptable salt" refers to both acid and base addition salts.

"Therapeutically effective amount" refers to that amount of a compound which, when administered to a subject, is sufficient to effect treatment for a disease or disorder described herein. The amount of a compound which constitutes a "therapeutically effective amount" will vary depending on the compound, the disorder and its severity, and the age of the subject to be treated, but can be determined routinely by one of ordinary skill in the art.

"Subject" refers to a warm blooded animal such as a mammal, preferably a human, or a human child, which is afflicted with, or has the potential to be afflicted with one or more diseases and disorders described herein.

Methods of Preparation

Many general references providing commonly known chemical synthetic schemes and conditions useful for synthesizing the disclosed compounds are available (see, e.g., Smith and March, March's Advanced Organic Chemistry: Reactions, Mechanisms, and Structure, Fifth Ed., Wiley-Interscience, 2001; or Vogel, A Textbook of Practical Organic Chemistry, Including Qualitative Organic Analysis, Fourth Ed., New York: Longman, 1978).

Compounds as described herein can be purified by any of the means known in the art, including chromatographic means, such as HPLC, preparative thin layer chromatography, flash column chromatography and ion exchange chromatography. Any suitable stationary phase can be used, including normal and reversed phases as well as ionic resins. Most typically the disclosed compounds are purified via silica gel and/or alumina chromatography. See, e.g., Introduction to Modern Liquid Chromatography, 2nd Edition, ed.

L. R. Snyder and J. J. Kirkland, John Wiley and Sons, 1979; and Thin Layer Chromatography, ed E. Stahl, Springer-Verlag, New York, 1969.

During any of the processes for preparation of the subject compounds, it may be necessary and/or desirable to protect sensitive or reactive groups on any of the molecules concerned. This may be achieved by means of conventional protecting groups as described in standard works, such as J. F. W. McOmie, "Protective Groups in Organic Chemistry," Plenum Press, London and New York 1973, in T. W. Greene and P. G. M. Wuts, "Protective Groups in Organic Synthesis," Third edition, Wiley, New York 1999, in "The Peptides"; Volume 3 (editors: E. Gross and J. Meienhofer), Academic Press, London and New York 1981, in "Methoden der organischen Chemie," Houben-Weyl, 4.sup.th edition, Vol. 15/I, Georg Thieme Verlag, Stuttgart 1974, in H.-D. Jakubke and H. Jescheit, "Aminosauren, Peptide, Proteine," Verlag Chemie, Weinheim, Deerfield Beach, and Basel 1982, and/or in Jochen Lehmann, "Chemie der Kohlenhydrate: Monosaccharide and Derivate," Georg Thieme Verlag, Stuttgart 1974. The protecting groups may be removed at a convenient subsequent stage using methods known from the art.

The compounds disclosed herein can be made using procedures familiar to the person of ordinary skill in the art and as described herein. For example, compounds of structural formula (I) or (II) can be prepared according to general procedures (below), and/or analogous synthetic procedures. One of skill in the art can adapt the reaction sequences of Examples 1-213 and general procedures to fit the desired target molecule. Of course, in certain situations one of skill in the art will use different reagents to affect one or more of the individual steps or to use protected versions of certain of the substituents. Additionally, one skilled in the art would recognize that compounds of the disclosure can be synthesized using different routes altogether.

EXAMPLES

The preparation of the compounds of the disclosure is illustrated further by the following examples, which are not to be construed as limiting the disclosure in scope or spirit to the specific procedures and compounds described in them. In all cases, unless otherwise specified, the column chromatography is performed using a silica gel solid phase.

General Protocol for Compound Preparation

All reagents were purchased from commercial sources and used without further purification. Microwave synthesis was performed using a Biotage Initiator Microwave Synthesizer (SW version 4.1.2 build 9564). All final compounds were purified using reverse phase chromatography using the following conditions: General HPLC Purification Conditions: C18 column, Mobile Phase and gradient ACN/water with 0.05% TFA or MeOH/water with 0.05% TFA changing from 10:90 to 100:0 over 55 minutes; back to 10:90 over 5 minutes; 8 mL/min; 220 nm and 254 nm detection for 60 minutes. Analytical HPLC Conditions: C18 analytical column (2.1×150 mm), ACN/water with 0.05% TFA or MeOH/water with 0.05% TFA changing from 1:99 to 100:0 over 27 minutes; back to 1:99 over 3 minutes; 1 mL/min; 220 nm and 254 nm detection for 30 minutes. $^{1}$H-NMR spectra were taken on a Bruker AV500 or AV300. Chemical shifts and coupling constants are reported in ppm and Hz respectively. Mass spectrometry was performed on a Bruker Esquire Ion Trap instrument.

Preparation of 1-(3-iodo-4-(methylamino)-1H-pyrazolo[3,4-d]pyrimidin-1-yl)-2-methylpropan-2-ol

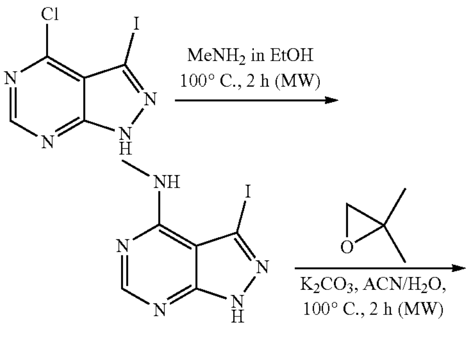

A

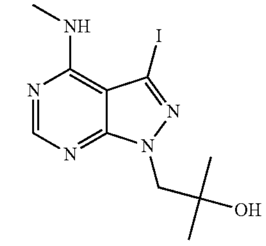

B

A mixture of 4-chloro-3-iodo-1H-pyrazolo[3,4-d]pyrimidine (125 mg, 0.354 mmol) and 33% methyl amine in ethanol (1.2 mL) was heated to 100° C. for 2 hours in a microwave reactor. The crude mixture was concentrated under reduced pressure. Crude 3-iodo-N-methyl-1H-pyrazolo[3,4-d]pyrimidin-4-amine (A) was obtained in 62% yield and was used in the next reaction without further purification. $^{1}$H NMR (500 MHz, MeOD) δ 8.16 (s, 1H), 5.39 (s, 1H), 3.04 (d, J=9.8 Hz, 3H).

Compound A (60 mg, 0.22 mmol) was heated to 150° C. for 3 h with 2,2-dimethyloxirane (40 μL, 2.0 eq) and $K_2CO_3$ (61 mg, 2.0 eq) in a mixture of 8.5:1.5 ACN/water [A=0.64M]. Crude mixture was concentrated under reduced pressure and purified by flash chromatography using 5% MeOH/DCM to obtain 1-(3-iodo-4-(methylamino)-1H-pyrazolo[3,4-d]pyrimidin-1-yl)-2-methylpropan-2-ol (B) with a 57% yield. $^{1}$H NMR (500 MHz, MeOD) δ 8.28 (s, 1H), 4.32 (s, 2H), 4.30 (s, 1H), 3.16 (s, 3H), 1.23 (s, 6H). Calculated for $C_{10}H_{14}IN_5O$ 347.02, found $(M+H)^+$ 348.3.

Preparation of N-Alkylated-5-Iodo Pyrrolopyrimidine Compounds D-K, M

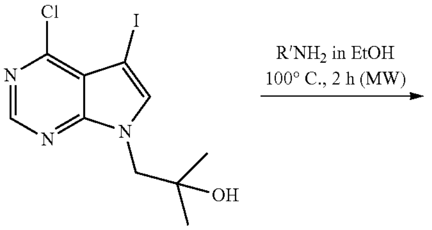

-continued

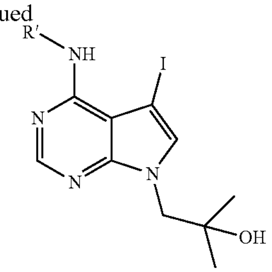

1-(4-chloro-5-iodo-7H-pyrrolo[2,3-d]pyrimidin-7-yl)-2-methylpropan-2-ol (1 eq.) was heated to 100° C. for 2 hours in a microwave with a solution of 33% amine in ethanol (or 3.0 eq of amine dissolved in EtOH, keeping the concentration of the pyrrolopyrimidine compound at 0.3M in solution). The crude mixtures were concentrated under reduced pressure and purified by flash chromatography using 5% MeOH/DCM to obtain the desired N-alkylated-5-iodopyrrolopyrimidine compounds with a yield of 50-90%.

Compound D: 1-(5-iodo-4-(methylamino)-7H-pyrrolo[2,3-d]pyrimidin-7-yl)-2-methylpropan-2-ol

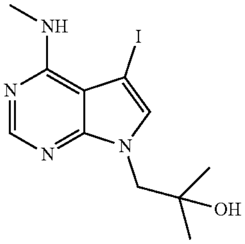 [SMILES: CNc1ncnc2c1c(I)cn2CC(C)(C)O]

$^1$H NMR (500 MHz, $CDCl_3$) δ 8.18 (s, 1H), 7.30 (s, 1H), 4.12 (s, 2H), 3.11 (s, 3H), 1.14 (s, 6H). Calculated for $C_{11}H_{15}IN_4O$ 346.03, found $(M+H)^+$ 347.1.

Compound E: 1-(4-((2-aminoethyl)amino)-5-iodo-7H-pyrrolo[2,3-d]pyrimidin-7-yl)-2-methylpropan-2-ol

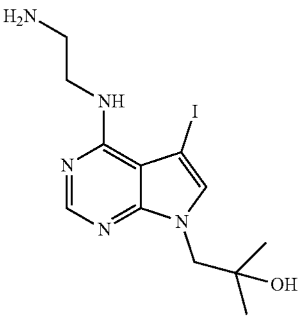 [SMILES: CC(C)(O)Cn1cc(I)c2c(NCCN)ncnc21]

$^1$H NMR (500 MHz, MeOD) δ 8.20 (s, 1H), 7.35 (s, 1H), 4.17 (s, 2H), 3.77-3.66 (m, 2H), 3.01-2.93 (m, 2H), 1.17 (s, 6H). Calculated for $C_{12}H_{18}IN_5O$ 375.06, found $(M+H)^+$ 376.1.

Compound F: 1-(4-((2-hydroxyethyl)amino)-5-iodo-7H-pyrrolo[2,3-d]pyrimidin-7-yl)-2-methylpropan-2-ol

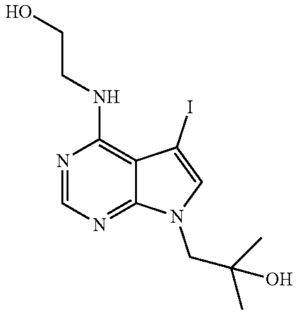 [SMILES: CC(C)(O)Cn1cc(I)c2c(NCCO)ncnc21]

$^1$H NMR (500 MHz, MeOD) δ 8.18 (s, 1H), 7.32 (s, 1H), 4.15 (s, 2H), 3.91-3.84 (m, 2H), 3.83-3.74 (m, 2H), 1.16 (s, 6H). Calculated for $C_{12}H_{17}IN_4O_2$ 376.04, found $(M+H)^+$ 377.0.

Compound G: 1-(4-((2-(2-(2-(2-aminoethoxy)ethoxy)ethoxy)ethyl)amino)-5-iodo-7H-pyrrolo[2,3-d]pyrimidin-7-yl)-2-methylpropan-2-ol

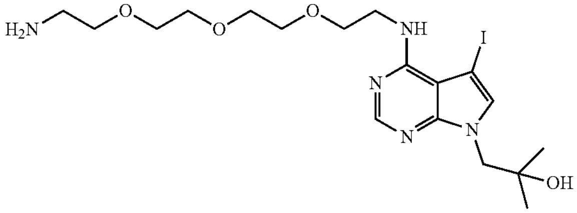 [SMILES: CC(C)(O)Cn1cc(I)c2c(NCCOCCOCCOCCN)ncnc21]

$^1$H NMR (500 MHz, MeOD) δ 8.19 (s, 1H), 7.36 (s, 1H), 4.17 (s, 2H), 3.83-3.68 (m, 13H), 3.35 (s, 1H), 3.14-3.07 (m, 4H), 1.17 (s, 6H). Calculated for $C_{18}H_{30}IN_5O_4$ 507.13, found $(M+H)^+$ 508.2.

Compound H: 1-(4-((2-(2-aminoethoxy)ethyl)amino)-5-iodo-7H-pyrrolo[2,3-d]pyrimidin-7-yl)-2-methylpropan-2-ol

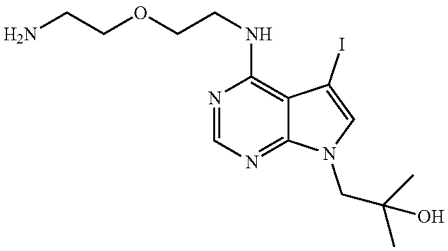 [SMILES: CC(C)(O)Cn1cc(I)c2c(NCCOCCN)ncnc21]

$^1$H NMR (500 MHz, MeOD) δ 8.19 (s, 1H), 7.33 (s, 1H), 4.15 (s, 2H), 3.81-3.77 (m, 5H), 3.61 (t, J=5.3 Hz, 2H), 3.34 (s, 1H), 2.87 (t, J=5.3 Hz, 3H), 1.16 (s, 6H). Calculated for $C_{14}H_{22}IN_5O_2$ 419.08, found $(M+H)^+$ 420.2.

Compound I: 1-(4-((2-ethoxyethyl)amino)-5-iodo-7H-pyrrolo[2,3-d]pyrimidin-7-yl)-2-methylpropan-2-ol

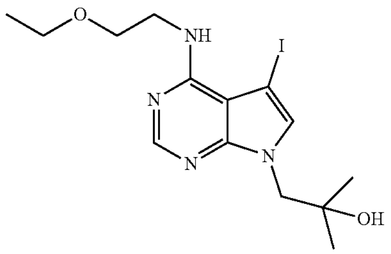 [SMILES: CCOCCNc1ncnc2c1c(I)cn2CC(C)(C)O]

$^1H$ NMR (500 MHz, MeOD) δ 8.16 (s, 1H), 7.27 (s, 1H), 4.10 (s, 2H), 3.79-3.65 (m, 4H), 3.59-3.56 (m, 2H), 1.24 (t, J=6.9 Hz, 3H), 1.14 (s, 6H). Calculated for $C_{14}H_{21}IN_4O_2$ 404.07, found $(M+H)^+$ 405.4.

Compound J: 1-(4-(cyclopropylamino)-5-iodo-7H-pyrrolo[2,3-d]pyrimidin-7-yl)-2-methylpropan-2-ol

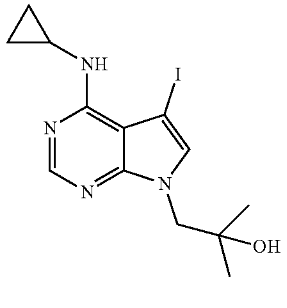 [SMILES: CC(C)(O)Cn1cc(I)c2c(NC3CC3)ncnc21]

$^1H$ NMR (500 MHz, MeOD) δ 8.25 (s, 1H), 7.36 (s, 1H), 4.17 (s, 2H), 2.93-2.91 (m, 1H), 1.17 (s, 6H), 0.95-0.94 (m, 2H), 0.68-0.67 (m, 2H). Calculated for $C_{13}H_{17}IN_4O$ 372.04, found $(M+H)^+$ 373.3.

Compound K: 1-(5-iodo-4-(isopropylamino)-7H-pyrrolo[2,3-d]pyrimidin-7-yl)-2-methylpropan-2-ol

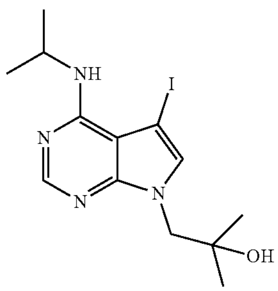 [SMILES: CC(C)Nc1ncnc2c1c(I)cn2CC(C)(C)O]

$^1H$ NMR (500 MHz, MeOD) δ 8.18 (s, 1H), 7.32 (s, 1H), 4.50-4.35 (m, 1H), 4.14 (s, 2H), 1.33 (d, J=7.0 Hz, 6H), 1.18 (s, 6H). Calculated for $C_{13}H_{19}IN_4O$ 374.06, found $(M+H)^+$ 375.0.

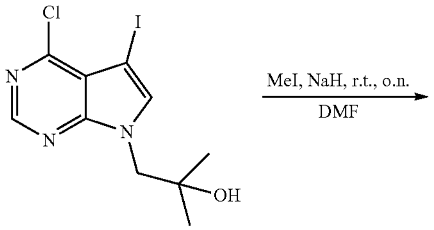

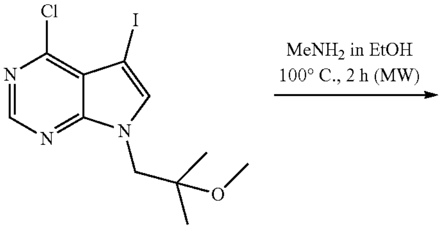

L

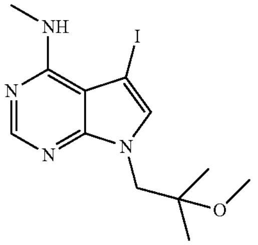

M

To a mixture of 1-(4-chloro-5-iodo-7H-pyrrolo[2,3-d]pyrimidin-7-yl)-2-methylpropan-2-ol (0.5 g, 1 eq) and MeI (267 μL, 3 eq) dissolved in DMF (4.7 mL) maintained at 0° C., NaH (72 mg, 3 eq) was added. The reaction mixture was allowed to stir over night at room temperature. The crude mixture was extracted using EtOAc and water. The organic layer as dried over $Na_2SO_4$ and concentrated under reduced pressure. Crude mixture was purified using 5% MeOH/DCM to obtain 4-chloro-5-iodo-7-(2-methoxy-2-methylpropyl)-7H-pyrrolo[2,3-d]pyrimidine (L) (0.29 g) with a 55% yield. $^1H$ NMR (500 MHz, MeOD) δ 9.03 (s, 1H), 8.38 (s, 1H), 4.05 (s, 3H), 3.37 (s, 3H), 1.23 (s, 6H). Calculated for $C_{11}H_{13}ClIN_3O$ 364.98, found $(M+H)^+$ 366.4.

Compound L (0.26 g, 1 eq) was heated to 100° C. for 2 hours in a microwave with a solution of 33% methylamine in ethanol (2.4 mL). The crude mixture was concentrated under reduced pressure and purified by flash chromatography using 5% MeOH/DCM to obtain 5-iodo-7-(2-methoxy-2-methylpropyl)-N-methyl-7H-pyrrolo[2,3-d]pyrimidin-4-amine (compound M) (0.13 g) with a 53% yield. $^1H$ NMR (500 MHz, MeOD) δ 8.06 (s, 1H), 7.12 (s, 1H), 4.05 (s, 2H), 3.16 (s, 3H), 3.01 (s, 3H), 0.99 (s, 6H). Calculated for $C_{12}H_{17}IN_4O$ 360.04. found $(M+H)^+$ 361.1.

Preparation of O-alkylated-5-iodopyrrolopyrimidine Compounds N-Q

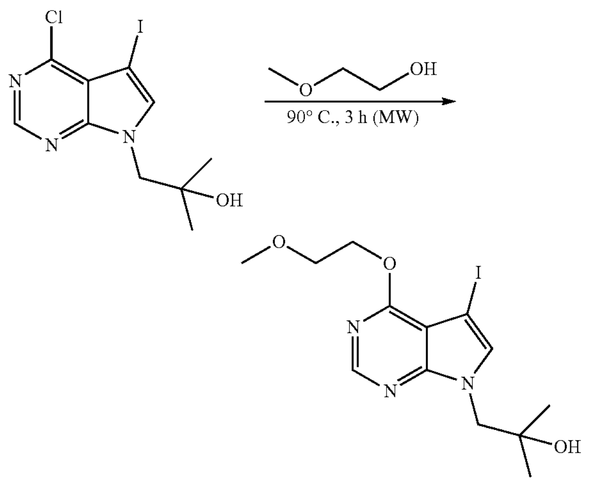

N 1-(4-chloro-5-iodo-7H-pyrrolo[2,3-d]pyrimidin-7-yl)-2-methylpropan-2-ol (0.3 g, 1 eq) was heated to 90° C. for 3 h in an microwave reactor with 2-methoxyethanol (0.33 mL, 4.85 eq) and KOH (0.102 g, 1.8 eq). The mixture was concentrated under reduced pressure and water and EtOAc were added. The organic layer was separated, dried over $Na_2SO_4$ and concentrated. The crude product was purified by flash chromatography using 50% EtOAc/Hexanes to obtain 1-(5-iodo-4-(2-methoxyethoxy)-7H-pyrrolo[2,3-d]pyrimidin-7-yl)-2-methylpropan-2-ol (compound N) with a 40% yield. $^1$H NMR (500 MHz, MeOD) δ 8.35 (s, 1H), 7.46 (s, 1H), 4.88 (t, J=18 Hz, 2H), 4.22 (s, 2H), 3.87 (t, J=4.5 Hz, 2H), 3.50 (s, 3H), 1.16 (s, 6H). Calculated for $C_{13}H_{18}IN_3O_3$ 391.04, found $(M+H)^+$ 392.5.

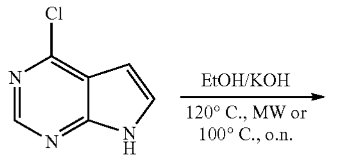

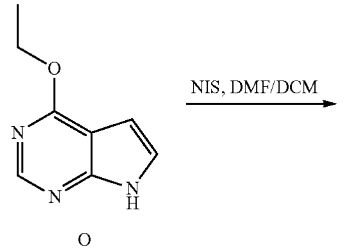

O

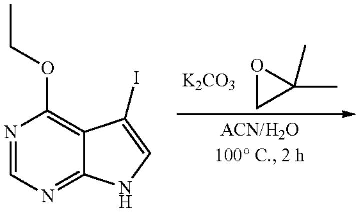

P

-continued

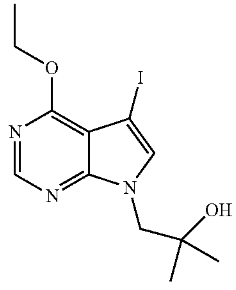

Q 4-chloro-7H-pyrrolo[2,3-d]pyrimidine (1.0 g, 1 eq) was heated with KOH (0.5 g, 2.1 eq) in EtOH (5.5 mL) for 3 h at 120° C. in a microwave reactor. The mixture was concentrated, and water was added to precipitate out crude 4-ethoxy-7H-pyrrolo[2,3-d]pyrimidine (compound 0). Product was dried under vacuum to obtain a 91% crude yield. $^1$H NMR (500 MHz, MeOD) δ 8.37 (s, 1H), 7.28 (d, J=3.5 Hz, 1H), 6.58 (d, J=3.5 Hz, 1H), 4.63 (q, J=7.1 Hz, 2H), 1.52 (t, J=7.1 Hz, 3H). Calculated for $C_8H_9N_3O$ 163.08, found $(M+H)^+$ 164.1.

Compound O (0.25 g, 1.0 eq) and NIS (0.24 g, 1.1 eq) was stirred at room temperature for 2 h in DCM (7.65 mL) and 4% of DMF (0.3 mL). Crude mixture was extracted using EtOAc and water. The dried organic layer was concentrated to obtain 4-ethoxy-5-iodo-7H-pyrrolo[2,3-d]pyrimidine (compound P) with a 97% crude yield. $^1$H NMR (300 MHz, MeOD) δ 8.30 (s, 1H), 7.34 (s, 1H), 4.57 (q, J=7.1 Hz, 2H), 1.48 (t, J=7.1 Hz, 3H). Calculated for $C_8H_8IN_3O$ 288.97, found $(M+H)^+$ 290.1.

Compound P (0.2 g, 1.0 eq) was heated to 100° C. for 2 h with 2,2-dimethyloxirane (124 μL, 2.0 eq) and K2CO3 (0.19 g, 2.0 eq) in a mixture of 8.5:1.5 ACN/water [P=0.64M]. Crude mixture was concentrated and purified by flash chromatography using 50% EtOAc/Hexanes to obtain 1-(4-ethoxy-5-iodo-7H-pyrrolo[2,3-d]pyrimidin-7-yl)-2-methylpropan-2-ol (compound Q) with a 24% yield. $^1$H NMR (500 MHz, MeOD) δ 8.34 (s, 1H), 7.44 (s, 1H), 4.58 (q, J=7.1 Hz, 2H), 4.21 (s, 2H), 1.55-1.45 (t, 3H), 1.20 (s, 6H). Calculated for $C_{12}H_{16}IN_3O_2$ 361.03, found $(M+H)^+$ 362.5.

General Suzuki Coupling for Preparation of Compounds 1-45

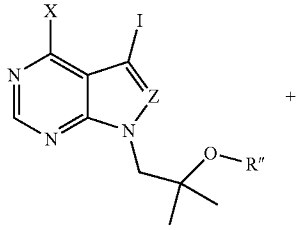

+

X = $NH_2$, NHR′ or OR
Z = C or N

-continued

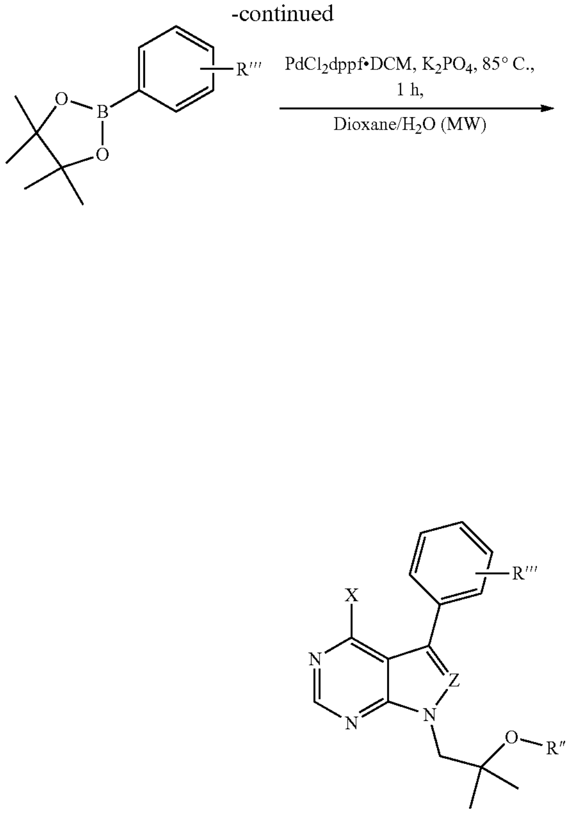

The appropriate 3-iodo pyrazolopyrimidine or 5-iodo pyrrolopyrimidine compound (1.0 eq), the desired boronic acid or the boronate pinacole ester (1.5 eq), PdCl$_2$.dppf.DCM (0.05 eq), K$_3$PO$_4$ (2.2 eq) were heated to 85° C. for 1 hour in a microwave using a 3:1 mixture of dioxane/water as the solvent. The crude mixture was concentrated and purified by HPLC using ACN/water as the mobile phase to obtain the final compounds.

Example 1: 1-(3-(6-cyclopropoxynaphthalen-2-yl)-4-(methylamino)-1H-pyrazolo[3,4-d]pyrimidin-1-yl)-2-methylpropan-2-ol (Compound 1)

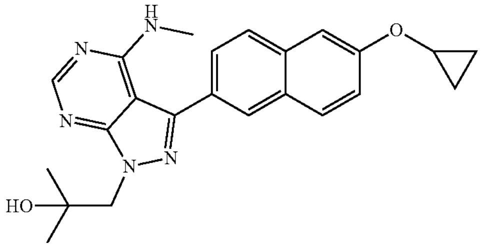 [SMILES: CNc1ncnc2c1c(-c1ccc3cc(OC4CC4)ccc3c1)nn2CC(C)(C)O]

$^1$H NMR (500 MHz, CDCl$_3$) δ 8.47 (s, 1H), 8.05 (s, 1H), 7.94 (d, J=8.4 Hz, 1H), 7.84 (d, J=9.1 Hz, 1H), 7.73 (d, J=8.4 Hz, 1H), 7.53 (s, 1H), 7.25 (m, 1H), 5.52 (q, J=4.8 Hz, 1H), 4.48 (s, 2H), 3.91 (m, 1H), 3.09 (d, J=4.8 Hz, 3H), 1.26 (s, 6H), 0.90-0.88 (m, 4H). Calculated for $C_{23}H_{25}N_5O_2$ 403.2, found (M+H)$^+$ 404.4. HPLC purified product was determined to be ≥95% pure under 220 nm and 254 nm detection in analytical HPLC under both solvent systems.

Example 2: 1-(5-(6-cyclopropoxynaphthalen-2-yl)-4-(2-methoxyethoxy)-7H-pyrrolo[2,3-d]pyrimidin-7-yl)-2-methylpropan-2-ol (Compound 2)

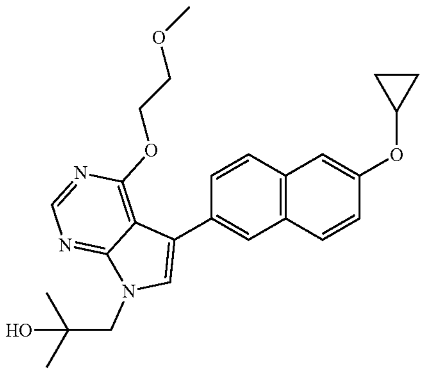 [SMILES: COCCOc1ncnc2c1c(-c1ccc3cc(OC4CC4)ccc3c1)cn2CC(C)(C)O]

$^1$H NMR (500 MHz, MeOD) δ 8.40 (s, 1H), 8.16 (s, 1H), 7.81-7.75 (m, 3H), 7.57 (s, 1H), 7.49 (d, J=2.3 Hz, 1H), 7.13 (dd, J=8.9, 2.4 Hz, 1H), 4.70-4.61 (m, 2H), 4.29 (s, 2H), 3.91 (dt, J=9.0, 3.0 Hz, 1H), 3.76-3.74 (m, 2H), 3.31 (s, 3H), 1.22 (s, 6H), 0.89-0.85 (m, 2H), 0.78-0.75 (m, 2H). Calculated for $C_2H_{29}N_3O_4$ 447.2, found (M+H)$^+$ 448.4. HPLC purified product was determined to be 100% pure under 220 nm and 254 nm detection in analytical HPLC under both solvent systems.

Example 3: 1-(5-(6-ethoxynaphthalen-2-yl)-4-(2-methoxyethoxy)-7H-pyrrolo[2,3-d]pyrimidin-7-yl)-2-methylpropan-2-ol (Compound 3)

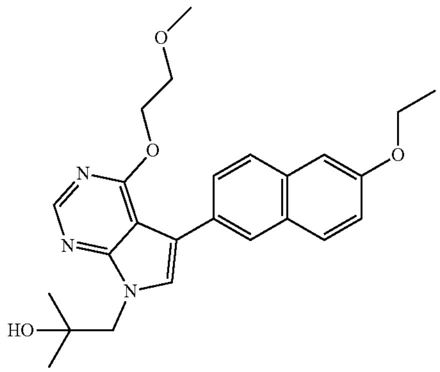 [SMILES: CCOc1ccc2cc(-c3cn(CC(C)(C)O)c4ncnc(OCCOC)c34)ccc2c1]

$^1$H NMR (500 MHz, MeOD) δ 8.43 (s, 1H), 8.17 (s, 1H), 7.81-7.75 (m, 3H), 7.59 (s, 1H), 7.23 (d, J=2.3 Hz, 1H), 7.15 (dd, J=8.9, 2.4 Hz, 1H), 4.68-4.67 (m, 2H), 4.31 (s, 2H), 4.19 (q, J=7.0 Hz, 2H), 3.78-3.76 (m, 2H), 3.38 (s, 3H), 1.49 (t, J=7.0 Hz, 3H), 1.24 (s, 6H). Calculated for $C_2H2N_3O_4$ 435.2, found (M+H)$^+$ 436.4. HPLC purified product was determined to be 100% pure under 220 nm and 254 nm detection in analytical HPLC under both solvent systems.

Example 4: 1-(5-(biphenyl-4-yl)-4-(2-methoxyethoxy)-7H-pyrrolo[2,3-d]pyrimidin-7-yl)-2-methylpropan-2-ol (Compound 4)

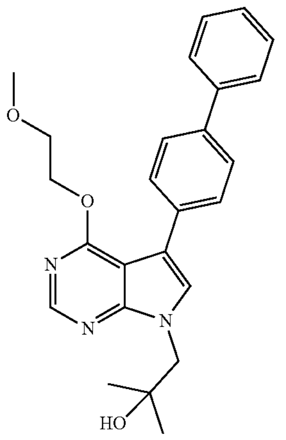 [SMILES: COCCOc1ncnc2c1c(-c1ccc(-c3ccccc3)cc1)cn2CC(C)(C)O]

$^1$H NMR (500 MHz, MeOD) δ 8.40 (s, 1H), 7.83-7.81 (m, 2H), 7.65 (t, J=8.8 Hz, 4H), 7.55-7.54 (m, 1H), 7.45 (t, J=7.6 Hz, 2H), 7.35-7.32 (m, 1H), 4.67-4.65 (m, 2H), 4.29 (s, 2H), 3.79-3.77 (m, 2H), 3.39 (s, 3H), 1.22 (s, 6H). Calculated for $C_{25}H_{27}N_3O_3$ 417.2, found $(M+H)^+$ 418.4. HPLC purified product was determined to be 100% pure under 220 nm and 254 nm detection in analytical HPLC under both solvent systems.

Example 5: 1-(4-ethoxy-5-(6-ethoxynaphthalen-2-yl)-7H-pyrrolo[2,3-d]pyrimidin-7-yl)-2-methylpropan-2-ol (Compound 5)

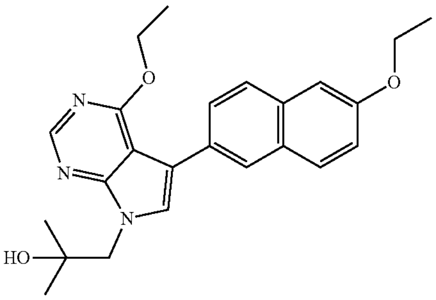 [SMILES: CCOc1ccc2cc(-c3cn(CC(C)(C)O)c4ncnc(OCC)c34)ccc2c1]

$^1$H NMR (500 MHz, MeOD) δ 8.40 (s, 1H), 8.13 (s, 1H), 7.77-7.75 (m, 3H), 7.56 (s, 1H), 7.23 (d, J=2.2 Hz, 1H), 7.13 (dd, J=8.9, 2.4 Hz, 1H), 4.59 (q, J=7.1 Hz, 2H), 4.30 (s, 2H), 4.18 (q, J=7.0 Hz, 2H), 1.48 (t, J=7.0 Hz, 3H), 1.43 (t, J=7.1 Hz, 3H), 1.23 (s, 6H). Calculated for $C_{24}H_{27}N_3O_3$ 405.2, found $(M+H)^+$ 406.4. HPLC purified product was determined to be ≥95% pure under 220 nm and 254 nm detection in analytical HPLC under both solvent systems.

Example 6: 1-(5-(6-cyclopropoxynaphthalen-2-yl)-4-ethoxy-7H-pyrrolo[2,3-d]pyrimidin-7-yl)-2-methylpropan-2-ol (Compound 6)

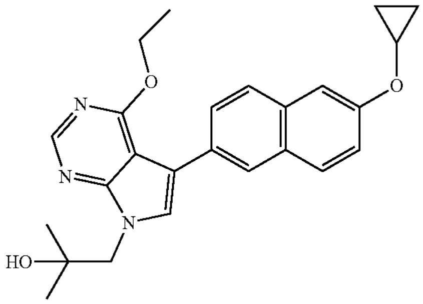 [SMILES: CCOc1ncnc2c1c(-c1ccc3cc(OC4CC4)ccc3c1)cn2CC(C)(C)O]

$^1$H NMR (500 MHz, MeOD) δ 8.40 (s, 1H), 8.16 (s, 1H), 7.81-7.77 (m, 3H), 7.58-7.57 (m, 1H), 7.52 (s, 1H), 7.15 (d, J=8.6 Hz, 1H), 4.63-4.57 (m, 2H), 4.32 (s, 2H), 3.97-3.91 (m, 1H), 1.46-1.42 (m, 3H), 1.23 (s, 6H), 0.91-0.86 (m, 2H), 0.81-0.77 (m, 2H). Calculated for $C_{25}H_{27}N_3O_3$ 417.2, found $(M+H)^+$ 418.6. HPLC purified product was determined to be ≥94% pure under 220 nm and 254 nm detection in analytical HPLC under both solvent systems.

Example 7: 1-(4-(2-methoxyethoxy)-5-(naphthalen-2-yl)-7H-pyrrolo[2,3-d]pyrimidin-7-yl)-2-methylpropan-2-ol (Compound 7)

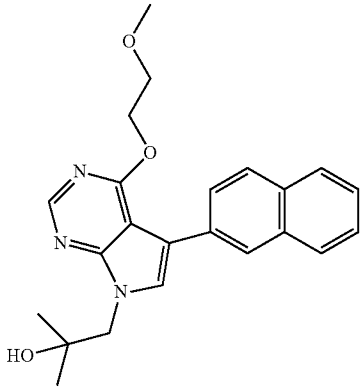 [SMILES: COCCOc1ncnc2c1c(-c1ccc3ccccc3c1)cn2CC(C)(C)O]

$^1$H NMR (500 MHz, MeOD) δ 8.42 (s, 1H), 8.27 (s, 1H), 7.91 (d, J=8.0 Hz, 1H), 7.87-7.85 (m, 3H), 7.64 (s, 1H), 7.50-7.44 (m, 2H), 4.68 (t, J=5.0 Hz, 2H), 4.32 (s, 2H), 3.77 (t, J=5.0 Hz, 2H), 3.32 (s, 3H), 1.24 (s, 6H). Calculated for $C_{23}H_{25}N_3O_3$ 391.2, found $(M+H)^+$ 392.4. HPLC purified product was determined to be ≥94% pure under 220 nm and 254 nm detection in analytical HPLC under both solvent systems.

Example 8: 1-(4-(2-ethoxyethylamino)-5-(naphthalen-2-yl)-7H-pyrrolo[2,3-d]pyrimidin-7-yl)-2-methylpropan-2-ol (Compound 8)

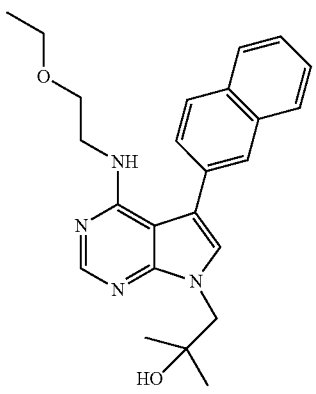 [SMILES: CCOCCNc1ncnc2c1c(-c1ccc3ccccc3c1)cn2CC(C)(C)O]

$^1$H NMR (500 MHz, MeOD) δ 8.37 (s, 1H), 8.06-8.03 (m, 2H), 7.97-7.95 (m, 2H), 7.66 (d, J=10.0 Hz, 1H), 7.60-7.55 (m, 3H), 4.35 (s, 2H), 3.65 (t, J=4.8 Hz, 2H), 3.57 (t, J=4.9 Hz, 2H), 3.21 (q, J=7.0 Hz, 2H), 1.26 (s, 6H), 0.69 (t, J=7.0 Hz, 3H). Calculated for $C_{24}H_{28}N_4O_2$ 404.2, found $(M+H)^+$ 405.5. HPLC purified product was determined to be ≥92% pure under 220 nm and 254 nm detection in analytical HPLC under both solvent systems.

Example 9: trans-cyclooct-4-enyl 2-(5-(6-cyclopropoxynaphthalen-2-yl)-7-(2-hydroxy-2-methylpropyl)-7H-pyrrolo[2,3-d]pyrimidin-4-ylamino)ethylcarbamate (Compound 9)

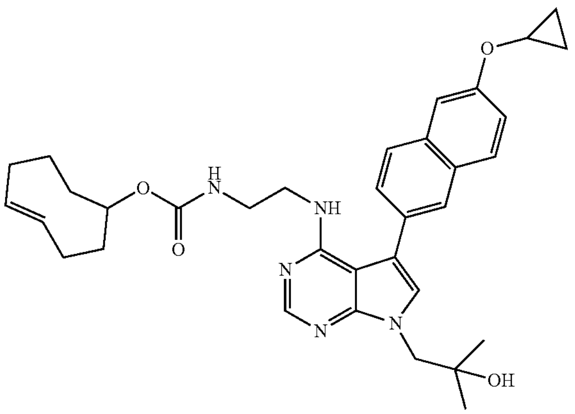 [SMILES: CC(C)(O)Cn1cc(-c2ccc3cc(OC4CC4)ccc3c2)c2c(NCCNC(=O)OC3CC/C=C/CCC3)ncnc21]

$^1$H NMR (500 MHz, MeOD) δ 8.35 (s, 1H), 7.98-7.95 (m, 2H), 7.91-7.89 (m, 1H), 7.67-7.59 (m, 2H), 7.53 (s, 1H), 7.23 (d, J=8.5 Hz, 1H), 5.68-5.38 (m, 2H), 4.33 (s, 2H), 4.19-4.13 (m, 1H), 3.98-3.94 (m, 1H), 3.66-3.56 (m, 2H), 2.35-2.01 (m, 4H), 1.95-1.71 (m, 4H), 1.63-1.42 (m, 4H), 1.26 (s, 6H), 0.93-0.91 (m, 2H), 0.83-0.77 (m, 2H). Calculated for $C_3H_{41}N_5O_4$ 583.3, found $(M+H)^+$ 584.6. HPLC purified product was determined to be 100% pure under 220 nm and 254 nm detection in analytical HPLC under both solvent systems.

Example 10: 2-(3-(but-3-ynyl)-3H-diazirin-3-yl)ethyl 2-(5-(6-ethoxynaphthalen-2-yl)-7-(2-hydroxy-2-methylpropyl)-7H-pyrrolo[2,3-d]pyrimidin-4-ylamino)ethylcarbamate (Compound 10)

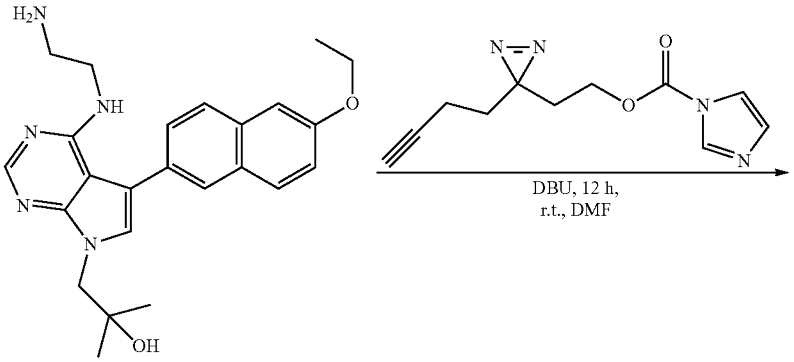

23

-continued

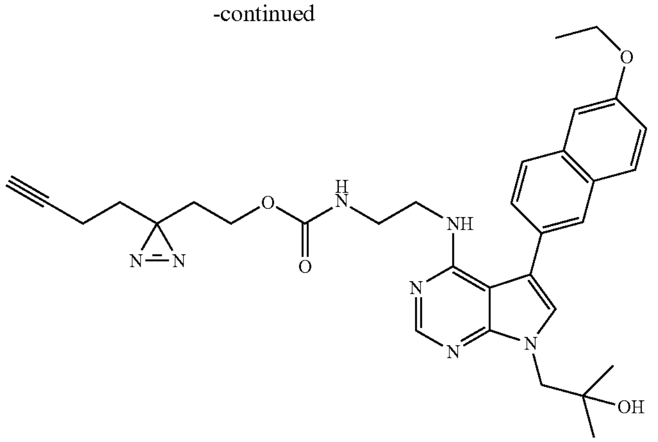

10

Compound 23 (9.3 mg, 3.0 eq) and 1,8-Diazabicyclo (5.4.0)undec-7-ene (6.4 μL, 5.3 eq) were added in sequence to a stirred mixture of 2-(3-(but-3-yn-1-yl)-3H-diazirin-3-yl)ethyl 1H-imidazole-1-carboxylate (1.7 mg, 1 eq; *Biochemistry* 2018, 57, 2, 186-193; 2017) in DMF (92 μL). The mixture was stirred for 12 hours at room temperature. The crude reaction mixture was purified by HPLC using ACN/water as the mobile phase to obtain 2-(3-(but-3-ynyl)-3H-diazirin-3-yl)ethyl 2-(5-(6-ethoxynaphthalen-2-yl)-7-(2-hydroxy-2-methylpropyl)-7H-pyrrolo[2,3-d]pyrimidin-4-ylamino)ethylcarbamate (10) with a 90% yield: $^1$H NMR (500 MHz, MeOD) δ 8.38 (s, 1H), 7.97-7.94 (m, 2H), 7.89 (d, J=8.4 Hz, 1H), 7.61 (d, J=8.5 Hz, 1H), 7.52 (s, 1H), 7.33 (s, 1H), 7.24 (d, J=8.5 Hz, 1H), 4.34 (s, 2H), 4.23 (q, J=7.1 Hz, 2H), 3.78 (t, J=6.5 Hz, 2H), 3.66 (t, J=7.6 Hz, 2H), 3.39 (t, J=10.0 Hz, 2H), 2.29 (t, J=5.6 Hz, 1H), 1.98 (t, J=9.1 Hz, 2H), 1.64-1.55 (m, 4H), 1.51 (t, J=7.0 Hz, 3H), 1.27 (s, 6H). Calculated for $C_{32}H_{37}N_7O_4$ 583.3, found $(M+H)^+$ 584.2. HPLC purified product was determined to be 100% pure under 220 nm and 254 nm detection in analytical HPLC under both solvent systems.

Example 11: 1-(5-(6-ethoxynaphthalen-2-yl)-4-(methylamino)-7H-pyrrolo[2,3-d]pyrimidin-7-yl)-2-methylpropan-2-ol (Compound 11)

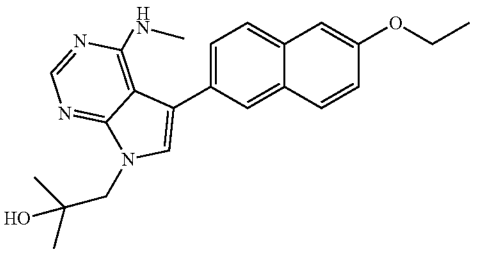 [SMILES: CCOc1ccc2cc(-c3cn(CC(C)(C)O)c4ncnc(NC)c34)ccc2c1]

$^1$H NMR (500 MHz, MeOD) δ 8.36 (s, 1H), 7.94 (d, J=7.2 Hz, 2H), 7.86 (d, J=9.0 Hz, 1H), 7.59 (d, J=9.0 Hz, 1H), 7.56 (s, 1H), 7.33 (s, 1H), 7.23 (dd, J=8.9, 2.0 Hz, 1H), 4.36 (s, 2H), 4.22 (q, J=7.0 Hz, 2H), 3.12 (s, 3H), 1.50 (t, J=7.0 Hz, 3H), 1.27 (s, 6H). Calculated for $C_{23}H_{26}N_4O_2$ 390.2, found $(M+H)^+$ 391.4. HPLC purified product was determined to be 100% pure under 220 nm and 254 nm detection in analytical HPLC under both solvent systems.

Example 12: 1-(3-(biphenyl-4-yl)-4-(methylamino)-1H-pyrazolo[3,4-d]pyrimidin-1-yl)-2-methylpropan-2-ol (Compound 12)

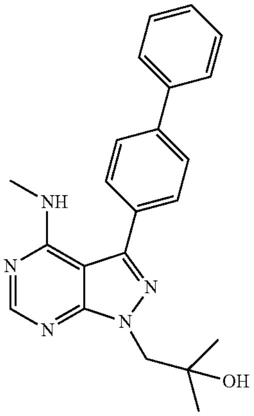 [SMILES: CNc1ncnc2c1c(-c1ccc(-c3ccccc3)cc1)nn2CC(C)(C)O]

$^1$H NMR (500 MHz, MeOD) δ 8.45 (s, 1H), 7.88 (d, J=8.1 Hz, 2H), 7.82 (d, J=8.1 Hz, 2H), 7.75 (d, J=7.6 Hz, 2H), 7.52 (m, 2H), 7.42 (m, 1H), 4.50 (s, 2H), 3.19 (s, 3H), 1.34 (s, 6H). Calculated for $C_{22}H_{23}N_5O$ 373.2, found $(M+H)^+$ 374.4. HPLC purified product was determined to be 100% pure under 220 nm and 254 nm detection in analytical HPLC under both solvent systems.

Example 13: 1-(5-(biphenyl-4-yl)-4-(methylamino)-7H-pyrrolo[2,3-d]pyrimidin-7-yl)-2-methylpropan-2-ol (Compound 13)

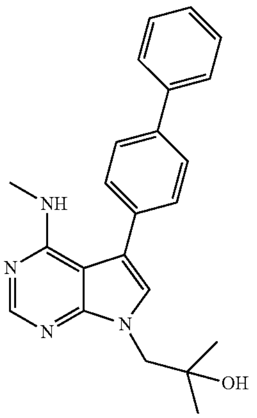 [SMILES: CNc1ncnc2c1c(-c1ccc(-c3ccccc3)cc1)cn2CC(C)(C)O]

$^1$H NMR (500 MHz, MeOD) δ 8.37 (s, 1H), 7.83 (d, J=8.1 Hz, 2H), 7.73 (d, J=7.6 Hz, 2H), 7.63 (d, J=8.1 Hz, 2H), 7.55 (s, 1H), 7.50 (m, 2H), 7.40 (m, 1H), 4.36 (s, 2H), 3.17 (s, 3H), 1.26 (s, 6H). Calculated for $C_{23}H_{24}N_4O$ 372.2, found $(M+H)^+$ 373.5. HPLC purified product was determined to be 100% pure under 220 nm and 254 nm detection in analytical HPLC under both solvent systems.

Example 14: 1-(3-(6-ethoxynaphthalen-2-yl)-4-(methylamino)-1H-pyrazolo[3,4-d]pyrimidin-1-yl)-2-methylpropan-2-ol (Compound 14)

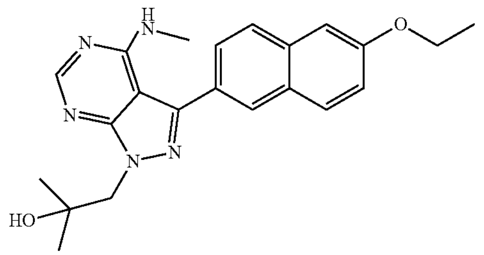 [SMILES: CCOc1ccc2cc(-c3nn(CC(C)(C)O)c4ncnc(NC)c34)ccc2c1]

$^1$H NMR (500 MHz, MeOD) δ 8.40 (s, 1H), 8.10 (s, 1H), 7.96 (d, J=5.0 Hz, 1H), 7.88 (d, J=9.0 Hz, 1H), 7.74 (d, J=8.4 Hz, 1H), 7.33 (s, 1H), 7.23 (d, J=8.9 Hz, 1H), 4.46 (s, 2H), 4.21 (q, J=6.9 Hz, 2H), 3.11 (s, 3H), 1.48 (t, J=6.9 Hz, 3H), 1.31 (s, 6H). Calculated for $C_{22}H_{25}N_5O_2$ 391.2, found $(M+H)^+$ 392.5. HPLC purified product was determined to be 100% pure under 220 nm and 254 nm detection in analytical HPLC under both solvent systems.

Example 15: 1-(5-(6-cyclopropoxynaphthalen-2-yl)-4-(methylamino)-7H-pyrrolo[2,3-d]pyrimidin-7-yl)-2-methylpropan-2-ol (Compound 15)

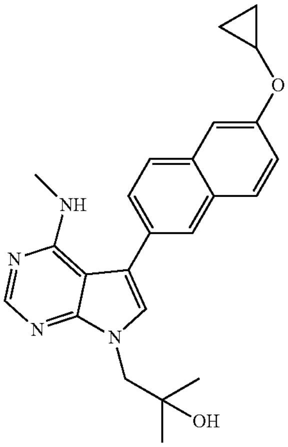 [SMILES: CNc1ncnc2c1c(-c1ccc3cc(OC4CC4)ccc3c1)cn2CC(C)(C)O]

$^1$H NMR (500 MHz, MeOD) δ 8.36 (s, 1H), 7.98-7.94 (m, 2H), 7.87 (d, J=8.9 Hz, 1H), 7.62-7.60 (m, 2H), 7.57 (s, 1H), 7.24 (d, J=8.9, 1H), 4.37 (s, 2H), 4.01-3.89 (m, 1H), 3.13 (s, 3H), 1.27 (s, 6H), 0.94-0.90 (m, 2H), 0.80-0.79 (m, 2H). Calculated for $C_{24}H_{26}N_4O_2$ 402.2, found $(M+H)^+$ 403.4. HPLC purified product was determined to be 100% pure under 220 nm and 254 nm detection in analytical HPLC under both solvent systems.

Example 16: 1-(3-(3-isopropylphenyl)-4-(methylamino)-1H-pyrazolo[3,4-d]pyrimidin-1-yl)-2-methylpropan-2-ol (Compound 16)

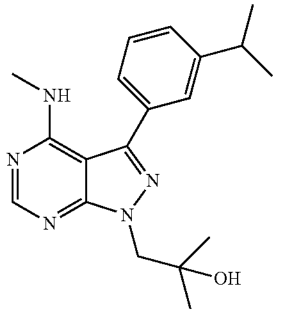 [SMILES: CNc1ncnc2c1c(-c1cccc(C(C)C)c1)nn2CC(C)(C)O]

$^1$H NMR (500 MHz, MeOD) δ 8.43 (s, 1H), 7.61 (s, 1H), 7.61-7.52 (m, 2H), 7.51-7.44 (m, 1H), 4.48 (s, 2H), 3.15 (s, 3H), 3.09-3.03 (m, 1H), 1.35 (d, J=6.9 Hz, 6H), 1.32 (s, 6H). Calculated for $C_{19}H_{25}N_5O$ 339.2, found $(M+H)^+$ 340.5. HPLC purified product was determined to be 100% pure under 220 nm and 254 nm detection in analytical HPLC under both solvent systems.

Example 17: 1-(5-(6-cyclopropoxynaphthalen-2-yl)-4-(cyclopropylamino)-7H-pyrrolo[2,3-d]pyrimidin-7-yl)-2-methylpropan-2-ol (Compound 17)

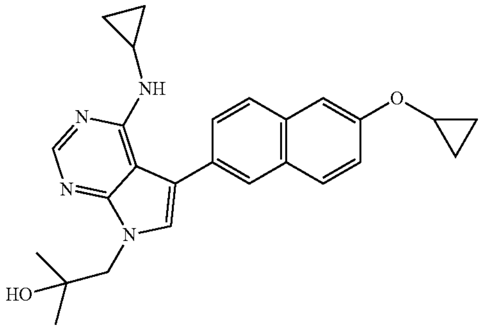 [SMILES: CC(C)(O)Cn1cc(-c2ccc3cc(OC4CC4)ccc3c2)c2c(NC3CC3)ncnc21]

$^1$H NMR (500 MHz, MeOD) δ 8.44 (s, 1H), 7.97 (d, J=10.0 Hz, 1H), 7.92 (s, 1H), 7.85 (d, J=8.9 Hz, 1H), 7.63-7.58 (m, 3H), 7.25 (d, J=8.9 Hz, 1H), 4.39 (s, 2H), 4.03-3.95 (m, 1H), 2.86-2.68 (m, 1H), 1.27 (s, 6H), 1.09-1.05 (m, 2H), 0.95-0.913 (m, 2H), 0.84-0.79 (m, 4H). Calculated for $C_{26}H_{28}N_4O_2$ 428.2, found $(M+H)^+$ 429.3. HPLC purified product was determined to be ≥92% pure under 220 nm and 254 nm detection in analytical HPLC under both solvent systems.

Example 18: 5-(6-ethoxynaphthalen-2-yl)-7-(2-methoxy-2-methylpropyl)-N-methyl-7H-pyrrolo[2,3-d]pyrimidin-4-amine (Compound 18)

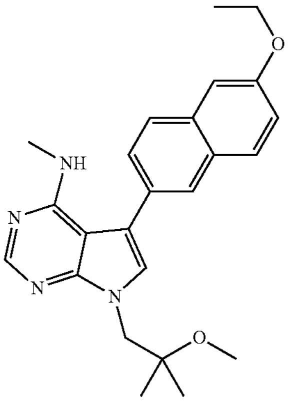 [SMILES: CCOc1ccc2cc(-c3cn(CC(C)(C)OC)c4ncnc(NC)c34)ccc2c1]

$^1$H NMR (500 MHz, MeOD) δ 8.36 (s, 1H), 7.95-7.92 (m, 2H), 7.86 (d, J=9.0 Hz, 1H), 7.58 (d, J=8.2 Hz, 1H), 7.49 (s, 1H), 7.33 (s, 1H), 7.23 (d, J=8.9 Hz, 1H), 4.41 (s, 2H), 4.22 (q, J=7.0 Hz, 2H), 3.34 (s, 3H), 3.11 (s, 3H), 1.50 (t, J=6.8 Hz, 3H), 1.23 (s, 6H). Calculated for $C_{24}H_{28}N_4O_2$ 404.2, found $(M+H)^+$ 405.4. HPLC purified product was determined to be 100% pure under 220 nm and 254 nm detection in analytical HPLC under both solvent systems.

Example 19: 1-(3-(biphenyl-3-yl)-4-(methylamino)-1H-pyrazolo[3,4-d]pyrimidin-1-yl)-2-methylpropan-2-ol (Compound 19)

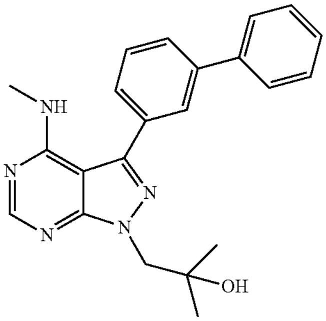 [SMILES: CNc1ncnc2c1c(-c1cccc(-c3ccccc3)c1)nn2CC(C)(C)O]

$^1$H NMR (500 MHz, MeOD) δ 8.42 (s, 1H), 7.95 (s, 1H), 7.83-7.82 (m, 1H), 7.71-7.63 (m, 4H), 7.50-7.47 (m, 2H), 7.41-7.38 (m, 1H), 4.47 (s, 2H), 3.15 (s, 3H), 1.31 (s, 6H). Calculated for $C_{22}H_{23}N_5O$ 373.2, found $(M+H)^+$ 374.4. HPLC purified product was determined to be 100% pure under 220 nm and 254 nm detection in analytical HPLC under both solvent systems.

Example 20: 1-(3-(3-fluorobiphenyl-4-yl)-4-(methylamino)-1H-pyrazolo[3,4-d]pyrimidin-1-yl)-2-methylpropan-2-ol (Compound 20)

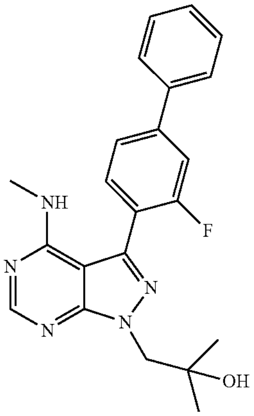 [SMILES: CNc1ncnc2c1c(-c1ccc(-c3ccccc3)cc1F)nn2CC(C)(C)O]

$^1$H NMR (500 MHz, MeOD) δ 8.41 (s, 1H), 7.72-7.69 (m, 1H), 7.65-7.63 (m, 2H), 7.62-7.54 (m, 2H), 7.51-7.48 (m, 2H), 7.44-7.41 (m, 1H), 4.46 (s, 2H), 3.15 (s, 3H), 1.30 (s, 6H). Calculated for $C_{22}H_{22}FN_5O$ 391.2, found $(M+H)^+$ 392.4. HPLC purified product was determined to be ≥96% pure under 220 nm and 254 nm detection in analytical HPLC under both solvent systems.

Example 21: 5-(3-isopropylphenyl)-7-(2-methoxy-2-methylpropyl)-N-methyl-7H-pyrrolo[2,3-d]pyrimidin-4-amine (Compound 21)

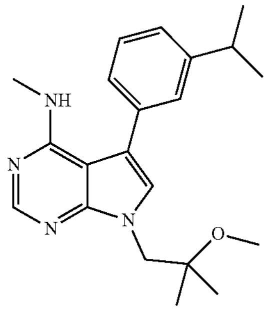 [SMILES: CNc1ncnc2c1c(-c1cccc(C(C)C)c1)cn2CC(C)(C)OC]

$^1$H NMR (500 MHz, MeOD) δ 8.34 (s, 1H), 7.48-7.45 (m, 2H), 7.38-7.35 (m, 3H), 4.38 (s, 2H), 3.30 (s, 3H), 3.13 (s, 3H), 3.04-2.99 (m, 1H), 1.33 (d, J=6.9 Hz, 6H), 1.22 (s, 6H). Calculated for $C_{21}H_{28}N_4O$ 352.2, found $(M+H)^+$ 353.3. HPLC purified product was determined to be 100% pure under 220 nm and 254 nm detection in analytical HPLC under both solvent systems.

Example 22: 5-(3-chlorophenyl)-7-(2-methoxy-2-methylpropyl)-N-methyl-7H-pyrrolo[2,3-d]pyrimidin-4-amine (Compound 22)

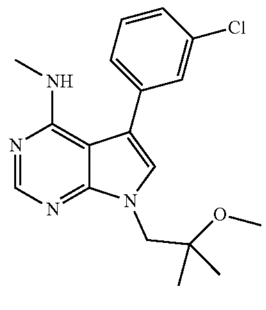 [SMILES: CNc1ncnc2c1c(-c1cccc(Cl)c1)cn2CC(C)(C)OC]

$^1$H NMR (500 MHz, MeOD) δ 8.35 (s, 1H), 7.57-7.38 (m, 5H), 4.37 (s, 2H), 3.30 (s, 3H), 3.14 (s, 3H), 1.20 (s, 6H). Calculated for $C_{18}H_{21}ClN_4O$ 344.1, found $(M+H)^+$ 345.0. HPLC purified product was determined to be ≥96% pure under 220 nm and 254 nm detection in analytical HPLC under both solvent systems.

Example 23: 1-(4-(2-aminoethylamino)-5-(6-ethoxynaphthalen-2-yl)-7H-pyrrolo[2,3-d]pyrimidin-7-yl)-2-methylpropan-2-ol (Compound 23)

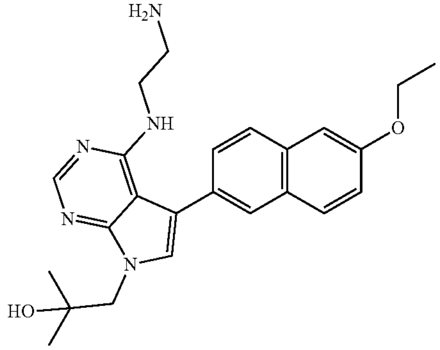 [SMILES: CCOc1ccc2cc(-c3cn(CC(C)(C)O)c4ncnc(NCCN)c34)ccc2c1]

$^1$H NMR (500 MHz, MeOD) δ 8.40 (s, 1H), 7.93-7.90 (m, 2H), 7.84 (d, J=8.6 Hz, 1H), 7.61 (d, J=7.4 Hz, 1H), 7.43-7.40 (m, 1H), 7.31-7.29 (m, 1H), 7.21 (d, J=8.7 Hz, 1H), 4.28 (s, 2H), 4.20 (q, J=5 Hz, 2H), 3.87-3.77 (m, 2H), 3.21-3.14 (m, 2H), 1.48 (t, J=10.0 Hz, 3H), 1.24 (s, 6H). Calculated for $C_{24}H_{29}N_5O_2$ 419.2, found $(M+H)^+$ 420.5. HPLC purified product was determined to be 100% pure under 220 nm and 254 nm detection in analytical HPLC under both solvent systems.

Example 24: 1-(4-(2-aminoethylamino)-5-(6-cyclopropoxynaphthalen-2-yl)-7H-pyrrolo[2,3-d]pyrimidin-7-yl)-2-methylpropan-2-ol (Compound 24)

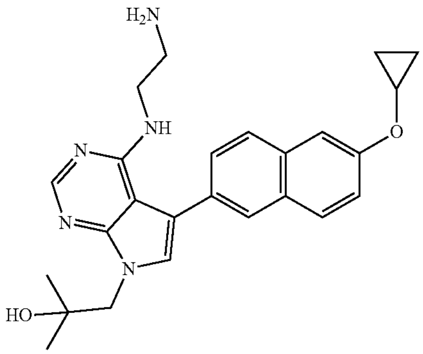 [SMILES: CC(C)(O)Cn1cc(-c2ccc3cc(OC4CC4)ccc3c2)c2c(NCCN)ncnc21]

$^1$H NMR (500 MHz, MeOD) δ 8.41 (s, 1H), 7.95-7.93 (m, 2H), 7.84 (d, J=7.2 Hz, 1H), 7.69-7.55 (m, 2H), 7.42 (s, 1H), 7.21 (d, J=7.7 Hz, 1H), 4.28 (s, 2H), 3.98-3.90 (m, 1H), 3.86-3.79 (m, 2H), 3.21-3.13 (m, 2H), 1.24 (s, 6H), 0.92-0.85 (m, 2H), 0.81-0.72 (m, 2H). Calculated for $C_{25}H_{29}N_5O_2$ 431.2, found $(M+H)^+$ 432.6. HPLC purified product was determined to be 100% pure under 220 nm and 254 nm detection in analytical HPLC under both solvent systems.

Example 25: 1-(5-(6-ethoxynaphthalen-2-yl)-4-(2-hydroxyethylamino)-7H-pyrrolo[2,3-d]pyrimidin-7-yl)-2-methylpropan-2-ol (Compound 25)

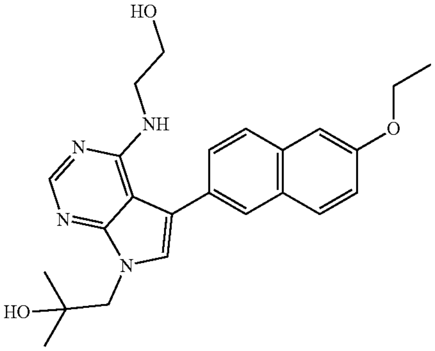 [SMILES: CCOc1ccc2cc(-c3cn(CC(C)(C)O)c4ncnc(NCCO)c34)ccc2c1]

$^1$H NMR (500 MHz, MeOD) δ 8.34 (s, 1H), 7.95-7.90 (m, 2H), 7.83 (d, J=8.2 Hz, 1H), 7.61 (d, J=5.2 Hz, 1H), 7.55 (s, 1H), 7.29 (s, 1H), 7.20 (d, J=7.5 Hz, 1H), 4.33 (s, 2H), 4.17 (q, J=8.0 Hz, 2H), 3.76-3.68 (m, 2H), 3.66-3.58 (m, 2H), 1.48 (t, J=10.0 Hz, 3H), 1.25 (s, 6H). Calculated for $C_{24}H_{28}N_4O_3$ 420.2, found $(M+H)^+$ 421.4. HPLC purified product was determined to be 100% pure under 220 nm and 254 nm detection in analytical HPLC under both solvent systems.

Example 26: 1-(5-(6-cyclopropoxynaphthalen-2-yl)-4-(2-hydroxyethylamino)-7H-pyrrolo[2,3-d]pyrimidin-7-yl)-2-methylpropan-2-ol (Compound 26)

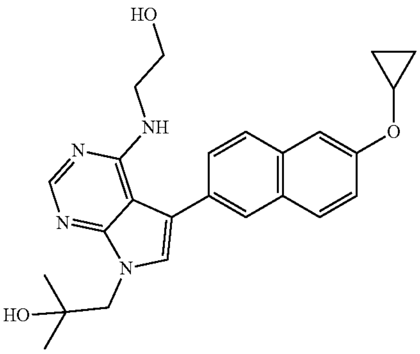 [SMILES: CC(C)(O)Cn1cc(-c2ccc3cc(OC4CC4)ccc3c2)c2c(NCCO)ncnc21]

$^1$H NMR (500 MHz, MeOD) δ 8.35 (s, 1H), 7.96-7.94 (m, 2H), 7.84 (d, J=8.5 Hz, 1H), 7.64-7.56 (m, 3H), 7.21 (d, J=7.2 Hz, 1H), 4.34 (s, 2H), 4.00-3.90 (m, 1H), 3.76-3.69 (m, 2H), 3.66-3.58 (m, 2H), 1.25 (s, 6H), 0.94-0.86 (m, 2H), 0.81-0.74 (m, 2H). Calculated for $C_{25}H_{28}N_4O_3$ 432.2, found $(M+H)^+$ 433.5. HPLC purified product was determined to be 100% pure under 220 nm and 254 nm detection in analytical HPLC under both solvent systems.

Example 27: 1-(4-(2-(2-aminoethoxy)ethylamino)-5-(6-cyclopropoxynaphthalen-2-yl)-7H-pyrrolo[2,3-d]pyrimidin-7-yl)-2-methylpropan-2-ol (Compound 27)

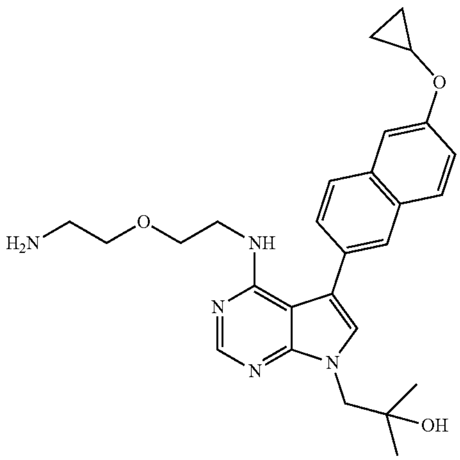 [SMILES: CC(C)(O)Cn1cc(-c2ccc3cc(OC4CC4)ccc3c2)c2c(NCCOCCN)ncnc21]

$^1$H NMR (500 MHz, MeOD) δ 8.40 (s, 1H), 8.00 (d, J=9.2 Hz, 2H), 7.90 (d, J=9.0 Hz, 1H), 7.66-7.65 (m, 2H), 7.56 (s, 1H), 7.28 (dd, J=8.9, 2.4 Hz, 1H), 4.36 (s, 2H), 3.99 (tt, J=6.0, 2.9 Hz, 1H), 3.75-3.70 (m, 4H), 3.48-3.46 (m, 2H), 2.69-2.59 (m, 2H), 1.27 (s, 6H), 0.95-0.92 (m, 2H), 0.85-0.75 (m, 2H). Calculated for $C_{27}H_{33}N_5O_3$ 475.3, found $(M+H)^+$ 476.7. HPLC purified product was determined to be 100% pure under 220 nm and 254 nm detection in analytical HPLC under both solvent systems.

Example 28: 1-(4-(2-(2-(2-(2-aminoethoxy)ethoxy)ethoxy)ethylamino)-5-(6-cyclopropoxy naphthalen-2-yl)-7H-pyrrolo[2,3-d]pyrimidin-7-yl)-2-methylpropan-2-ol (Compound 28)

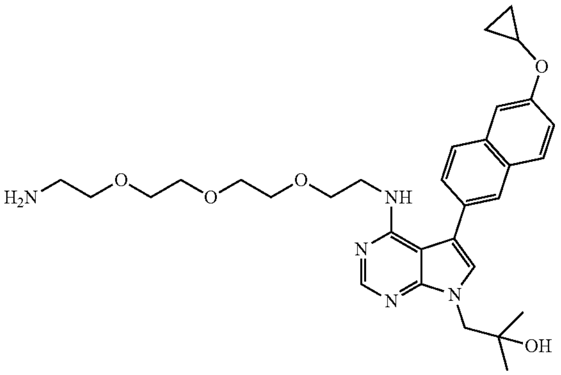 [SMILES: CC(C)(O)Cn1cc(-c2ccc3cc(OC4CC4)ccc3c2)c2c(NCCOCCOCCOCCN)ncnc21]

$^1$H NMR (300 MHz, MeOD) δ 8.38 (s, 1H), 7.99-7.97 (m, 2H), 7.88 (d, J=9.0 Hz, 1H), 7.65-7.62 (m, 2H), 7.55 (s, 1H), 7.25 (dd. J=9.0, 2.0 Hz, 1H), 4.34 (s, 2H), 3.98-3.95 (m, 1H), 3.68-3.60 (m, 5H), 3.54-3.51 (m, 2H), 3.43-3.38 (m, 3H), 3.34-3.31 (m, 2H), 3.19-3.16 (m, 2H), 3.09-3.05 (m, 2H), 1.26 (s, 6H), 0.95-0.89 (m, 2H), 0.86-0.79 (m, 2H). Calculated for $C_{31}H_{41}N_5O_5$ 563.3, found $(M+H)^+$ 564.5. HPLC purified product was determined to be 100% pure under 220 nm and 254 nm detection in analytical HPLC under both solvent systems.

Example 29: trans-cyclooct-4-enyl 2-(2-(5-(6-cyclopropoxynaphthalen-2-yl)-7-(2-hydroxy-2-methylpropyl)-7H-pyrrolo[2,3-d]pyrimidin-4-ylamino)ethoxy) ethylcarbamate (Compound 29)

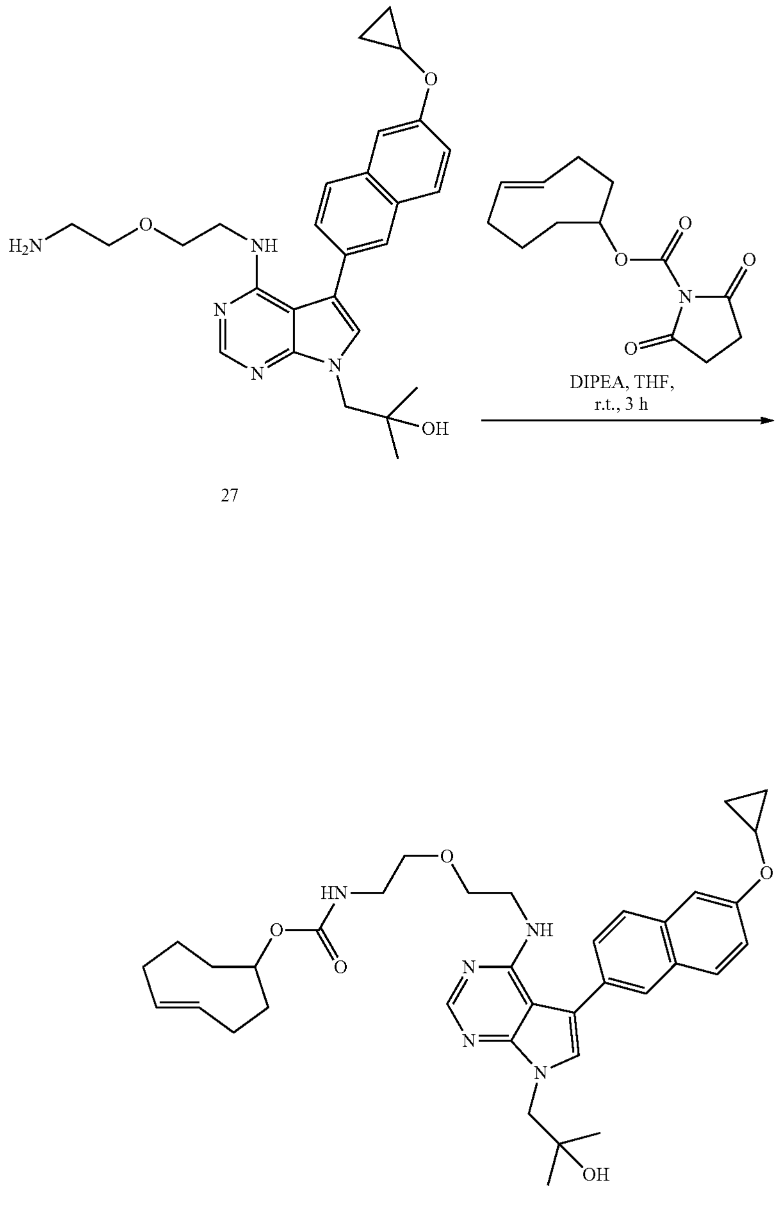

27

29

Compound 27 (1 eq), (R,E)-cyclooct-4-enyl 2,5-dioxopyrrolidine-1-carboxylate (1.3 P74c3 eq) and DIPEA (2.5 eq) was dissolved in THF (compounds 27 to be 0.06M) and the reaction mixture was stirred at room temperature for 3 hr. The reaction mixture was concentrated under reduced pressure. EtOAc and water was added to the concentrated mixture to extract the crude product into the organic layer which was dried over $Na_2SO_4$. The organic layer was concentrated and purified by HPLC using ACN/water as the mobile phase to trans-cyclooct-4-enyl 2-(2-(5-(6-cyclopropoxynaphthalen-2-yl)-7-(2-hydroxy-2-methylpropyl)-7H-pyrrolo[2,3-d]pyrimidin-4-ylamino)ethoxy)ethylcarbamate (9). $^1H$ NMR (500 MHz, MeOD) δ 8.38 (s, 1H), 7.99-7.95 (m, 2H), 7.86 (d, J=9.0 Hz, 1H), 7.63-7.61 (m, 2H), 7.58 (d, J=1.7 Hz, 1H), 7.24 (dd, J=8.9, 2.4 Hz, 1H), 5.73-5.55 (m, 2H), 4.35 (s, 2H), 3.97-3.94 (m, 1H), 3.69-3.61 (m, 4H), 2.94-2.90 (m, 2H), 2.39-2.27 (m, 2H), 2.23-2.13 (m, 3H), 2.08-2.01 (m, 1H), 1.93-1.86 (m, 2H), 1.85-1.65 (m, 4H), 1.62-1.46 (m, 4H), 1.26 (s, 6H), 0.92-0.89 (m, 2H), 0.80-0.77 (m, 2H). Calculated for $C_{36}H_{45}N_5O_5$ 627.3, found $(M+H)^+$ 628.6. HPLC purified product was determined to be ≥95% pure under 220 nm and 254 nm detection in analytical HPLC under both solvent systems.

Example 30: 1-(5-(biphenyl-4-yl)-4-(2-hydroxyethylamino)-7H-pyrrolo[2,3d]pyrimidin-7-yl)-2-methylpropan-2-ol (Compound 30)

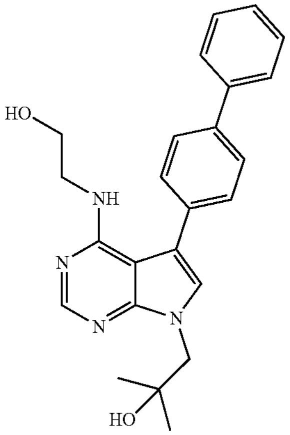 [SMILES: CC(C)(O)Cn1cc(-c2ccc(-c3ccccc3)cc2)c2c(NCCO)ncnc21]

$^1$H NMR (500 MHz, MeOD) δ 8.36 (s, 1H), 7.83-7.80 (m, 2H), 7.73-7.64 (m, 4H), 7.56 (s, 1H), 7.51-7.46 (m, 2H), 7.41-7.39 (m, 1H), 4.34 (s, 2H), 3.81-3.78 (m, 2H), 3.69-3.66 (m, 2H), 1.26 (s, 6H). Calculated for $C_{24}H_{26}N_4O_2$ 402.2, found $(M+H)^+$ 403.4. HPLC purified product was determined to be 100% pure under 220 nm and 254 nm detection in analytical HPLC under both solvent systems.

Example 31: 1-(4-(2-ethoxyethylamino)-5-(6-ethoxynaphthalen-2-yl)-7H-pyrrolo[2,3-d]pyrimidin-7-yl)-2-methylpropan-2-ol (Compound 31)

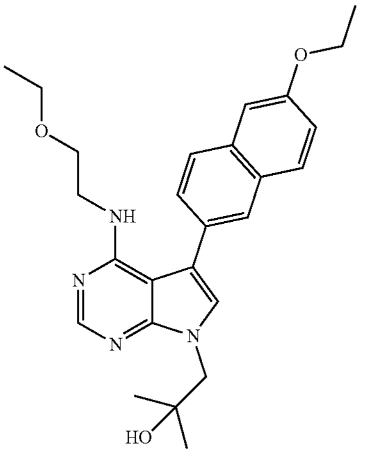 [SMILES: CCOCCNc1ncnc2c1c(-c1ccc3cc(OCC)ccc3c1)cn2CC(C)(C)O]

$^1$H NMR (500 MHz, MeOD) δ 8.34 (s, 1H), 7.94-7.92 (m, 2H), 7.84 (d, J=9.0 Hz, 1H), 7.58 (d, J=10.0 Hz, 1H), 7.54 (s, 1H), 7.31 (s, 1H), 7.22 (d, J=8.9 Hz, 1H), 4.33 (s, 2H), 4.19 (q, J=6.9 Hz, 2H), 3.64 (t, J=4.8 Hz, 2H), 3.56 (t, J=4.9 Hz, 2H), 3.22 (q, J=7.0 Hz, 2H), 1.47 (t, J=6.9 Hz, 3H), 1.26 (d, J=15.4 Hz, 6H), 0.71 (t, J=7.0 Hz, 3H). Calculated for $C_{26}H_{32}N_4O_3$ 448.2, found $(M+H)^+$ 449.5. HPLC purified product was determined to be ≥97% pure under 220 nm and 254 nm detection in analytical HPLC under both solvent systems.

Example 32: 5-(6-isopropoxynaphthalen-2-yl)-7-(2-methoxy-2-methylpropyl)-N-methyl-7H-pyrrolo[2,3-d]pyrimidin-4-amine (Compound 32)

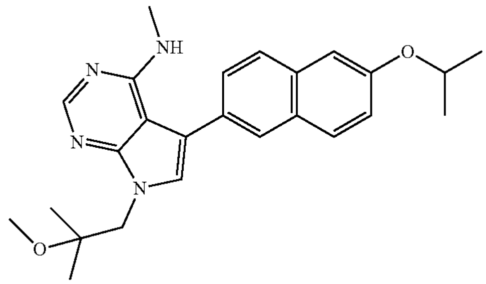 [SMILES: CNc1ncnc2c1c(-c1ccc3cc(OC(C)C)ccc3c1)cn2CC(C)(C)OC]

$^1$H NMR (500 MHz, MeOD) δ 8.37 (s, 1H), 7.94-7.92 (m, 2H), 7.86 (d, J=8.9 Hz, 1H), 7.57 (d, J=8.8 Hz, 1H), 7.50 (s, 1H), 7.34 (s, 1H), 7.22 (d, J=8.9 Hz, 1H), 4.82 (d, J=6.2 Hz, 1H), 4.41 (s, 2H), 3.33 (s, 3H), 3.13 (s, 3H), 1.43 (d, J=6.0 Hz, 6H), 1.23 (s, 6H). Calculated for $C_{25}H_{30}N_4O_2$ 418.2, found $(M+H)^+$ 419.6. HPLC purified product was determined to be 100% pure under 220 nm and 254 nm detection in analytical HPLC under both solvent systems.

Example 33: 5-(4'-bromobiphenyl-4-yl)-7-(2-methoxy-2-methylpropyl)-N-methyl-7H-pyrrolo[2,3-d]pyrimidin-4-amine (Compound 33)

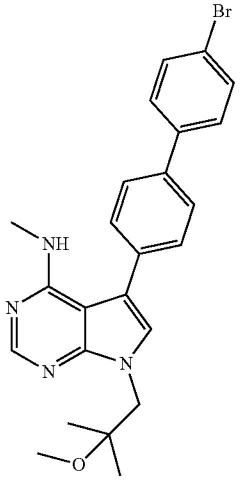 [SMILES: CNc1ncnc2c1c(-c1ccc(-c3ccc(Br)cc3)cc1)cn2CC(C)(C)OC]

$^1$H NMR (500 MHz, MeOD) δ 8.35 (s, 1H), 7.81 (d, J=8.0 Hz, 2H), 7.65-7.60 (m, 6H), 7.48 (s, 1H), 4.39 (s, 2H), 3.32 (s, 3H), 3.15 (s, 3H), 1.21 (s, 6H). Calculated for $C_{24}H_{25}BrN_4O$ 464.1, found $(M+H)^+$ 465.4. HPLC purified product was determined to be 100% pure under 220 nm and 254 nm detection in analytical HPLC under both solvent systems.

Example 34: 5-(4'-ethylbiphenyl-4-yl)-7-(2-methoxy-2-methylpropyl)-N-methyl-7H-pyrrolo[2,3-d]pyrimidin-4-amine (Compound 34)

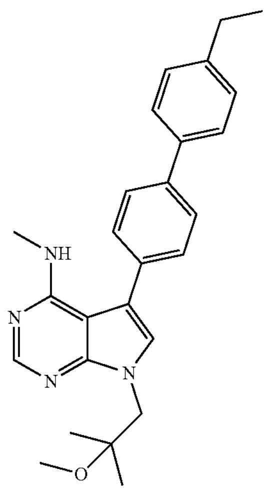 [SMILES: CCc1ccc(-c2ccc(-c3cn(CC(C)(C)OC)c4ncnc(NC)c34)cc2)cc1]

$^1$H NMR (500 MHz, MeOD) δ 8.36 (s, 1H), 7.81 (d, J=7.8 Hz, 2H), 7.65 (d, J=7.7 Hz, 2H), 7.59 (d, J=7.9 Hz, 2H), 7.48 (s, 1H), 7.35 (d, J=7.7 Hz, 2H), 4.40 (s, 2H), 3.33 (s, 3H), 3.16 (s, 3H), 2.73 (q, J=7.4 Hz, 2H), 1.30 (t, J=7.6 Hz, 3H), 1.22 (s, 6H). Calculated for $C_{26}H_{30}N_4O$ 414.2, found $(M+H)^+$ 415.6. HPLC purified product was determined to be 100% pure under 220 nm and 254 nm detection in analytical HPLC under both solvent systems.

Example 35: 1-(5-(6-cyclopropoxynaphthalen-2-yl)-4-(2-ethoxyethylamino)-7H-pyrrolo[2,3-d]pyrimidin-7-yl)-2-methylpropan-2-ol (Compound 35)

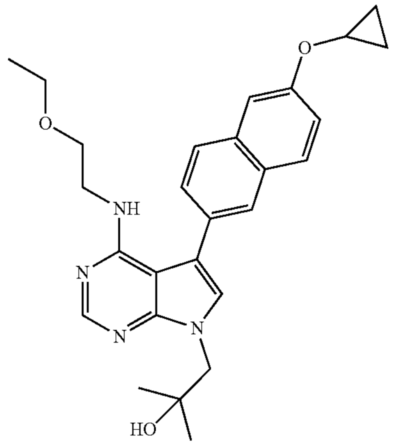 [SMILES: CCOCCNc1ncnc2c1c(-c1ccc3cc(OC4CC4)ccc3c1)cn2CC(C)(C)O]

$^1$H NMR (500 MHz, MeOD) δ 8.24 (s, 1H), 7.89-7.81 (m, 2H), 7.75 (d, J=8.9 Hz, 1H), 7.50-7.49 (m, 2H), 7.44 (s, 1H), 7.13 (dd, J=8.9, 2.0 Hz, 1H), 4.24 (s, 2H), 3.90-3.80 (m, 1H), 3.54 (t, J=4.9 Hz, 2H), 3.46 (t, J=4.9 Hz, 2H), 3.12 (q, J=7.0 Hz, 2H), 1.15 (s, 6H), 0.81-0.79 (m, 2H), 0.68-0.66 (m, 2H), 0.61 (t, J=7.0 Hz, 3H). Calculated for $C_{27}H_{32}N_4O_3$ 460.2, found $(M+H)^+$ 461.4. HPLC purified product was determined to be ≥96% pure under 220 nm and 254 nm detection in analytical HPLC under both solvent systems.

Example 36: 1-(4-(2-ethoxyethylamino)-5-(6-isopropoxynaphthalen-2-yl)-7H-pyrrolo[2,3-d]pyrimidin-7-yl)-2-methylpropan-2-ol (Compound 36)

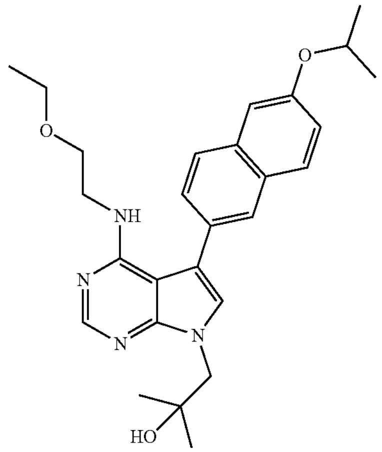 [SMILES: CCOCCNc1ncnc2c1c(-c1ccc3cc(OC(C)C)ccc3c1)cn2CC(C)(C)O]

$^1$H NMR (500 MHz, MeOD) δ 8.36 (s, 1H), 7.95-7.94 (m, 2H), 7.87 (d, J=8.9 Hz, 1H), 7.60 (d, J=8.6 Hz, 1H), 7.57 (s, 1H), 7.35 (s, 1H), 7.23 (d, J=8.9 Hz, 1H), 4.85-4.79 (m, 1H), 4.36 (s, 2H), 3.66 (t, J=4.7 Hz, 2H), 3.59 (t, J=4.8 Hz, 2H), 3.24 (q, J=7.0 Hz, 2H), 1.43 (d, J=6.0 Hz, 6H), 1.27 (s, 6H), 0.73 (t, J=7.0 Hz, 3H). Calculated for $C_{27}H_{34}N_4O_3$ 462.3, found $(M+H)^+$ 463.5. HPLC purified product was determined to be 100% pure under 220 nm and 254 nm detection in analytical HPLC under both solvent systems.

Example 37: 1-(5-(biphenyl-4-yl)-4-(2-ethoxyethylamino)-7H-pyrrolo[2,3-d]pyrimidin-7-yl)-2-methylpropan-2-ol (Compound 37)

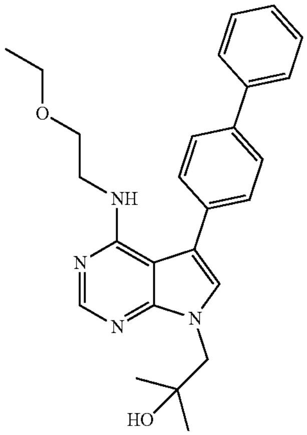 [SMILES: CCOCCNc1ncnc2c1c(-c1ccc(-c3ccccc3)cc1)cn2CC(C)(C)O]

$^1$H NMR (500 MHz, MeOD) δ 8.37 (s, 1H), 7.85 (d, J=8.1 Hz, 2H), 7.73 (d, J=7.6 Hz, 2H), 7.65 (d, J=8.1 Hz, 2H), 7.56 (s, 1H), 7.51 (t, J=7.6 Hz, 2H), 7.41 (t, J=7.4 Hz, 1H), 4.35 (s, 2H), 3.77-3.65 (m, 4H), 3.48-3.44 (m, 2H), 1.27 (s, 6H), 1.00 (t, J=7.0 Hz, 3H). Calculated for $C_{26}H_{30}N_4O_2$ 430.24, found $(M+H)^+$ 431.6. HPLC purified product was determined to be 100% pure under 220 nm and 254 nm detection in analytical HPLC under both solvent systems.

Example 38: 1-(4-(2-ethoxyethylamino)-5-(4'-methoxybiphenyl-4-yl)-7H-pyrrolo[2,3-d]pyrimidin-7-yl)-2-methylpropan-2-ol (Compound 38)

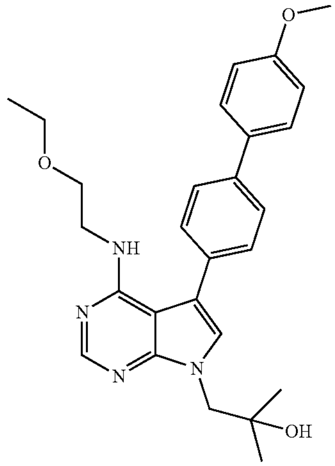 [SMILES: CCOCCNc1ncnc2c1c(-c1ccc(-c3ccc(OC)cc3)cc1)cn2CC(C)(C)O]

$^1$H NMR (500 MHz, MeOD) δ 8.37 (s, 1H), 7.80 (d, J=7.9 Hz, 2H), 7.67 (d, J=8.5 Hz, 2H), 7.61 (d, J=8.0 Hz, 2H), 7.54 (s, 1H), 7.06 (d, J=8.5 Hz, 2H), 4.35 (s, 2H), 3.88 (s, 3H), 3.73-3.66 (m, 4H), 3.45 (q, J=7.0 Hz, 2H), 1.27 (s, 6H), 1.00 (t, J=6.9 Hz, 3H). Calculated for $C_{27}H_{32}N_4O_3$ 460.2, found $(M+H)^+$ 461.6. HPLC purified product was determined to be ≥90% pure under 220 nm and 254 nm detection in analytical HPLC under both solvent systems.

Example 39: 1-(4-(2-ethoxyethylamino)-5-(4'-ethylbiphenyl-4-yl)-7H-pyrrolo[2,3-d]pyrimidin-7-yl)-2-methylpropan-2-ol (Compound 39)

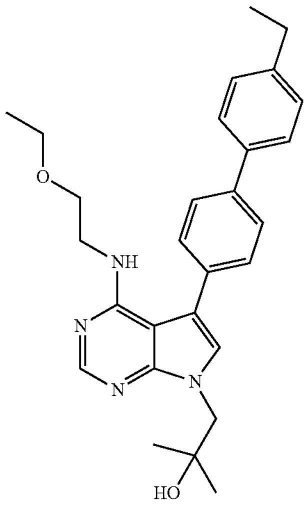 [SMILES: CCOCCNc1ncnc2c1c(-c1ccc(-c3ccc(CC)cc3)cc1)cn2CC(C)(C)O]

$^1$H NMR (500 MHz, MeOD) δ 8.35 (s, 1H), 7.81 (d, J=8.0 Hz, 2H), 7.63-7.60 (m, 4H), 7.53 (s, 1H), 7.33 (d, J=7.9 Hz, 2H), 4.34 (s, 2H), 3.70-3.65 (m, 4H), 3.44 (q, J=7.0 Hz, 2H), 2.71 (q, J=7.6 Hz, 2H), 1.29 (t, J=7.6 Hz, 3H), 1.25 (s, 6H), 0.99 (t, J=6.9 Hz, 3H). Calculated for $C_{28}H_{34}N_4O_2$ 458.3, found $(M+H)^+$ 459.5. HPLC purified product was determined to be 100% pure under 220 nm and 254 nm detection in analytical HPLC under both solvent systems.

Example 40: 1-(5-(4'-bromobiphenyl-4-yl)-4-(2-ethoxyethylamino)-7H-pyrrolo[2,3-d]pyrimidin-7-yl)-2-methylpropan-2-ol (Compound 40)

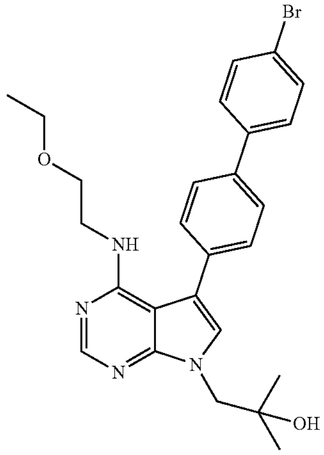 [SMILES: CCOCCNc1ncnc2c1c(-c1ccc(-c3ccc(Br)cc3)cc1)cn2CC(C)(C)O]

$^1$H NMR (500 MHz, MeOD) δ 8.35 (s, 1H), 7.88-7.80 (m, 2H), 7.64-7.63 (m, 6H), 7.55 (s, 1H), 4.34 (s, 2H), 3.70-3.65 (m, 4H), 3.44 (q, J=7.0 Hz, 2H), 1.24 (s, 6H), 0.98 (t, J=6.9 Hz, 3H). Calculated for $C_{26}H_{29}BrN_4O_2$ 508.1, found $(M+H)^+$ 509.9. HPLC purified product was determined to be ≥95% pure under 220 nm and 254 nm detection in analytical HPLC under both solvent systems.

Example 41: 1-(4-(cyclopropylamino)-5-(6-ethoxynaphthalen-2-yl)-7H-pyrrolo[2,3-d]pyrimidin-7-yl)-2-methylpropan-2-ol (Compound 41)

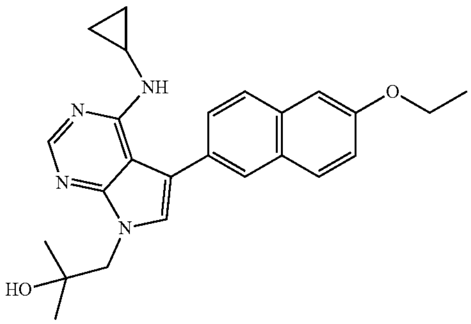 [SMILES: CCOc1ccc2cc(-c3cn(CC(C)(C)O)c4ncnc(NC5CC5)c34)ccc2c1]

$^1$H NMR (500 MHz, MeOD) δ 8.41 (s, 1H), 7.91-7.86 (m, 2H), 7.81 (d, J=9.0 Hz, 1H), 7.58 (s, 1H), 7.54 (d, J=8.4 Hz, 1H), 7.30 (s, 1H), 7.21 (d, J=8.9 Hz, 1H), 4.35 (s, 2H), 4.19 (q, J=7.0 Hz, 2H), 2.83-2.71 (m, 1H), 1.47 (t, J=7.0 Hz, 3H), 1.24 (s, 6H), 1.10-0.96 (m, 2H), 0.91-0.71 (m, 2H). Calculated for $C_{25}H_{28}N_4O_2$ 416.2, found $(M+H)^+$ 417.3. HPLC purified product was determined to be 100% pure under 220 nm and 254 nm detection in analytical HPLC under both solvent systems.

Example 42: 1-(4-(cyclopropylamino)-5-(6-methoxynaphthalen-2-yl)-7H-pyrrolo[2,3-d]pyrimidin-7-yl)-2-methylpropan-2-ol (Compound 42)

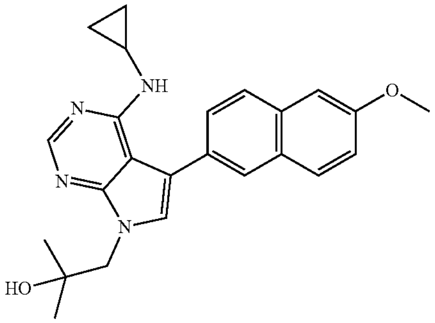 [SMILES: COc1ccc2cc(-c3cn(CC(C)(C)O)c4ncnc(NC5CC5)c34)ccc2c1]

$^1$H NMR (500 MHz, MeOD) δ 8.40 (s, 1H), 7.93 (d, J=8.4 Hz, 1H), 7.88 (s, 1H), 7.82 (d, J=9.0 Hz, 1H), 7.58-7.55 (m, 2H), 7.33 (s, 1H), 7.22 (d, J=10.0 Hz, 1H), 4.35 (s, 2H), 3.95 (s, 3H), 2.78-2.75 (m, 1H), 1.24 (s, 6H), 1.04-1.00 (m, 2H), 0.78-0.76 (m, 2H). Calculated for $C_{24}H_2N_4O_2$ 402.2, found $(M+H)^+$ 403.2. HPLC purified product was determined to be 100% pure under 220 nm and 254 nm detection in analytical HPLC under both solvent systems.

Example 43: 1-(5-(6-cyclopropoxynaphthalen-2-yl)-4-(isopropylamino)-7H-pyrrolo[2,3-d]pyrimidin-7-yl)-2-methylpropan-2-ol (Compound 43)

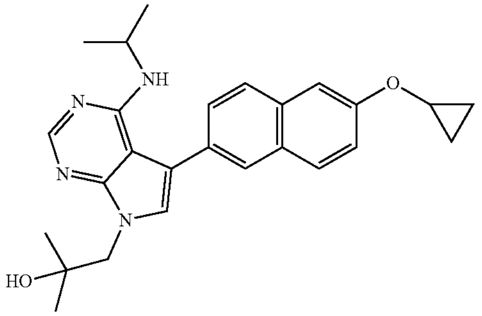 [SMILES: CC(C)Nc1ncnc2c1c(-c1ccc3cc(OC4CC4)ccc3c1)cn2CC(C)(C)O]

$^1$H NMR (500 MHz, MeOD) δ 8.37 (s, 1H), 8.01-7.98 (m, 2H), 7.87 (d, J=8.9 Hz, 1H), 7.66-7.64 (m, 2H), 7.59 (s, 1H), 7.26 (d, J=8.9 Hz, 1H), 4.36 (s, 2H), 4.18 (dt, J=12.7, 6.3 Hz, 1H), 4.01-3.95 (m, 1H), 1.28-1.25 (m, 12H), 0.93-0.91 (m, 2H), 0.84-0.78 (m, 2H). Calculated for $C_{28}H_{30}N_4O_2$ 430.2, found $(M+H)^+$ 431.4. HPLC purified product was determined to be 100% pure under 220 nm and 254 nm detection in analytical HPLC under both solvent systems.

Example 44: 1-(5-(6-ethoxynaphthalen-2-yl)-4-(isopropylamino)-7H-pyrrolo[2,3-d]pyrimidin-7-yl)-2-methylpropan-2-ol (Compound 44)

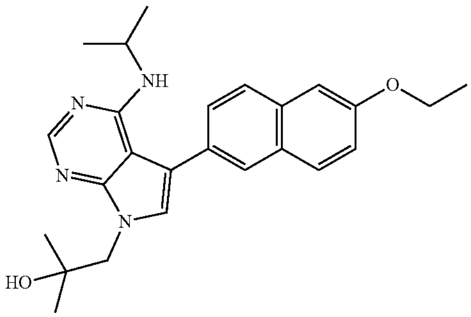 [SMILES: CCOc1ccc2cc(-c3cn(CC(C)(C)O)c4ncnc(NC(C)C)c34)ccc2c1]

$^1$H NMR (500 MHz, MeOD) δ 8.36 (s, 1H), 7.98-7.96 (m, 2H), 7.86 (d, J=8.9 Hz, 1H), 7.63 (d, J=8.4 Hz, 1H), 7.58 (s, 1H), 7.35 (s, 1H), 7.26 (d, J=8.9 Hz, 1H), 4.36 (s, 2H), 4.27-4.16 (m, 3H), 1.51 (t, J=6.9 Hz, 3H), 1.27 (s, 6H), 1.25 (d, J=5.0 Hz, 6H). Calculated for $C_{25}H_{30}N_4O_2$ 418.2, found $(M+H)^+$ 419.3. HPLC purified product was determined to be 100% pure under 220 nm and 254 nm detection in analytical HPLC under both solvent systems.

Example 45: 1-(4-(isopropylamino)-5-(6-methoxynaphthalen-2-yl)-7H-pyrrolo[2,3-d]pyrimidin-7-yl)-2-methylpropan-2-ol (Compound 45)

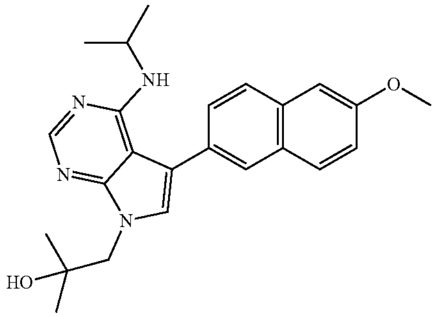 [SMILES: COc1ccc2cc(-c3cn(CC(C)(C)O)c4ncnc(NC(C)C)c34)ccc2c1]

$^1$H NMR (500 MHz, MeOD) δ 8.36 (s, 1H), 8.07-7.95 (m, 2H), 7.86 (d, J=8.9 Hz, 1H), 7.64 (d, J=8.4 Hz, 1H), 7.58 (s, 1H), 7.37 (s, 1H), 7.26 (d, J=9.0 Hz, 1H), 4.36 (s, 2H), 4.18 (dt, J=12.6, 6.3 Hz, 1H), 3.98 (s, 3H), 1.30-1.24 (m, 12H). Calculated for $C_{24}H_{28}N_4O_2$ 404.2, found $(M+H)^+$ 405.2. HPLC purified product was determined to be 100% pure under 220 nm and 254 nm detection in analytical HPLC under both solvent systems.

Example 46: Antitumor Activity

Anti-tumor activity was determined by screening a series of compounds against the castrate-resistant, androgen-receptor-positive, prostate cancer cell line LNCaP95. This line is of special interest as it has been shown to be castration-resistant due to the generation of constitutively active AR splice variants, in particular AR-V7. Inhibition of proliferation was determined based on the level of LNCaP95 cell growth suppression using an MTT assay (NAD(P)H-dependent cellular oxidoreductase enzymatic activities)) read at 72 and 96 hours after addition of the compounds. Cells were be plated in 96 well plates at 2500 cells/well in 10% FBS or charcoal-stripped serum and RPMI-1640. Each cell line was be tested in quadruplicate.

Example 47: Effects on AR Transactivation

Because the compounds selectively inhibited AR+ prostate cancer cell lines, the effects of the compounds of the disclosure on AR transactivation are examined using the LNCaP cell line. A plasmid containing a small composite probasin promoter linked to a luciferase reporter is used to examine transcriptional activity of the AR. Probasin is one of several genes that is activated by the AR when it is bound to ligand. AR binds to androgen response elements (AREs) in the promoter of such genes to activate transcription of these genes.

Example 48: Effects on AR Transactivation

Currently there are no good prostate cancer treatments on the market, or even in clinical trials. Some drugs, such as 1NM-PP1 and 1NA-PP1, have low solubility and are quickly metabolized and thus therapeutic levels cannot be obtained in vivo. The newest drug, SD-208, was tested in vivo and did demonstrated a decrease in prostate cancer tumor growth. However, SD-208 had to be used at a relatively high concentration 60 mg/kg and high dosing frequency (2× daily). The compounds of the disclosure show low cytotoxicity and can be dosed very infrequently (3× week).

The first xenograft tested is AR-positive LuCaP35 grown in non-castrated mice. This tumor has been shown to be castration-sensitive. Because the castrate-resistant LNCaP95 line is used to screen the compounds of the disclosure in vitro, the same cell line is used for an in vivo study (4 mice per group). LNCaP95 xenografts are implanted into castrate mice, when tumors reach about 100 $mm^3$, 20 mg/kg is given by gavage 3× weekly, for 6 weeks (the time point at which the tumors in the control group reach 1000 $mm^3$).

RESULTS

The compounds of the invention were tested on prostate cancer (PCa), and the results are provided in Table 1 and Table 2. Reference compound A in is 1-(4-amino-3-(6-cyclopropoxynaphthalen-2-yl)-1H-pyrazolo[3,4-d]pyrimidin-1-yl)-2-methylpropan-2-ol (disclosed as Example 24 in International Patent Publication No. WO 2016/123152, which is incorporated by reference in its entirety); reference compound B is 6-(4-amino-1-((1-methylpiperidin-4-yl)methyl)-1H-pyrazolo[3,4-d]pyrimidin-3-yl)quinolin-2-ol:

Reference compound A

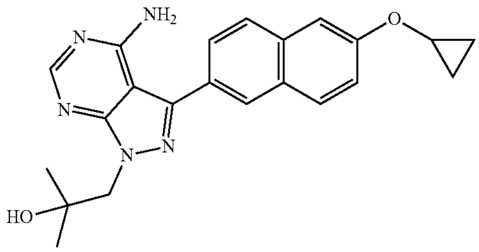

Reference compound B

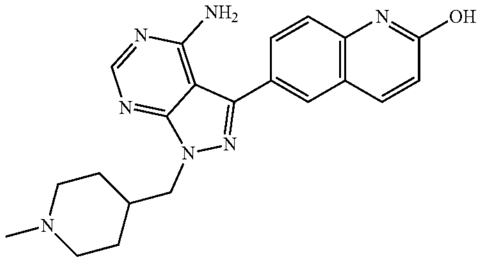

TABLE 1

| | | | MTT % inhib | | | Cell Toxicity $CC_{50}$ (μM) | | |
|---|---|---|---|---|---|---|---|---|
| | $EC_{50}$ | | @ 10 μM | | | CRL- | | |
| Ex. No | PC3 | LNCaP95 | LNCaP95 | PC3 | LNCaP | 8155 | HEPG2 | hERG |
| Ref. comp. A | >20 | 8 | 41.5 | 9.4 | 38.7 | >80 | >40 | >30 |
| Ref. comp. B | >20 | >20 | 0 | 0 | 0 | >80 | >80 | >29 |
| 1 | >20 | 5 | 51.5 | 16.8 | 35.4 | >80 | >80 | 13.9 |
| 2 | >20 | 6 | 32.0 | 12.8 | | >40 | >40 | |
| 3 | >20 | 7 | 36.5 | 2.9 | | | | |
| 4 | >20 | 5 | 36.3 | 13.0 | | >80 | | |
| 5 | >20 | 5 | 50.9 | −3.2 | | >80 | >80 | |
| 6 | >20 | 10 | 20.3 | 10.1 | | >40 | >40 | |
| 7 | >20 | 12 | 23.9 | −36.2 | | | | |
| 10 | >20 | 2 | | | | | | |
| 11 | >20 | 3 | 55.6 | 1.6 | | >80 | >80 | |
| 12 | >20 | 12 | 36.7 | 8.4 | | >80 | >80 | |
| 13 | >20 | 12 | 40.9 | −4.3 | | >80 | >80 | |
| 14 | >20 | 12 | 42.7 | −3.5 | | >80 | >80 | |
| 15 | >20 | 8 | 53.2 | 2.8 | | >80 | >80 | |
| 16 | >20 | >15 | 11.3 | −10.5 | | | | |
| 17 | 10 | 2.5 | | | | | | |
| 18 | >20 | 3 | 44.9 | 21.0 | | >80 | >80 | |
| 19 | >20 | 5 | 21.3 | 4.4 | | | | |

TABLE 1-continued

| | EC$_{50}$ | | MTT % inhib @ 10 μM | | | Cell Toxicity CC$_{50}$ (μM) | | |
|---|---|---|---|---|---|---|---|---|
| Ex. No | PC3 | LNCaP95 | LNCaP95 | PC3 | LNCaP | CRL-8155 | HEPG2 | hERG |
| 20 | >20 | >20 | 16.5 | 8.3 | | | | |
| 21 | >20 | 7 | −2.7 | −5.4 | | | | |
| 22 | >20 | 10 | 40.1 | 4.3 | | >80 | >80 | |
| 23 | >20 | >10 | 22.9 | 27.2 | | | | |
| 24 | >20 | >10 | 35.1 | 6.7 | | | | |
| 25 | >20 | 5 | 34.6 | 10.3 | | | | |
| 26 | >20 | 5 | 40.6 | 9.2 | | | | |
| 27 | >20 | >10 | 8.6 | −5.2 | | | | |
| 28 | >20 | 4 | 43.0 | −8.3 | | 15.4 | 30.7 | |
| 29 | >20 | 5 | 33.7 | −31.0 | | | | |
| 30 | >20 | 4 | 37.8 | −18.1 | | | | |
| 31 | >20 | 10 | 34.9 | 14.9 | | | | |
| 32 | >20 | 3 | 5.1 | 14.6 | | | | |
| 33 | >20 | 5 | 30.7 | 11.4 | | | | |
| 34 | >20 | 6 | 29.7 | 9.1 | | | | |
| 35 | >20 | 4 | 27.1 | 16.5 | | | | |
| 36 | >20 | 8 | 22.0 | 15.7 | | | | |
| 37 | >20 | >10 | 8.4 | 9.0 | | | | |
| 38 | >20 | 4 | 39.5 | 11.6 | | | | |
| 39 | >20 | >10 | 29.2 | 8.3 | | | | |
| 40 | >20 | >10 | −0.2 | 11.1 | | | | |
| 41 | 10 | 6 | | | | | | |
| 42 | >20 | 20 | | | | | | |
| 43 | 20 | 10 | | | | | | |
| 44 | 20 | 5 | | | | | | |
| 45 | >20 | 5 | | | | | | |

Additional EC$_{50}$ (effective concentration that reduces to 50% proliferation) activity for several cell lines is provided in Table 2. C4-2 and C4-2B3 are derived from LNCaP but have different characteristics. Specifically, C4-2 is LNCaP derived line, AR+ but androgen-independent (castrate-resistant) prostate cancer line (PMID: 8169003), while C4-2B is bone metastatic model and osteoblastic line derived from C4-2 (PMID: 8168083). LNCaP, C4-2 and C4-2B require androgen receptor but only LNCaP line is androgen sensitive.

RWPE-1 is immortalized benign prostate hypertrophic cell line. 42D and 42F are enzalutamide and castrate resistant AR+ Neuroendocrine+(NE+) LNCaP-based prostate cancer (PMID: 27784708). 16D is castrate resistant AR+ LNCaP-based prostate cancer line (PMID: 27784708). LAPC4 is AR+ castrate resistant line not LNCaP-based prostate cancer. APIPC is castrate and enzalutamide resistant LNCaP prostate cancer line with AR knocked out (PMID: 29017058). HFF1 is human foreskin fibroblast cell line. NCI-H660 is neuroendocrine (NE) prostate cancer human AR− cell line. MSKCC-EF1 is NE human prostate AR- or nearly negative prostate cancer cell line. MCF7 is human breast cancer cell line. U2OS is human osteosarcoma cell line. HepG2 is hepatoma liver tumor cell line. CRL8155 is lymphoblastoid cell line.

TABLE 2

| | Ex. No. | | |
|---|---|---|---|
| Cell line | Ref. comp. A | Ref. comp. B | 1 |
| LNCaP | 10 | >20 | 8 |
| C4-2 | 13 | >20 | 12 |
| C4-2B | 13 | >20 | 12 |
| 16D | 10 | >20 | 10 |
| 42F | 20 | >20 | 20 |
| 42D | 10 | >20 | 10 |
| LAPC4 | 10 | >20 | 7 |
| NCI-H660 | 10 | >20 | 10 |
| MSKCC-EF1 | 5 | >20 | 5 |
| APIPC | 10 | >20 | 10 |
| PC3 | >20 | >20 | >20 |
| DU145 | >20 | >20 | >20 |
| MCF7 | 10 | >20 | 8 |
| RWPE-1 | >20 | >20 | >20 |
| HFF-1 | >20 | >20 | >20 |
| U2OS | >20 | >20 | >20 |
| HepG2 | >40 | >40 | >40 |
| CRL8155 | >40 | >40 | >40 |

Pharmacokinetic data is provided in Table 3.

TABLE 3

| | Plasma Protein Binding (%) | | | PK Oral (MMV) | | | |
|---|---|---|---|---|---|---|---|
| Ex. No. | Mouse | Human | Rat | Dose (mg/kg) | C$_{max}$ (μM) | T$_{max}$ (mins) | AUC (min*μ mol/L) |
| Ref. comp. A | 90 | 91.4 | 98.2 | 10 | 12.8 | 320 | 13725 |
| 1 | 98.8 | 99.3 | 96 | 25 | 34 | 180 | 28935 |
| 2 | | | | 30.8 | 34.4 | 60 | 822 |
| 3 | | | | 25 | 5.1 | 40 | 2559 |
| 6 | | | | 24.6 | 17.6 | 60 | 400 |
| 11 | 99.81 | | | | | | |
| 14 | 99.21 | | | | | | |
| 15 | 99.83 | | | | | | |
| 18 | 99.23 | | | | | | |
| 31 | | | | 25 | 7.8 | 60 | 1724 |

TABLE 3-continued

| | Plasma Protein Binding (%) | | | PK Oral (MMV) | | | |
|---|---|---|---|---|---|---|---|
| | | | | Dose | $C_{max}$ | $T_{max}$ | AUC |
| Ex. No. | Mouse | Human | Rat | (mg/kg) | (μM) | (mins) | (min*μ mol/L) |
| 32 | 99.31 | | | | | | |
| 33 | 99.36 | | | | | | |

Reference compound A compound has been known to have activity against $AR^+$ PCa. In general, the compounds with the greatest "% inhib @ 10 μM" of LNCaP95 (AR+ PCa) and LNCaP (AR+ PCa) and little to no inhibition of PC-3 (AR negative PCa) are the most desirable in terms of potency. Additionally, it is preferred that the compounds that give no cytotoxicity ($CC_{50}$) on the non-prostate mammalian cell lines, CRL-8155, HEPG2, have high hERG numbers, reasonable plasma protein binding (<99.5%), and good PK. The reference compound has been previously tested in human tumors placed in SCID mouse skin, "xenografts" and has been shown to be effective for controlling growth of LNCaP5 ($AR^+$ PCa), LUCaP35 ($AR^+$ PCa), but not PC3 ($AR^-$ PCa). The data in Table 1 demonstrates that the compounds of the disclosure show comparable or better activity to the activity of the reference compound.

As provided in FIG. 1, no change in ATP levels was observed with addition of Compound 1 as well as Ref. Compounds A and B. However, a profound drop in intracellular ATP with the compounds of the disclosure with addition of oligomycin, which is known to inhibit ATP synthase necessary for oxidative phosphorylation of ADP to ATP. Without being bound by a theory, it is believed that the compounds of the disclosure block glycolytic generation of ATP, unmasked by blocking mitochondrial generation of ATP.

Figure 7:
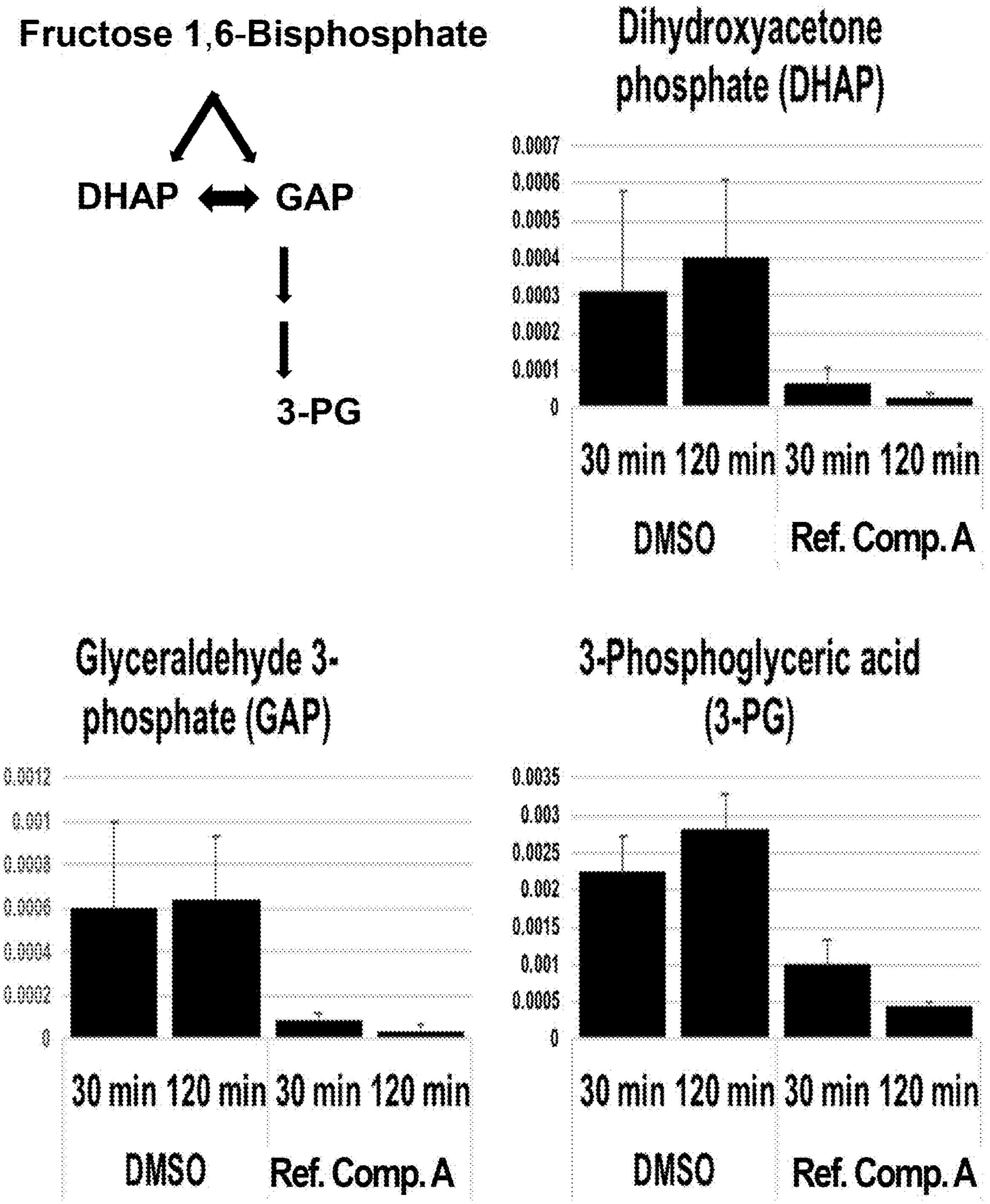
FIG. 7 shows determination of the 3-carbon metabolites of glycolysis in LNCaP95 cells by LC/MS-MS. DMSO or Ref. Compound A (20 μM) were added to the cells, and the cells were harvested for measurements at 30 minutes and at 120 minutes.

To monitor the progress of glycolysis in prostate cancer cells during treatment with the compounds of the disclosure, metabolomics was used to follow the products of glycolysis after Ref. Compound A exposure. The 3-carbon metabolites of glycolysis were quantitated by LC/MS-MS, the vast majority of which are produced by glycolysis. The data presented in FIG. 7 demonstrate that within 30 minutes of exposure to Ref. Compound A, LNCaP95 prostate cancer cells had a >80% reduction of dihydroxyacetone phosphate and glyceraldehyde phosphate, 3-carbon metabolites formed in glycolysis just after fructose 1,6 bisphosphate is cleaved by aldolase. These results strongly support that compound A and, likewise, the compounds of the disclosure as described herein, block glycolysis upstream of 3-carbon metabolites.

Figure 2:
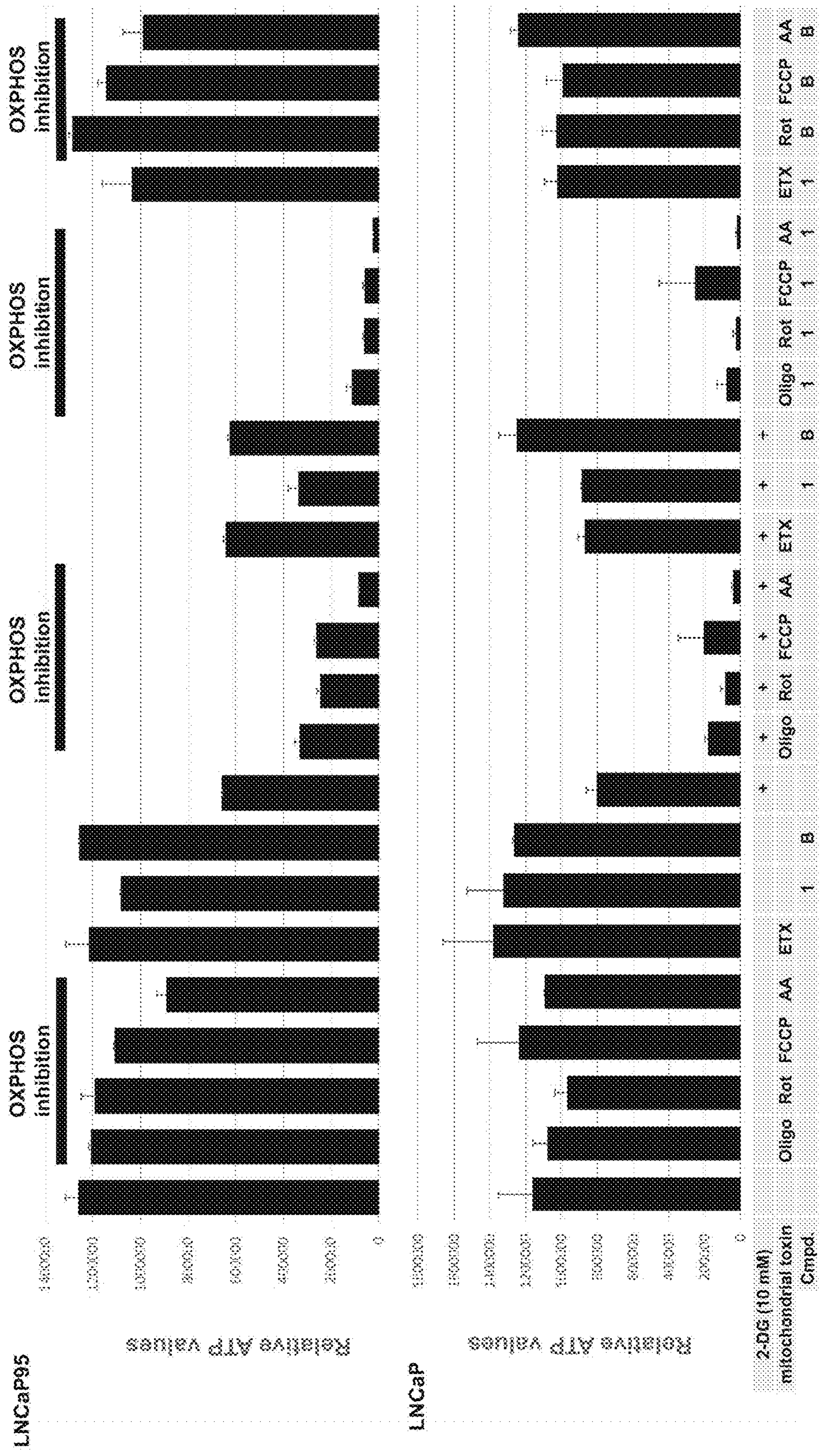
FIG. 2 illustrates that the compounds of the disclosure cooperate with mitochondrial toxins to deplete intracellular ATP in LNCaP and LNCaP95 cells. OXPHOS is oxidative phosphorylation; oligo is oligomycin; AA is antimycin A; ETX is etomoxir; FCCP is carbonyl cyanide-4-trifluoromethoxy)phenylhydrazone; and Rot is rotenone.
Figure 3:
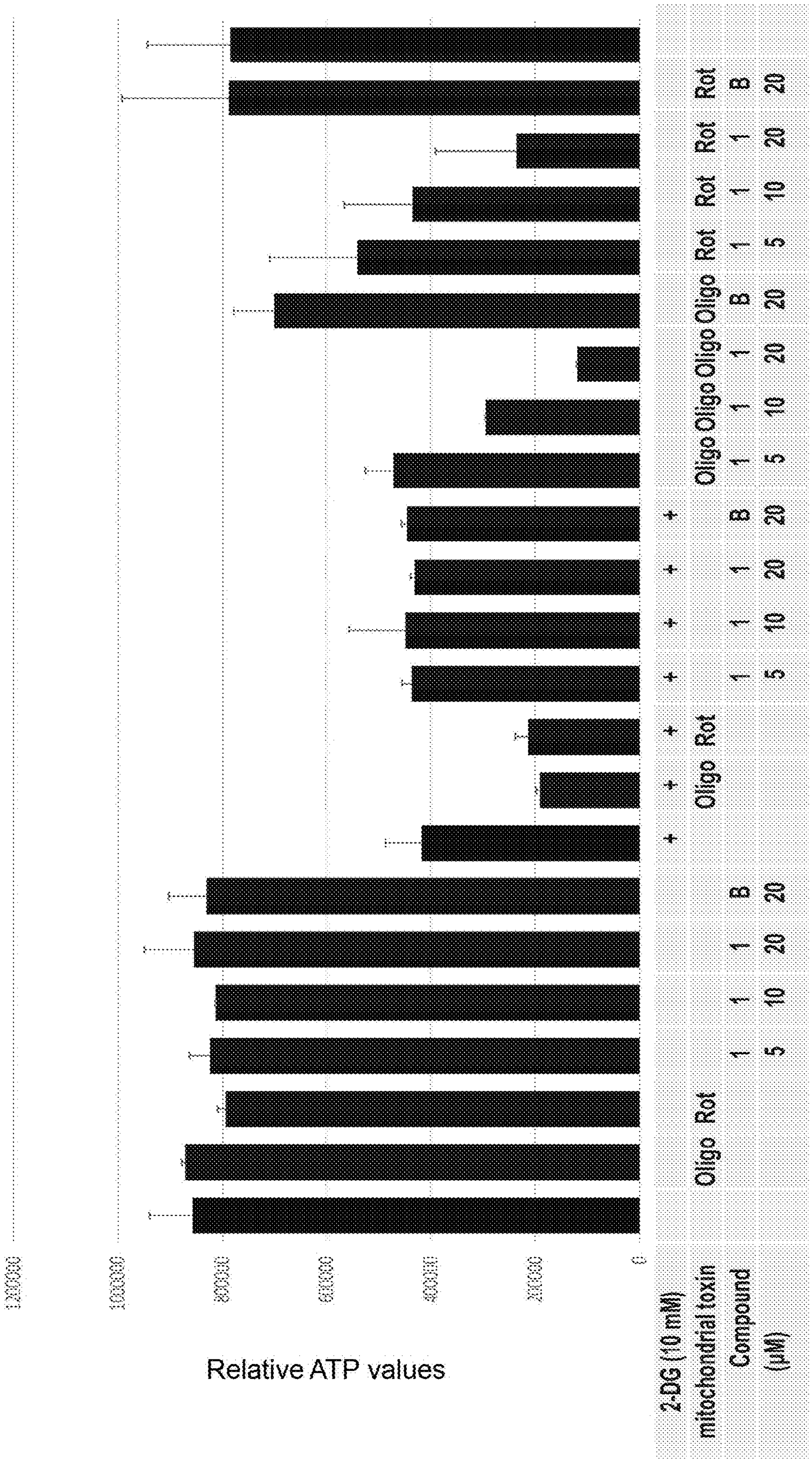
FIG. 3 shows evaluation of dose dependency of Compound 1. Oligo is oligomycin; and Rot is rotenone.
Figure 4:
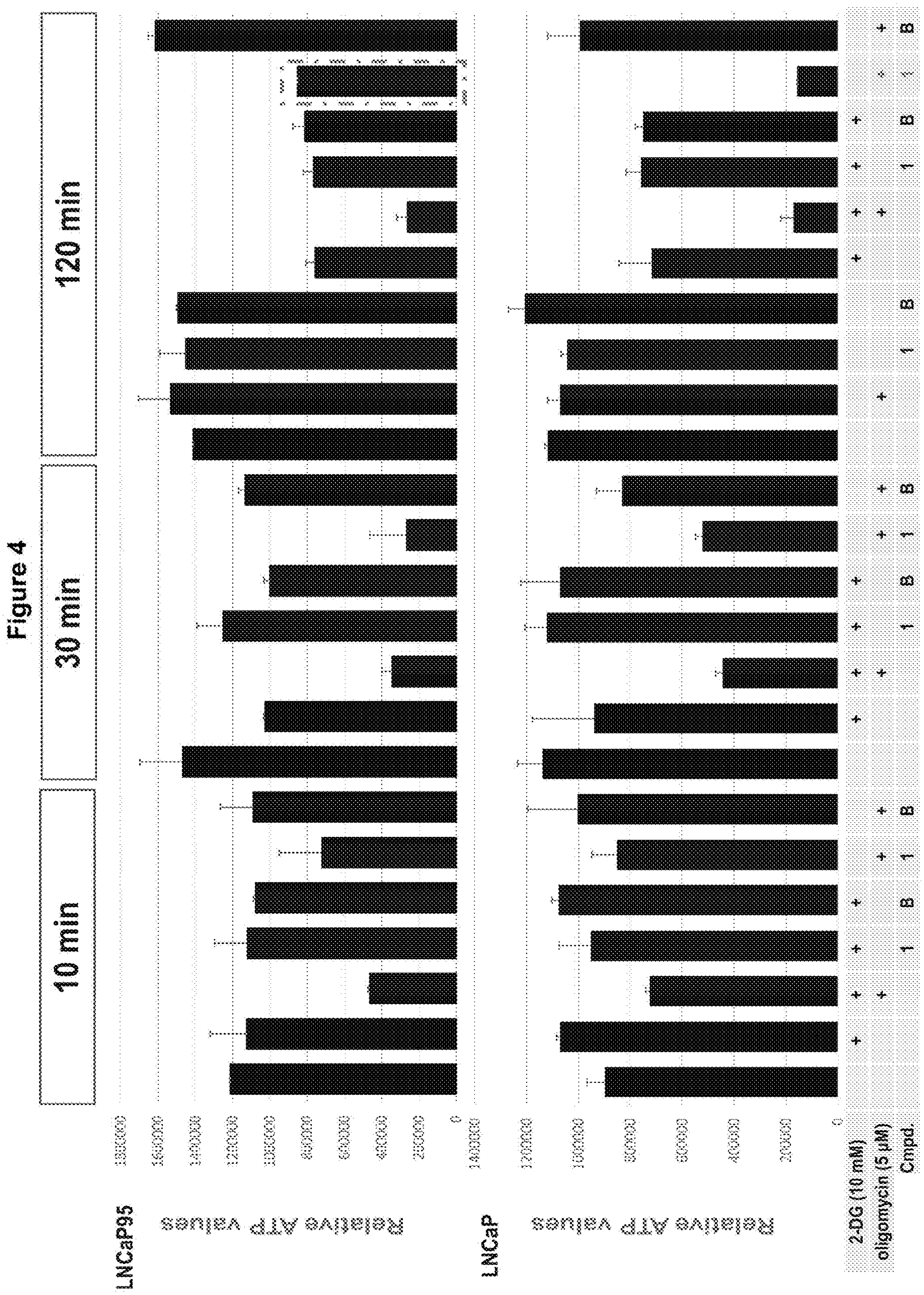
FIG. 4 shows evaluation of time course activity of Compound 1.
Figure 5A:
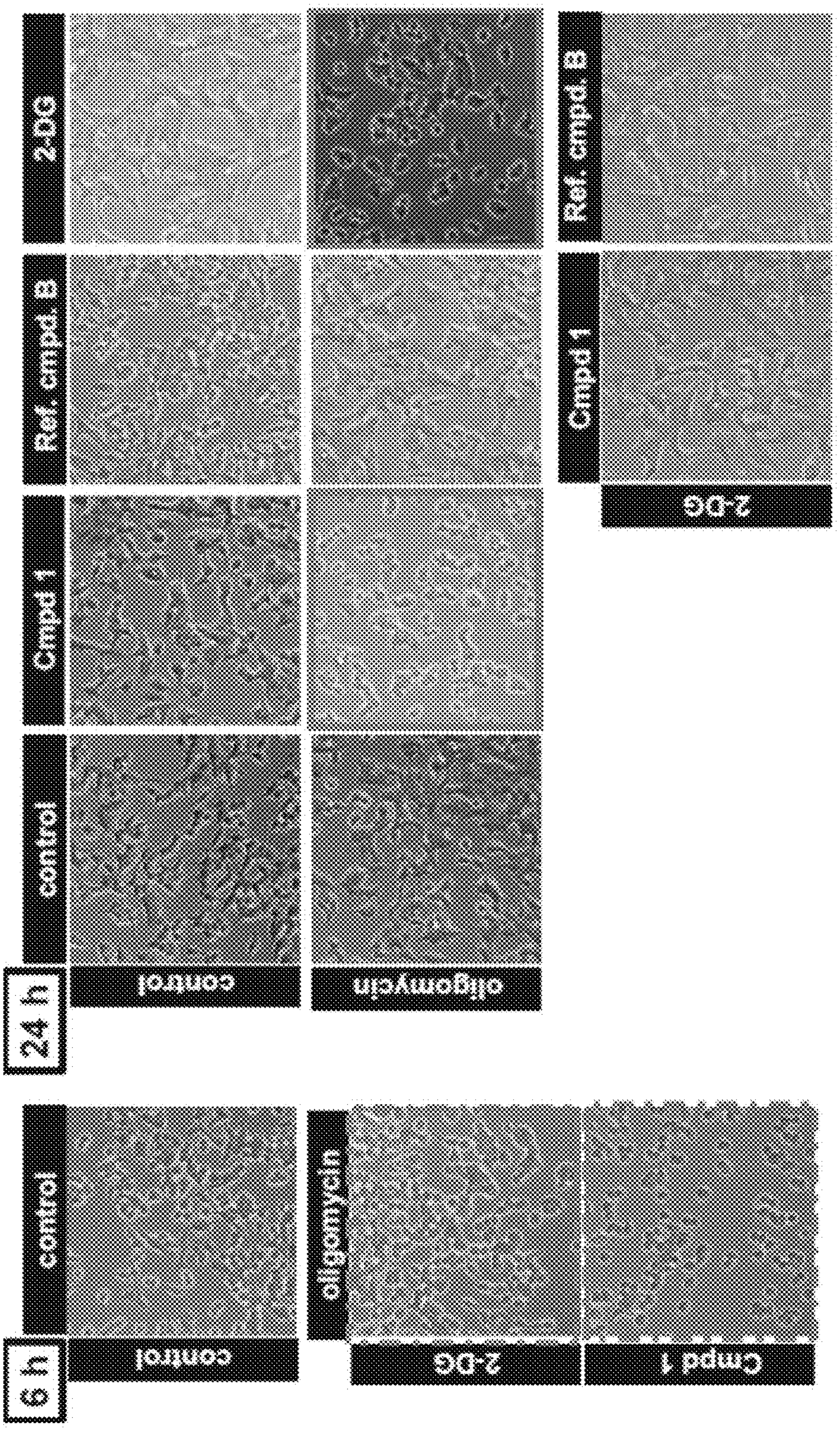
FIGS. 5A-5C illustrate that Compound 1 induces cell death when mitochondria respiration is blocked.
Figure 5B:
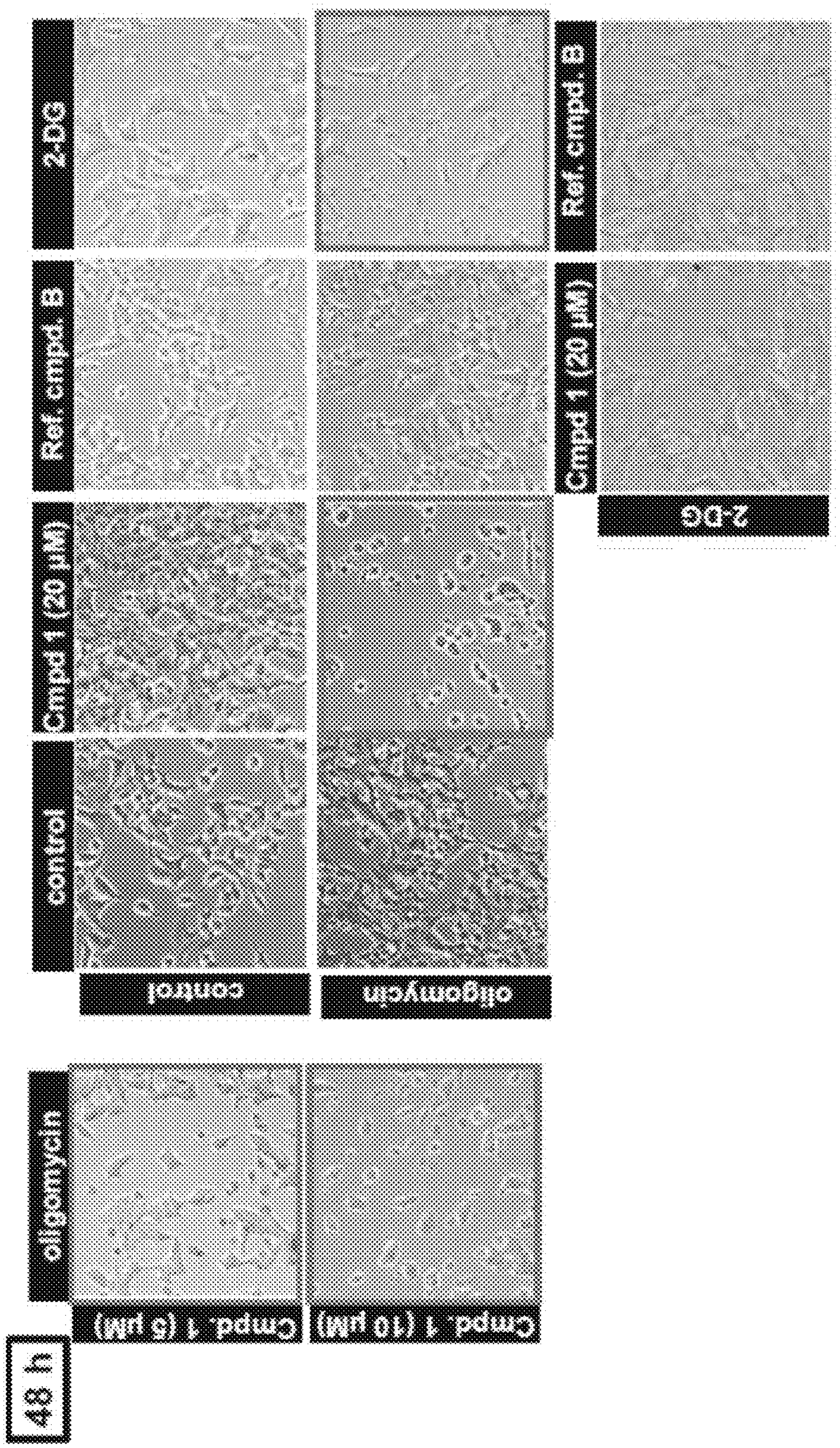
Figure 5C:
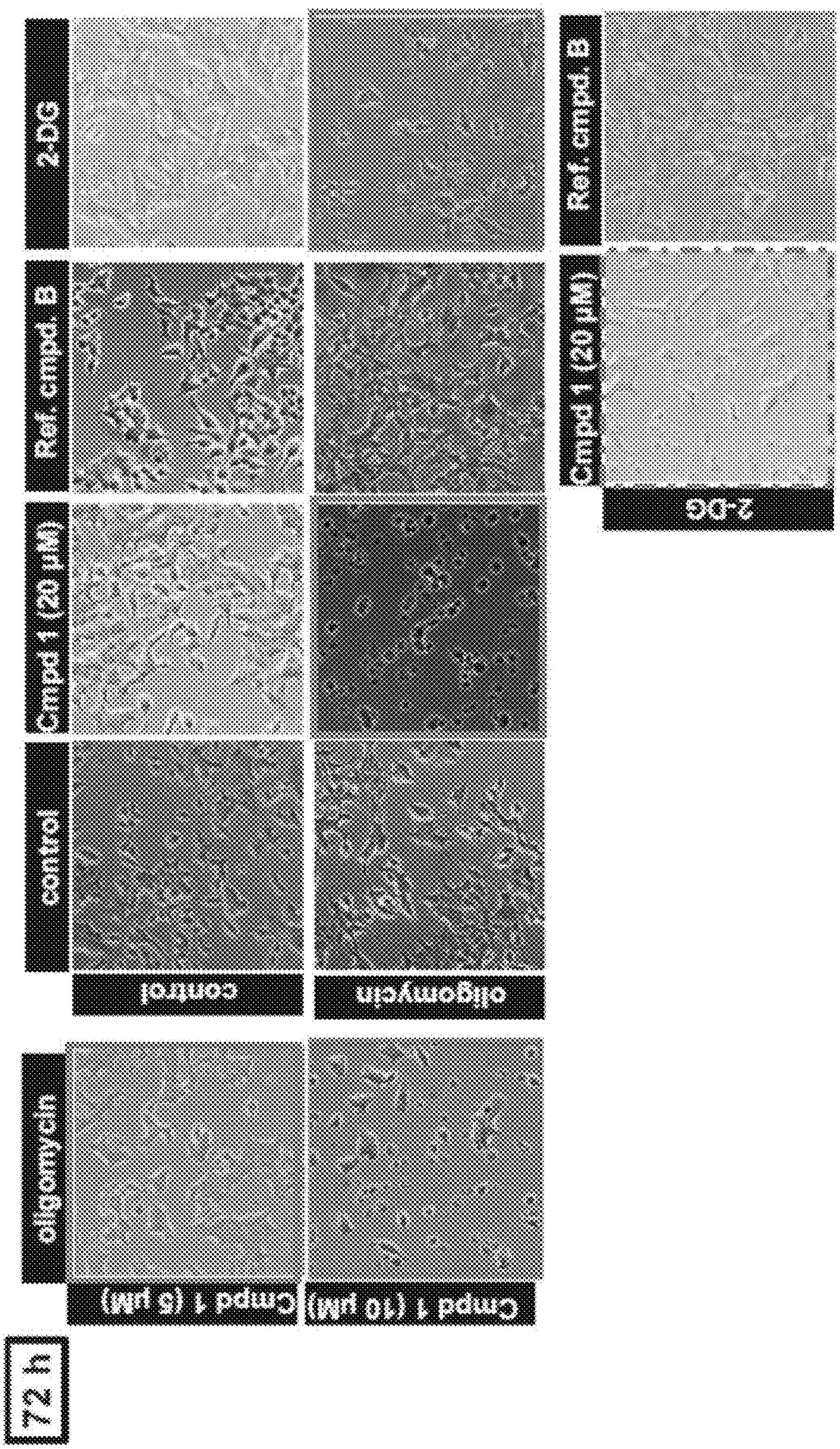
Figure 6:
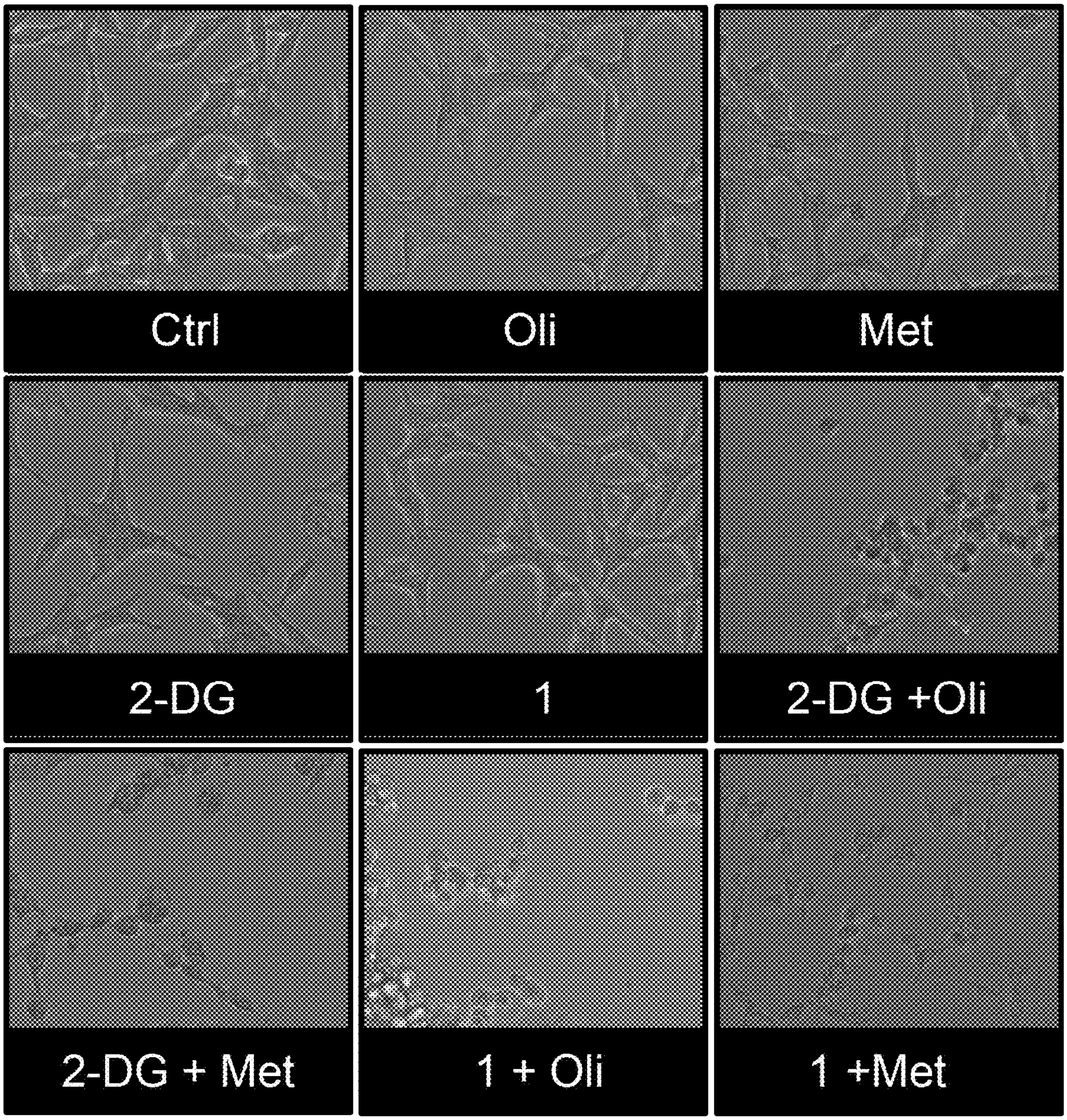
FIG. 6 evaluation of Compound 1 and metformin in LNCaP cells. LNCaP cells were treated with Compound 1, oligomycin (Oli), 2-deoxy-d-glucose (2-DG), or metformin (Met), alone or in combination for 24 h.

FIGS. 2-4 provide additional results on the activity of the compounds of the disclosure. For example, as shown in FIG. 4, ATP levels are altered as early as 10 minutes after co-administration of Compound 1 and oligomycin. Co-administration of Compound 1 and metformin is illustrated in FIG. 6. LNCaP cells were treated with Compound 1, oligomycin (Oli), 2-deoxy-d-glucose (2-DG), or metformin (Met), alone or in combination for 24 h. Oligomycin and Metformin cooperated with 2-DG and Compound 1 to cause cell death. None of compounds were sufficient to kill cells under the same conditions on their own.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A compound of formula

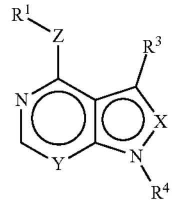

or a pharmaceutically acceptable salt thereof, wherein

X and Y are independently CH or N;

Z is O or N—$R^2$, wherein $R^2$ is hydrogen or $C_1$-$C_6$ alkyl optionally substituted with one or more of $R^5$ groups;

$R^1$ is $C_1$-$C_6$ alkyl optionally substituted with one or more of $R^5$ groups, $C_2$-$C_6$ alkenyl, $C_2$-$C_6$ alkynyl, —($C_0$-$C_4$ alkyl)-$C_3$-$C_8$ cycloalkyl optionally substituted with one or more of $R^6$ groups, —($C_0$-$C_4$ alkyl)-aryl optionally substituted with one or more of $R^6$ groups, —($C_0$-$C_4$ alkyl)-heteroaryl optionally substituted with one or more of $R^6$ groups, —($C_0$-$C_4$ alkyl)-heterocyclyl optionally substituted with one or more of $R^6$ groups, or polyethylene glycol moiety;

$R^3$ is selected from:

(a) one of the formulas:

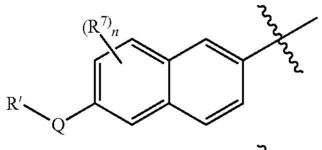

,

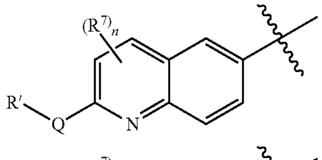

,

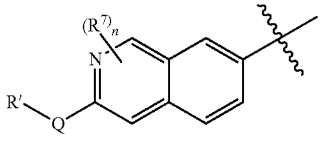

,

-continued

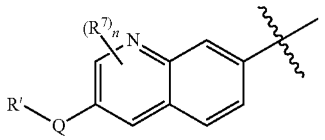

,

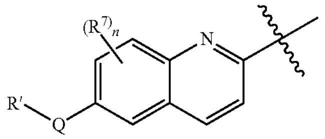

,

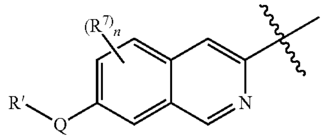

, or

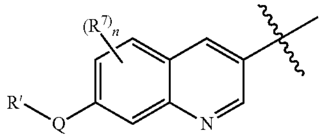

, wherein n is 0, 1, or 2; and

Q is —O—, —S—, or —N(R')—; and b) the formula

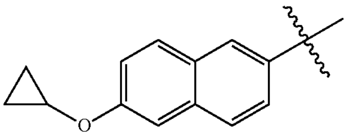

or

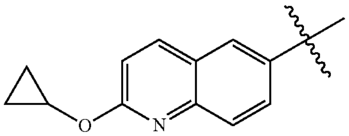

and $R^4$ is $C_1$-$C_6$ alkyl optionally substituted with one or more of $R^8$ groups, $C_2$-$C_6$ alkenyl, $C_2$-$C_6$ alkynyl, $C_3$-$C_8$ cycloalkyl optionally substituted with one or more of $R^7$ groups, aryl optionally substituted with one or more of $R^7$ groups, heteroaryl optionally substituted with one or more of $R^7$ groups, or heterocyclyl optionally substituted with one or more of $R^7$ groups;

wherein each $R^5$ is independently halogen, cyano, nitro, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_{3-8}$ cycloalkyl, or heterocyclyl;

each $R^6$ is independently halogen, cyano, nitro, $C_1$-$C_6$ alkyl, $C_1$-$C_6$ haloalkyl, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_{3-8}$ cycloalkyl, or heterocyclyl;

each $R^7$ is independently halogen, cyano, nitro, $C_1$-$C_6$ alkyl, $C_1$-$C_6$ haloalkyl, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_3$-$C_8$ cycloalkyl, or heterocyclyl, wherein the aryl, heteroaryl, cycloalkyl or heterocyclyl is optionally substituted by one, two, or three groups that are each independently halogen, cyano, nitro, $C_1$-$C_6$ alkyl, $C_1$-$C_6$ haloalkyl, $C_1$-$C_6$ hydroxyalkyl, —OR", —SR", —N(R")$_2$, —C(O)R", —C(O)OR", —C(O)N(R")$_2$, —S(O)$_2$R", —OC(O)R", —OC(O)OR", —OC(O)N(R")$_2$, —N(R")C(O)R", —N(R")C(O)OR", or —N(R")C(O)N(R")$_2$;

each $R^8$ is independently halogen, cyano, nitro, —OR', —SR', —N(R')$_2$, —C(O)R', —C(O)OR', —C(O)N(R')$_2$, —S(O)$_2$N(R')$_2$, —S(O)$_2$R', —OC(O)R', —OC(O)OR', —OC(O)N(R')$_2$, —N(R')C(O)R', —N(R')C(O)OR', —N(R')C(O)N(R')$_2$, aryl, heteroaryl, $C_3$-$C_8$ cycloalkyl, or heterocyclyl, wherein the aryl, heteroaryl, cycloalkyl or heterocyclyl is optionally substituted by one, two, or three groups that are each independently halogen, cyano, nitro, $C_1$-$C_6$ alkyl, $C_1$-$C_6$ haloalkyl, $C_1$-$C_6$ hydroxyalkyl, —OR", —SR", —N(R")$_2$, —C(O)R", —C(O)OR", —C(O)N(R")$_2$, —S(O)$_2$R", —OC(O)R", —OC(O)OR", —OC(O)N(R")$_2$, —N(R")C(O)R", —N(R")C(O)OR", or —N(R")C(O)N(R")$_2$;

each R' and R" is independently selected from hydrogen, $C_1$-$C_6$ alkyl, $C_2$-$C_6$ alkenyl, $C_1$-$C_6$ haloalkyl, —($C_0$-$C_4$ alkyl)-$C_3$-$C_8$ cycloalkyl, —($C_0$-$C_4$ alkyl)-aryl, —($C_0$-$C_4$ alkyl)-heteroaryl, and —($C_0$-$C_4$ alkyl)-heterocyclyl, wherein the alkyl, cycloalkyl, aryl, heteroaryl, and heterocyclyl are optionally substituted with one, two, three, or four groups that are each independently halogen, cyano, nitro, $C_1$-$C_6$ alkyl, $C_1$-$C_6$ haloalkyl, —OR$^0$, —SR$^0$, —N(R$^0$)$_2$, —C(O)R$^0$, —C(O)OR$^0$, —C(O)N(R$^0$)$_2$, —S(O)$_2$R$^0$, —OC(O)R$^0$, —OC(O)OR$^0$, —OC(O)N(R$^0$)$_2$, —N(R$^0$)C(O)R$^0$, —N(R$^0$)C(O)OR$^0$, or —N(R$^0$)C(O)N(R$^0$)$_2$, wherein each $R^0$ is independently hydrogen or $C_1$-$C_6$ alkyl.

2. The compound according to claim 1, wherein X is CH and Y is N.

3. The compound according to claim 2, wherein the compound is of formula:

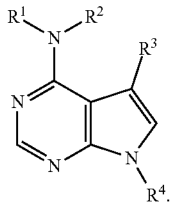

4. The compound according to claim 2, wherein the compound is of formula:

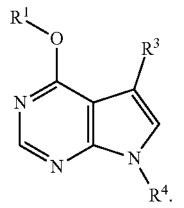

5. The compound according to claim 1, wherein X is N and Y is N.

6. The compound according to claim 5, wherein the compound is of formula:

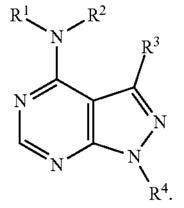

7. The compound according to claim 5, wherein the compound is of formula:

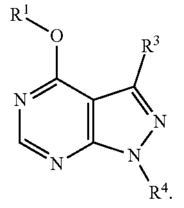

8. The compound according to claim 1, wherein $R^2$ is hydrogen or $C_1$-$C_6$ alkyl.

9. The compound according to claim 1, wherein $R^1$ is $C_1$-$C_6$ alkyl optionally substituted with one or more of $R^5$ groups, $C_3$-$C_8$ cycloalkyl optionally substituted with one or more of $R^6$ groups, aryl optionally substituted with one or more of $R^6$ groups, heteroaryl optionally substituted with one or more of $R^6$ groups, or heterocyclyl optionally substituted with one or more of $R^6$ groups.

10. The compound according to claim 1, wherein $R^1$ is methyl, 2-ethoxyethyl, 3-(dimethylamino)propyl, 2-aminoethyl, 2-hydroxyethyl, 2-(2-aminoethoxy)ethyl, 2-(2-(2-(2-aminoethoxy)ethoxy)ethoxy)ethyl, or 2-(2-(((cyclooct-4-en-1-yloxy)carbonyl)amino)ethoxy)ethyl.

11. The compound according to claim 1, wherein $R^4$ is $C_1$-$C_6$ alkyl optionally substituted with one or more of $R^8$ groups.

12. A pharmaceutical composition comprising a compound according to claim 1 and a pharmaceutically acceptable carrier, solvent, adjuvant or diluent.

13. A method for treating cancer comprising administering to a patient in need of such treatment a therapeutically effective amount of a compound of claim 1, wherein the cancer is selected from the group consisting of androgen receptor positive prostate cancer, castrate resistant prostate cancer, testicular, breast, lung, liver, kidney, and colon cancer.

14. The method of claim 13, wherein the cancer is testicular, breast, lung, liver, kidney, or colon cancer.

15. The method of claim 13, wherein the cancer is prostate cancer selected from androgen receptor (AR) positive prostate cancer and castrate resistant prostate cancer (CRPC).

16. The method of claim 13, wherein the therapeutically effective amount of a compound is administered with a secondary therapeutic agent.

17. The compound of claim 1, wherein $R^3$ is one of the formulas:

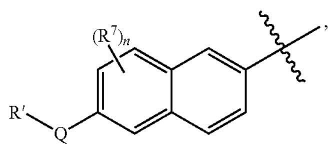

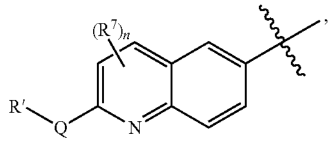

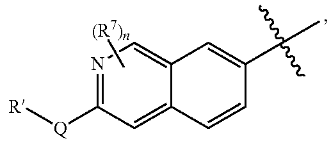

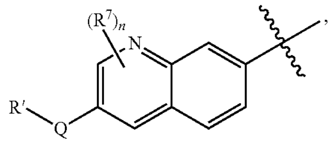

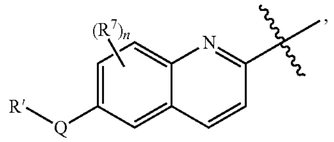

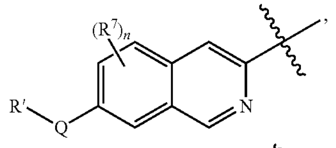
or

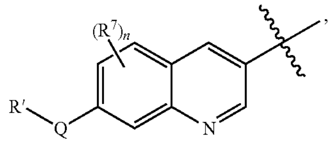

wherein n is 0, 1, or 2; and

Q is —O—, —S—, or —N(R')—.

18. The compound of claim 1, wherein $R^3$ is the formula

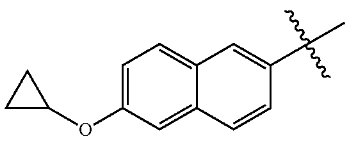
or

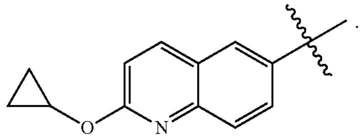

19. A compound selected from:

1-(3-(6-cyclopropoxynaphthalen-2-yl)-4-(methylamino)-1H-pyrazolo[3,4-d]pyrimidin-1-yl)-2-methylpropan-2-ol

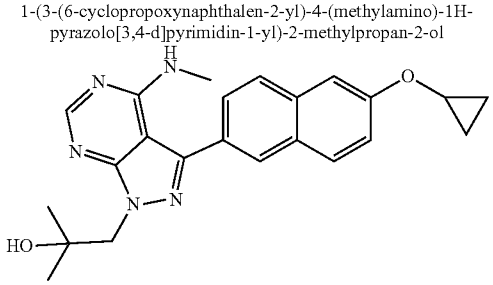

1-(5-(6-cyclopropoxynaphthalen-2-yl)-4-(2-methoxyethoxy)-7H-pyrrolo[2,3-d]pyrimidin-7-yl)-2-methylpropan-2-ol

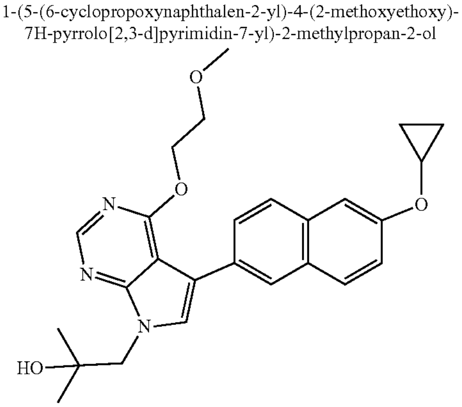

1-(5-(6-ethoxynaphthalen-2-yl)-4-(2-methoxyethoxy)-7H-pyrrolo[2,3-d]pyrimidin-7-yl)-2-methylpropan-2-ol

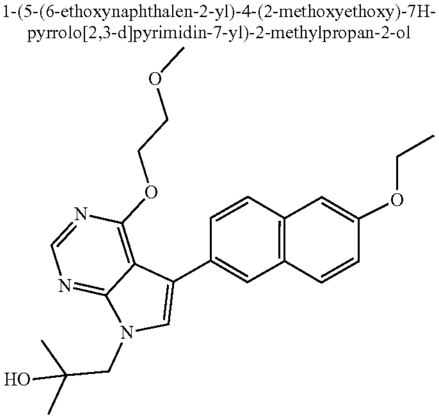

1-(5-(biphenyl-4-yl)-4-(2-methoxyethoxy)-7H-pyrrolo[2,3-d]pyrimidin-7-yl)-2-methylpropan-2-ol

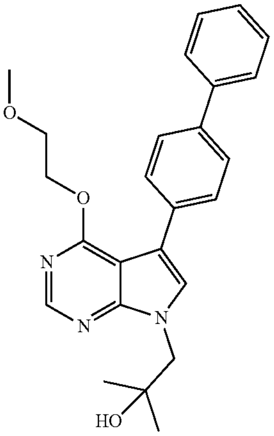 [SMILES: COCCOc1ncnc2c1c(-c1ccc(-c3ccccc3)cc1)cn2CC(C)(C)O]

-continued 1-(4-ethoxy-5-(6-ethoxynaphthalen-2-yl)-7H-pyrrolo[2,3-d]pyrimidin-7-yl)-2-methylpropan-2-ol

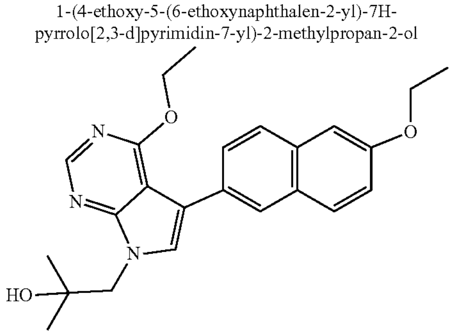

1-(5-(6-cyclopropoxynaphthalen-2-yl)-4-ethoxy-7H-pyrrolo[2,3-d]pyrimidin-7-yl)-2-methylpropan-2-ol

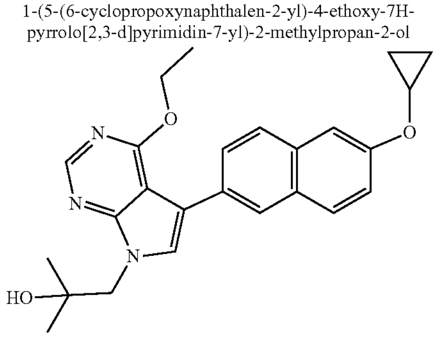

1-(4-(2-methoxyethoxy)-5-(naphthalen-2-yl)-7H-pyrrolo[2,3-d]pyrimidin-7-yl)-2-methylpropan-2-ol

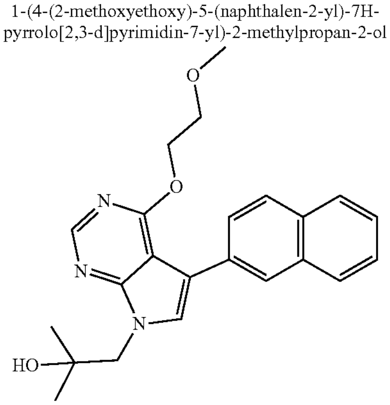

1-(4-(2-ethoxyethylamino)-5-(naphthalen-2-yl)-7H-pyrrolo[2,3-d]pyrimidin-7-yl)-2-methylpropan-2-ol

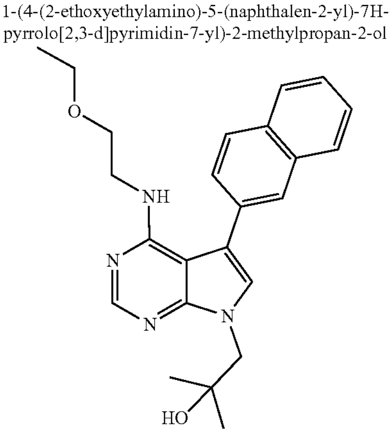

-continued trans-cyclooct-4-enyl 2-(5-(6-cyclopropoxynaphthalen-2-yl)-7-(2-hydroxy-2-methylpropyl)-7H-pyrrolo[2,3-d]pyrimidin-4-ylamino)ethylcarbamate

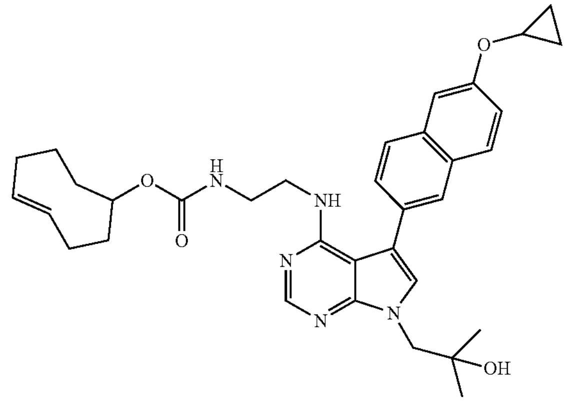 [SMILES: CC(C)(O)Cn1cc(-c2ccc3cc(OC4CC4)ccc3c2)c2c(NCCNC(=O)OC3CC/C=C/CCC3)ncnc21]

2-(3-(but-3-ynyl)-3H-diazirin-3-yl)ethyl 2-(5-(6-ethoxynaphthalen-2-yl)-7-(2-hydroxy-2-methylpropyl)-7H-pyrrolo[2,3-d]pyrimidin-4-ylamino)ethylcarbamate

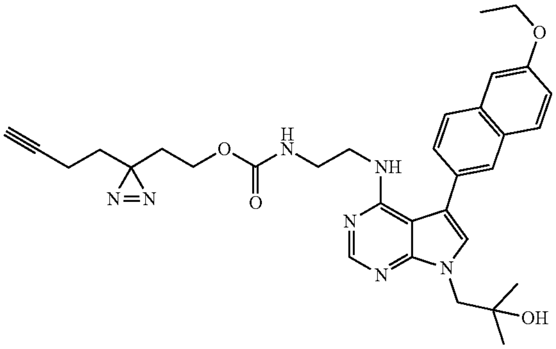 [SMILES: C#CCCC1(CCOC(=O)NCCNc2ncnc3c2c(-c2ccc4cc(OCC)ccc4c2)cn3CC(C)(C)O)N=N1]

1-(5-(6-ethoxynaphthalen-2-yl)-4-(methylamino)-7H-pyrrolo[2,3-d]pyrimidin-7-yl)-2-methylpropan-2-ol

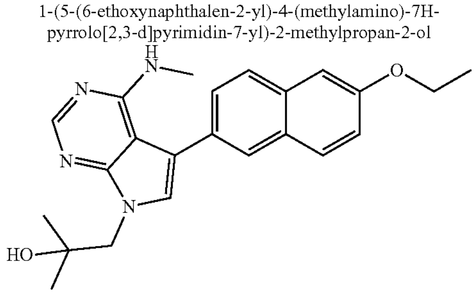

1-(3-(biphenyl-4-yl)-4-(methylamino)-1H-pyrazolo[3,4-d]pyrimidin-1-yl)-2-methylpropan-2-ol

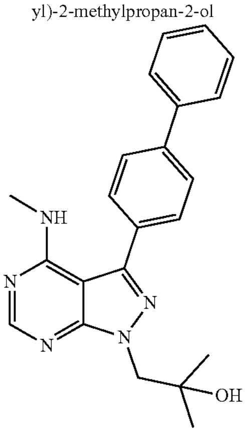

-continued 1-(5-(biphenyl-4-yl)-4-(methylamino)-7H-pyrrolo[2,3-d]pyrimidin-7-yl)-2-methylpropan-2-ol

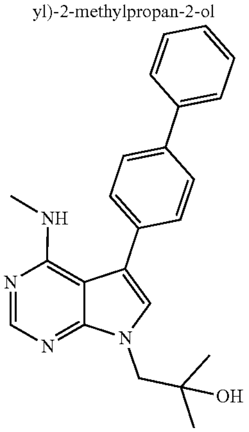

1-(3-(6-ethoxynaphthalen-2-yl)-4-(methylamino)-1H-pyrazolo[3,4-d]pyrimidin-1-yl)-2-methylpropan-2-ol

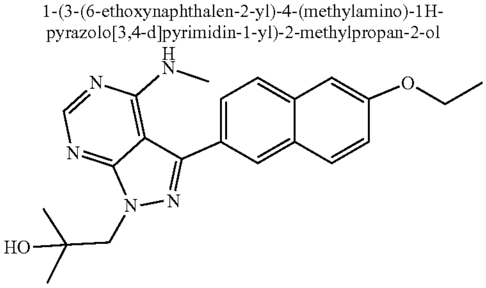

1-(5-(6-cyclopropoxynaphthalen-2-yl)-4-(methylamino)-7H-pyrrolo[2,3-d]pyrimidin-7-yl)-2-methylpropan-2-ol

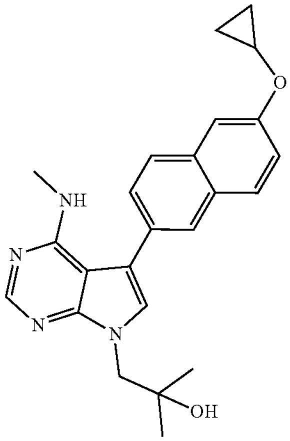 [SMILES: CNc1ncnc2c1c(-c1ccc3cc(OC4CC4)ccc3c1)cn2CC(C)(C)O]

1-(3-(3-isopropylphenyl)-4-(methylamino)-1H-pyrazolo[3,4-d]pyrimidin-1-yl)-2-methylpropan-2-ol

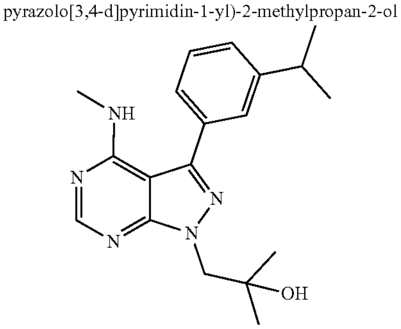

-continued 1-(5-(6-cyclopropoxynaphthalen-2-yl)-4-(cyclopropylamino)-7H-pyrrolo[2,3-d]pyrimidin-7-yl)-2-methylpropan-2-ol

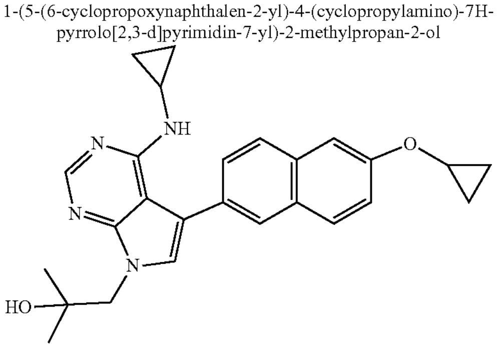

5-(6-ethoxynaphthalen-2-yl)-7-(2-methoxy-2-methylpropyl)-N-methyl-7H-pyrrolo[2,3-d]pyrimidin-4-amine

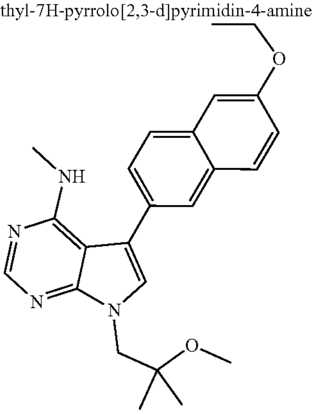

1-(3-(biphenyl-3-yl)-4-(methylamino)-1H-pyrazolo[3,4-d]pyrimidin-1-yl)-2-methylpropan-2-ol

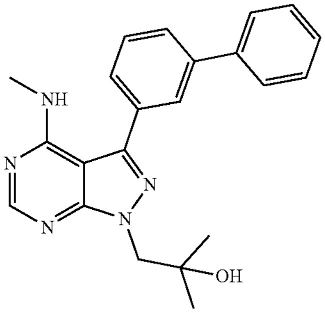 [SMILES: CNc1ncnc2c1c(-c1cccc(-c3ccccc3)c1)nn2CC(C)(C)O]

1-(3-(3-fluorobiphenyl-4-yl)-4-(methylamino)-1H-pyrazolo[3,4-d]pyrimidin-1-yl)-2-methylpropan-2-ol

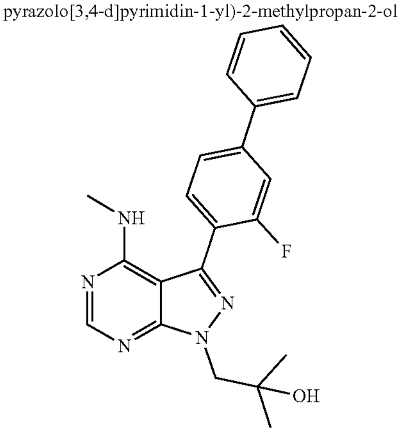

-continued 5-(3-isopropylphenyl)-7-(2-methoxy-2-methylpropyl)-N-methyl-7H-pyrrolo[2,3-d]pyrimidin-4-amine

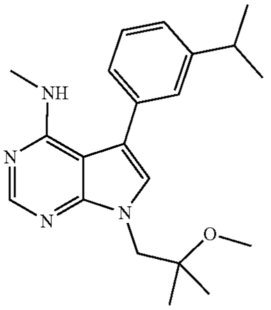 [SMILES: CNc1ncnc2c1c(-c1cccc(C(C)C)c1)cn2CC(C)(C)OC]

5-(3-chlorophenyl)-7-(2-methoxy-2-methylpropyl)-N-methyl-7H-pyrrolo[2,3-d]pyrimidin-4-amine

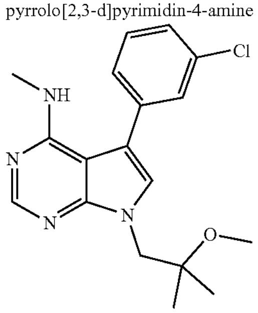

1-(4-(2-aminoethylamino)-5-(6-ethoxynaphthalen-2-yl)-7H-pyrrolo[2,3-d]pyrimidin-7-yl)-2-methylpropan-2-ol

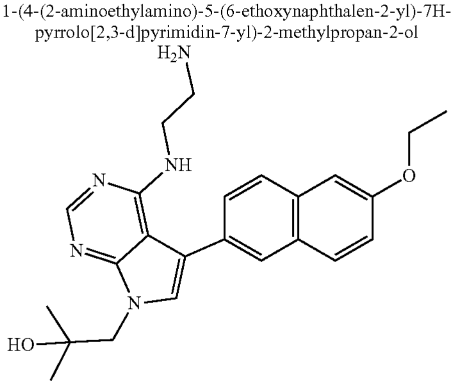

1-(4-(2-aminoethylamino)-5-(6-cyclopropoxynaphthalen-2-yl)-7H-pyrrolo[2,3-d]pyrimidin-7-yl)-2-methylpropan-2-ol

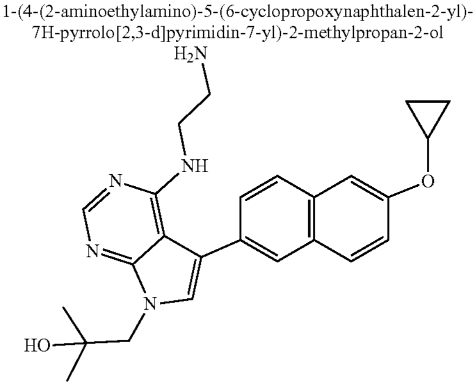

-continued 1-(5-(6-ethoxynaphthalen-2-yl)-4-(2-hydroxyethylamino)-7H-pyrrolo[2,3-d]pyrimidin-7-yl)-2-methylpropan-2-ol

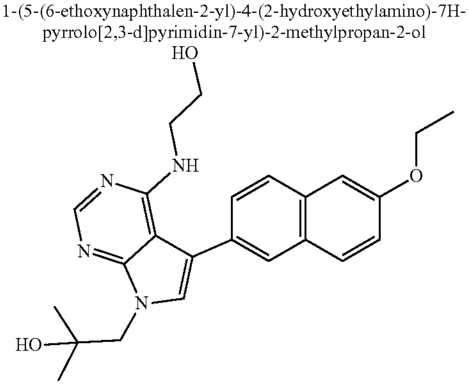

1-(5-(6-cyclopropoxynaphthalen-2-yl)-4-(2-hydroxyethylamino)-7H-pyrrolo[2,3-d]pyrimidin-7-yl)-2-methylpropan-2-ol

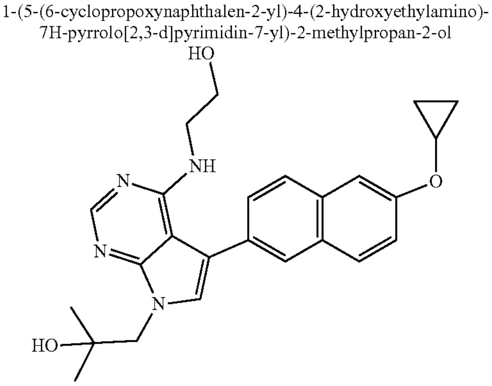

1-(4-(2-(2-aminoethoxy)ethylamino)-5-(6-cyclopropoxynaphthalen-2-yl)-7H-pyrrolo[2,3-d]pyrimidin-7-yl)-2-methylpropan-2-ol

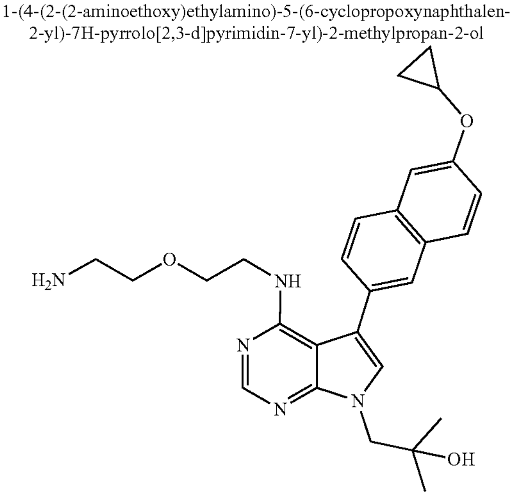

-continued 1-(4-(2-(2-(2-(2-aminoethoxy)ethoxy)ethoxy)ethylamino)-5-(6-cyclopropoxy naphthalen-2-yl)-7H-pyrrolo[2,3-d]pyrimidin-7-yl)-2-methylpropan-2-ol

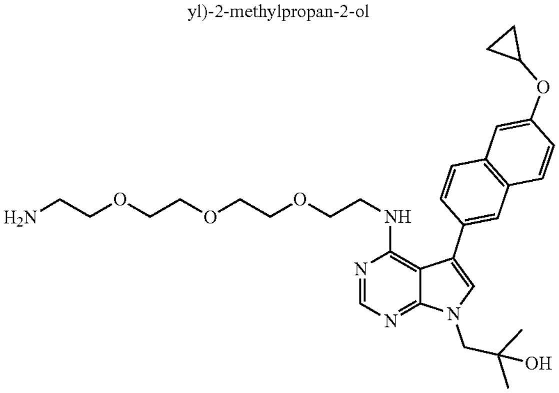

trans-cyclooct-4-enyl 2-(2-(5-(6-cyclopropoxynaphthalen-2-yl)-7-(2-hydroxy-2-methylpropyl)-7H-pyrrolo[2,3-d]pyrimidin-4-ylamino)ethoxy)ethylcarbamate

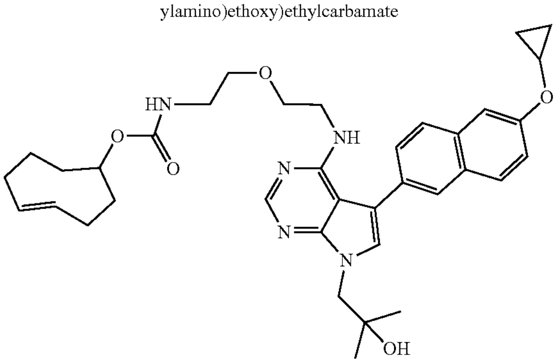

1-(5-(biphenyl-4-yl)-4-(2-hydroxyethylamino)-7H-pyrrolo[2,3-d]pyrimidin-7-yl)-2-methylpropan-2-ol

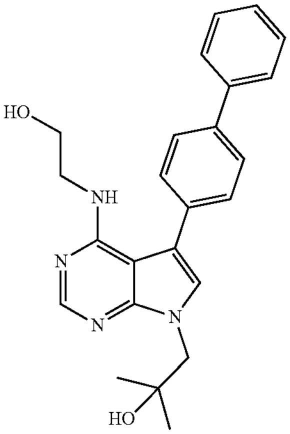 [SMILES: CC(C)(O)Cn1cc(-c2ccc(-c3ccccc3)cc2)c2c(NCCO)ncnc21]

-continued 1-(4-(2-ethoxyethylamino)-5-(6-ethoxynaphthalen-2-yl)-7H-pyrrolo[2,3-d]pyrimidin-7-yl)-2-methylpropan-2-ol

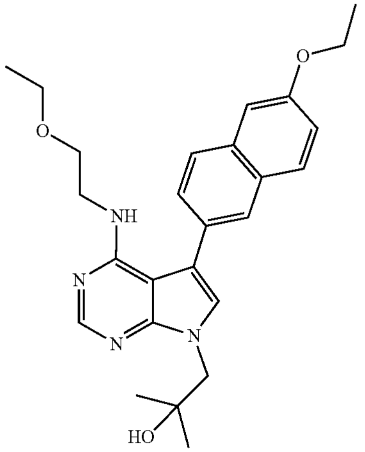 [SMILES: CCOCCNc1ncnc2c1c(-c1ccc3cc(OCC)ccc3c1)cn2CC(C)(C)O]

5-(6-isopropoxynaphthalen-2-yl)-7-(2-methoxy-2-methylpropyl)-N-methyl-7H-pyrrolo[2,3-d]pyrimidin-4-amine

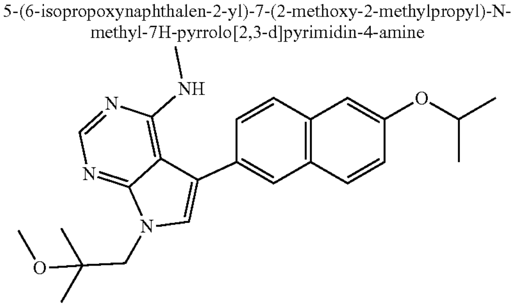

5-(4'-bromobiphenyl-4-yl)-7-(2-methoxy-2-methylpropyl)-N-methyl-7H-pyrrolo[2,3-d]pyrimidin-4-amine

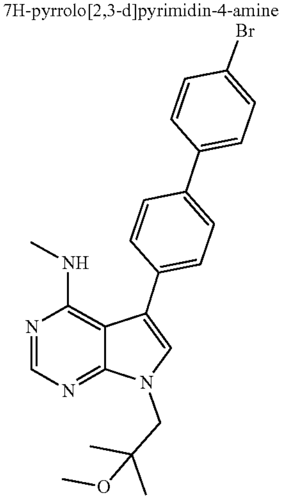

-continued 5-(4'-ethylbiphenyl-4-yl)-7-(2-methoxy-2-methylpropyl)-N-methyl-7H-pyrrolo[2,3-d]pyrimidin-4-amine

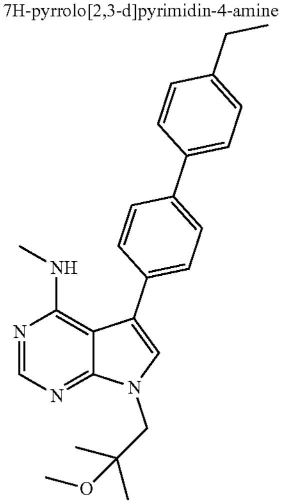

1-(5-(6-cyclopropoxynaphthalen-2-yl)-4-(2-ethoxyethylamino)-7H-pyrrolo[2,3-d]pyrimidin-7-yl)-2-methylpropan-2-ol

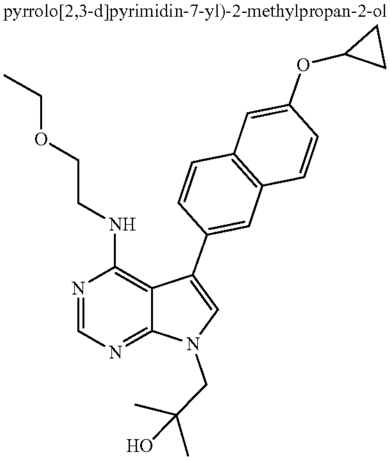

1-(4-(2-ethoxyethylamino)-5-(6-isopropoxynaphthalen-2-yl)-7H-pyrrolo[2,3-d]pyrimidin-7-yl)-2-methylpropan-2-ol

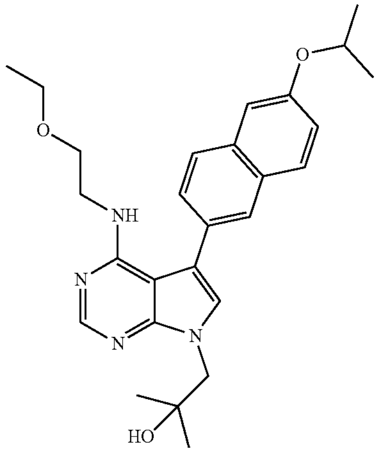 [SMILES: CCOCCNc1ncnc2c1c(-c1ccc3cc(OC(C)C)ccc3c1)cn2CC(C)(C)O]

-continued 1-(5-(biphenyl-4-yl)-4-(2-ethoxyethylamino)-7H-pyrrolo[2,3-d]pyrimidin-7-yl)-2-methylpropan-2-ol

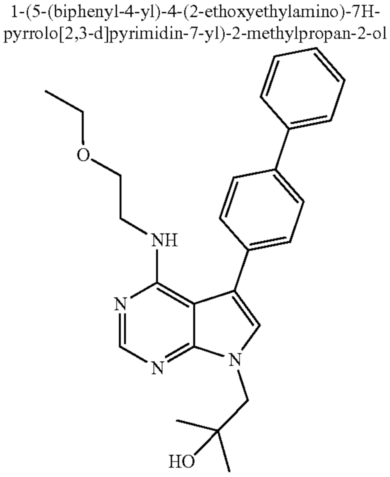

1-(4-(2-ethoxyethylamino)-5-(4'-methoxybiphenyl-4-yl)-7H-pyrrolo[2,3-d]pyrimidin-7-yl)-2-methylpropan-2-ol

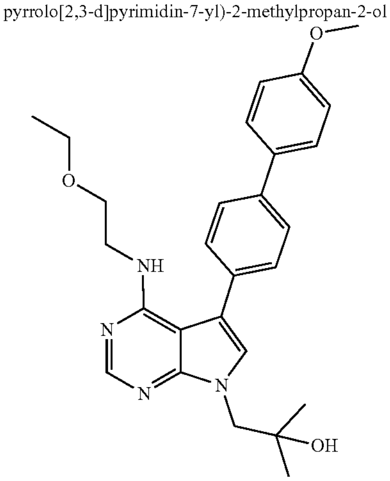

1-(4-(2-ethoxyethylamino)-5-(4'-ethylbiphenyl-4-yl)-7H-pyrrolo[2,3-d]pyrimidin-7-yl)-2-methylpropan-2-ol

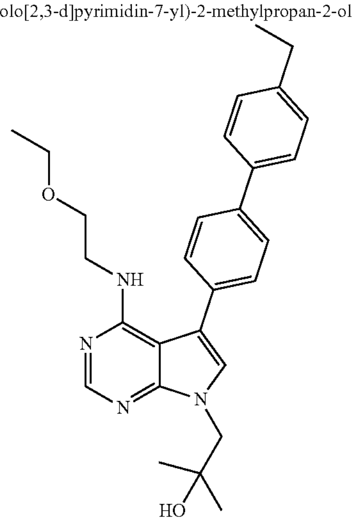

-continued 1-(5-(4'-bromobiphenyl-4-yl)-4-(2-ethoxyethylamino)-7H-pyrrolo[2,3-d]pyrimidin-7-yl)-2-methylpropan-2-ol

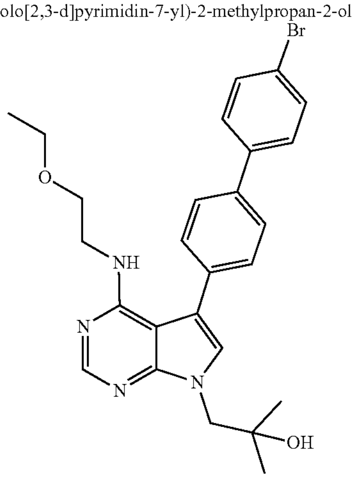

1-(4-(cyclopropylamino)-5-(6-ethoxynaphthalen-2-yl)-7H-pyrrolo[2,3-d]pyrimidin-7-yl)-2-methylpropan-2-ol

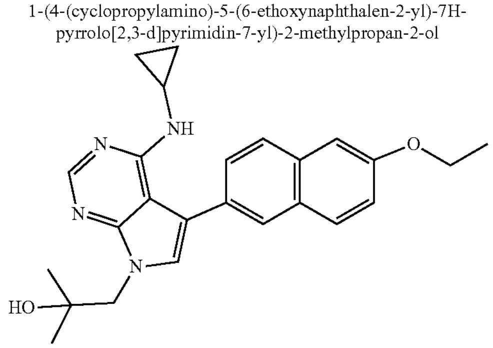

1-(4-(cyclopropylamino)-5-(6-methoxynaphthalen-2-yl)-7H-pyrrolo[2,3-d]pyrimidin-7-yl)-2-methylpropan-2-ol

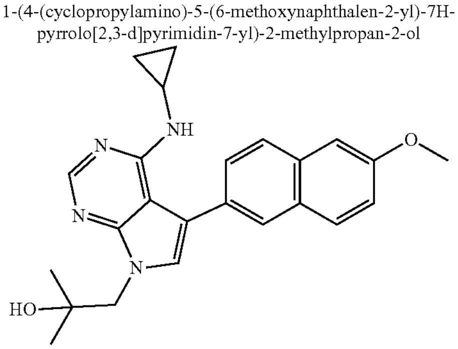

1-(5-(6-cyclopropoxynaphthalen-2-yl)-4-(isopropylamino)-7H-pyrrolo[2,3-d]pyrimidin-7-yl)-2-methylpropan-2-ol

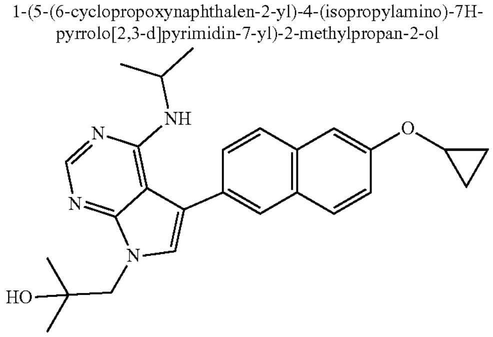

-continued
1-(5-(6-ethoxynaphthalen-2-yl)-4-(isopropylamino)-7H-pyrrolo[2,3-d]pyrimidin-7-yl)-2-methylpropan-2-ol
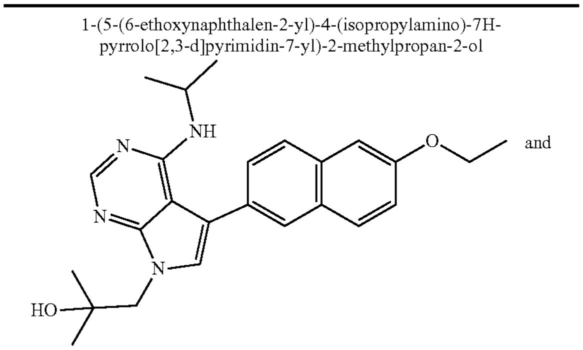
and
1-(4-(isopropylamino)-5-(6-methoxynaphthalen-2-yl)-7H-pyrrolo[2,3-d]pyrimidin-7-yl)-2-methylpropan-2-ol
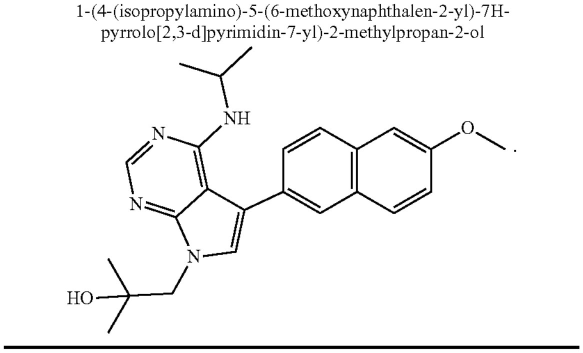
.
* * * * *